US008620060B2

(12) United States Patent
Takayama et al.

(10) Patent No.: US 8,620,060 B2
(45) Date of Patent: Dec. 31, 2013

(54) MODEL IMAGE ACQUISITION SUPPORT APPARATUS, MODEL IMAGE ACQUISITION SUPPORT METHOD, AND MODEL IMAGE ACQUISITION SUPPORT PROGRAM

(75) Inventors: Masahiro Takayama, Kitakushu (JP); Daisuke Mitani, Ayabe (JP)

(73) Assignee: Omron Corporation, Kyoto (JP)

( * ) Notice: Subject to any disclaimer, the term of this patent is extended or adjusted under 35 U.S.C. 154(b) by 790 days.

(21) Appl. No.: 12/712,015

(22) Filed: Feb. 24, 2010

(65) Prior Publication Data
US 2010/0226563 A1  Sep. 9, 2010

(30) Foreign Application Priority Data
Mar. 4, 2009  (JP) ................ P2009-050384

(51) Int. Cl.
*G06K 9/00* (2006.01)
*G06K 9/62* (2006.01)
*G06K 9/66* (2006.01)
*G06K 9/70* (2006.01)

(52) U.S. Cl.
USPC ........... 382/141; 382/143; 382/152; 382/209; 382/217; 382/218; 382/224

(58) Field of Classification Search
USPC .......... 382/141, 143, 152, 209, 217, 218, 224
See application file for complete search history.

(56) References Cited

U.S. PATENT DOCUMENTS 6,480,627 B1 * 11/2002 Mathias et al. ............... 382/224
7,167,583 B1 *  1/2007 Lipson et al. ................. 382/147
2003/0051147 A1   3/2003 Maeda et al.
2003/0152276 A1 *  8/2003 Kondo et al. ................. 382/224
2007/0014467 A1 *  1/2007 Bryll ............................ 382/152
2008/0025616 A1 *  1/2008 Bryll ............................ 382/209

FOREIGN PATENT DOCUMENTS

| EP | 1 043 689 A2 | 11/2000 |
|---|---|---|
| JP | 11-085907 | 3/1999 |
| JP | 2001-236467 A | 8/2001 |
| JP | 2002-032753 A | 1/2002 |
| JP | 2003-067340 A | 3/2003 |
| WO | WO 02/088688 A1 | 11/2002 |

OTHER PUBLICATIONS

Laws, et al. "Stopping Criteria for Active Learning of Named Entity Recognition." Proceedings of the 22nd International Conference on Computational Linguistics. (2008): 465-472. Print.*

* cited by examiner

*Primary Examiner* — Michael A Newman
(74) *Attorney, Agent, or Firm* — Foley & Lardner LLP

(57) ABSTRACT

The present invention provides a model image acquisition support apparatus, a model image acquisition support method, and a model image acquisition support program that can easily and swiftly obtain an optimum model image for an image processing apparatus that performs matching processing based on a model image set in advance with respect to a measurement image that is obtained by imaging an object. A plurality of model image candidates, serving as candidates for model image, are extracted from a reference image obtained by imaging an object which can be a model. Matching processing with the plurality of extracted model images is executed on measurement images actually obtained by a visual sensor, so that trial results are obtained. A trial result is generated upon evaluating each of the trial results of the matching processing with the model image. An optimum model image is determined based on the evaluation result.

14 Claims, 37 Drawing Sheets

FILE / EDIT / DISPLAY / ENVIRONMENT / PROCESSING / SYSTEM

| TRIAL NUMBER | TRIAL IS COMPLETED | THE NUMBER OF WRONG DETECTIONS | THE NUMBER OF WRONG DETECTIONS OF NONDEFECTIVE IMAGES | THE NUMBER OF WRONG DETECTIONS OF DEFECTIVE IMAGES | MAXIMUM MEASUREMENT TIME | NON-DEFECTIVE ITEM IMAGE CORRELATION VALUE AVERAGE | DEFECTIVE ITEM IMAGE CORRELATION VALUE AVERAGE | NON-DEFECTIVE ITEM IMAGE CORRELATION VALUE 3σ | DEFECTIVE ITEM IMAGE CORRELATION VALUE 3σ |
|---|---|---|---|---|---|---|---|---|---|
| * | | | | | | | | | |
| 4 | ☑ | 0 | 0 | 0 | 453 | 96.01 | 38.79 | 6.093 | 3.096 |
| 0 | ☑ | 0 | 0 | 0 | 460 | 94.47 | 39.585 | 11.847 | 3.402 |
| 2 | ☑ | 0 | 0 | 0 | 436 | 92.88 | 41.005 | 13.635 | 3.402 |
| 3 | ☑ | 0 | 0 | 0 | 455 | 90.45 | 35.54 | 15.21 | 2.766 |
| 7 | ☑ | 0 | 0 | 0 | 434 | 88.18 | 37.375 | 14.445 | 2.388 |
| 6 | ☑ | 0 | 0 | 0 | 443 | 87.09 | 30.68 | 15.813 | 2.49 |
| 5 | ☑ | 0 | 0 | 0 | 450 | 85.68 | 30.44 | 17.31 | 3.174 |
| 1 | ☑ | 1 | 1 | 0 | 462 | 66.16 | 38.495 | 10.566 | 3.288 |
| 8 | ☑ | 0 | 0 | 0 | 457 | 63.79 | 53.2 | 6.345 | 2.637 |

TRIAL EXECUTION IS TERMINATED

| IMAGE NUMBER | MEASUREMENT IMAGE FILENAME |
|---|---|
| 1 | c:¥data¥111¥OK¥data01.jpg |
| 2 | c:¥data¥111¥OK¥data02.jpg |
| 3 | c:¥data¥111¥OK¥data03.jpg |
| ⁓ | ⁓ |
| N | c:¥data¥111¥NG¥data99.jpg |

| IMAGE NUMBER | EXPECTED CLASS |
|---|---|
| 1 | OK |
| 2 | OK |
| 3 | OK |
| ⁓ | ⁓ |
| N | NG |

| TRIAL [0] | | |
|---|---|---|
| IMAGE NUMBER | DEGREE OF SIMILARITY | DETERMINATION RESULT |
| 1 | 97.6 | OK |
| 2 | 87.8 | OK |
| 3 | 92.3 | OK |
| ⁓ | ⁓ | ⁓ |
| N | 60.4 | NG |

| TRIAL [0] | |
|---|---|
| IMAGE NUMBER | EVALUATION RESULT |
| 1 | OK-OK |
| 2 | OK-OK |
| 3 | OK-OK |
| ⁓ | ⁓ |
| N | NG-NG |

FIG. 27

| TRIAL | IMAGE NUMBER | IMAGE NUMBER | IMAGE NUMBER |
|---|---|---|---|
| [0] | 1 | 2 | 3 |
| [1] | 1 | 2 | 4 |
| [2] | 1 | 2 | 5 |
| ~ | ~ | ~ | ~ |
| [M] | (N-2) | (N-1) | N |

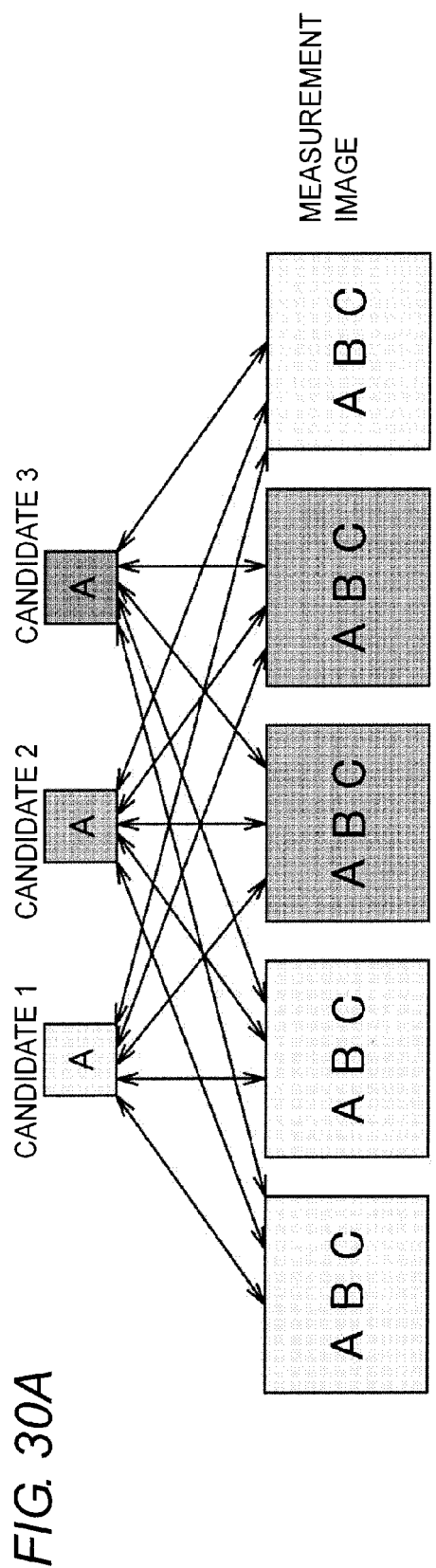
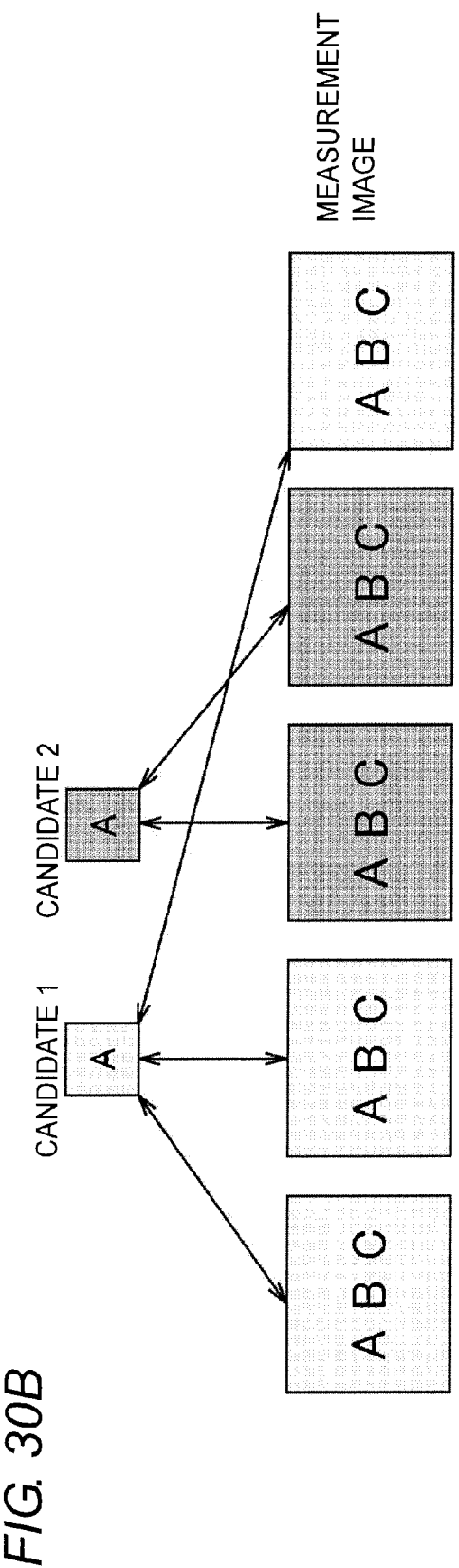
FIG. 30A
FIG. 30B

FIG. 31

|  |  | MEASUREMENT IMAGE (IMAGE NUMBER) | | | | |
|---|---|---|---|---|---|---|
|  |  | 1 | 2 | 3 | 4 | 5 |
| CORRELATION VALUE | CANDIDATE 1 | 98 | 95 | 86 | 80 | 93 |
|  | CANDIDATE 2 | 86 | 89 | 94 | 92 | 85 |
|  | CANDIDATE 3 | 78 | 65 | 43 | 81 | 78 |

MODEL IMAGE ACQUISITION SUPPORT APPARATUS, MODEL IMAGE ACQUISITION SUPPORT METHOD, AND MODEL IMAGE ACQUISITION SUPPORT PROGRAM

This application is based on Japanese Patent Application No. 2009-050384 filed with the Japan Patent Office on Mar. 4, 2009, the entire content of which is hereby incorporated by reference.

BACKGROUND OF THE INVENTION

1. Technical Field

The present invention relates to an image processing apparatus that performs matching processing based on a model image set in advance with respect to a measurement image that is obtained by imaging an object.

2. Related Art

In a field of FA (Factory Automation), a so-called visual sensor has come into practical use as an apparatus for visually inspecting defect of an object to be measured such as a workpiece and recognizing characters printed on a surface thereof. As a typical example of a method for performing such inspection and recognition process, matching processing based on a previously set model image is generally known (for example, Japanese Unexamined Patent Publication No. 11-085907).

In this matching processing, a measurement image (measurement image) is obtained by imaging an object such as a product immediately before shipment and a half-finished product in manufacturing process, and search processing is executed to find a region with the highest degree of similarity (typically, correlation value) between the previously set model image and the measurement image. Therefore, the matching processing is also referred to as search processing.

In an actual production line, an imaging position of a workpiece flowing thereon may be slightly displaced, and a lighting environment may vary. Even when such disturbance factors arise, it is necessary to perform the matching processing in a stable manner. Therefore, when the above visual sensor is actually applied to the production line, what kind of model image is selected is important.

In reality, a skilled worker sets the model image based on his or her experience. More specifically, a certain model image is set first, and the matching processing is performed on the actually obtained measurement image based on this set model image. If a result of the matching processing is not preferable, the model image is changed to another model image. This operation is repeated, so that a model image that is considered to be optimum is ultimately selected. Therefore, operation for searching a model image is recurrently repeated until a stable matching result is obtained. Consequently, there is a problem in that it takes an enormous amount of time and effort to select the model image. In addition, there is a problem in that the visual sensor cannot be actually operated during this selection of the model image.

In reality, it is almost impossible in terms of time and cost to completely confirm that the matching processing can be stably performed with the selected model image on all of the work pieces flowing in the production line. Therefore, there is no other way but to employ the model image whose stability is merely confirmed with respect to only a limited number of measurement images. For this reason, after the operation starts, it may be determined that stable matching processing cannot be performed with the selected model image.

Further, because of difference in the skill of the worker or the like, there is inconsistency in determining what kind of model image is retrieved from the original image or performing operation for selecting one of the model images.

The present invention is made in order to solve the above problems, and an object of the present invention is to provide a model image acquisition support apparatus, a model image acquisition support method, and a model image acquisition support program that can easily and swiftly obtain an optimum model image for an image processing apparatus that performs matching processing based on a model image set in advance with respect to a measurement image that is obtained by imaging an object.

SUMMARY

In accordance with one aspect of the present invention, there is provided a model image acquisition support apparatus providing support in obtaining a model image, the model image acquisition support apparatus being directed to an image processing apparatus that performs a matching processing, based on a previously-set model image, on a measurement image obtained by imaging an object. The model image acquisition support apparatus includes: an extracting unit for extracting a plurality of model image candidates, serving as candidates for the model images, from a reference image obtained by imaging the object which can be a model; an input unit for receiving the measurement image; a processing unit for generating a plurality of trial results by performing the matching processing on the measurement image based on each of the plurality of model images; an evaluating unit for generating an evaluation result by evaluating each of the plurality of trial results; and an output unit for outputting the evaluation result for each of the plurality of model image candidates.

Preferably, the model image acquisition support apparatus further includes a unit for setting, as a model image for the image processing apparatus, a model image candidate corresponding to a selected evaluation result in response to selection made by a user regarding the output evaluation result.

Preferably, the evaluating unit includes: a unit for receiving a condition that should be satisfied by the evaluation result; and a unit for determining a model image candidate that is most suitable for the condition from among the plurality of trial results.

Preferably, the extracting unit extracts the plurality of model image candidates from the same reference image.

Preferably, the extracting unit extracts the plurality of model image candidates different in at least one of a size, a position, and a direction of an extracted region.

Preferably, the extracting unit extracts the model image candidates from the reference image by performing the matching processing based on an initially-set model image.

More preferably, the extracting unit obtains the initially-set model image from the image processing apparatus.

Preferably, the input unit receives, in addition to the measurement image, at least one of an expected class and an expected value that are associated with the measurement image. The evaluating unit evaluates a corresponding trial result based on the expected value and/or the expected class that are associated with each of the measurement images.

More preferably, the expected class represents a classification as to whether the associated measurement image is a non-defective item image that should match with the model image or the associated measurement image is a defective item image that should not match with the model image.

More preferably, the reference image is comprised of the non-defective item image included in the measurement image.

Preferably, the processing unit generates, for each of the plurality of model image candidates, a trial result set including the plurality of trial results obtained by processing a plurality of the measurement images, and the evaluating unit includes a unit for calculating, for each of the plurality of model image candidates, a statistical output regarding the corresponding trial result set.

More preferably, the statistical output includes at least one of an average value, an intermediate value, a maximum value, a minimum value, and a distributed value.

Preferably, the input unit receives a plurality of the measurement images, and the model image acquisition support apparatus further includes a search unit for searching a combination of two or more model image candidates included in the plurality of model image candidates in order to optimize a matching processing result with respect to all of the plurality of measurement images.

In accordance with another aspect of the present invention, there is provided a model image acquisition support apparatus providing support in obtaining a model image, the model image acquisition support apparatus being directed to an image processing apparatus that performs a matching processing, based on a previously-set model image, on a measurement image obtained by imaging an object. The model image acquisition support apparatus includes: an extracting unit for extracting a plurality of model image candidates, serving as candidates for the model images, from a reference image obtained by imaging the object which can be a model; an input unit for receiving the measurement image; a processing unit for generating a plurality of trial results by performing the matching processing on the measurement image based on each of the plurality of model images; an evaluating unit for generating an evaluation result by evaluating each of the plurality of trial results; and a determining unit for determining a model image that is most suitable for a predetermined condition in the evaluation results.

In accordance with still another aspect of the present invention, there is provided a model image acquisition support method providing support in obtaining a model image, the model image acquisition support method being directed to an image processing apparatus that performs a matching processing, based on a previously-set model image, on a measurement image obtained by imaging an object. The model image acquisition support method includes the steps of: extracting a plurality of model image candidates, serving as candidates for the model images, from a reference image obtained by imaging the object which can be a model; receiving the measurement image; generating a plurality of trial results by performing the matching processing on the measurement image based on each of the plurality of model images; generating an evaluation result by evaluating each of the plurality of trial results; and outputting the evaluation result for each of the plurality of model image candidates.

In accordance with yet another aspect of the present invention, there is provided a model image acquisition support program providing support in obtaining a model image, the model image acquisition support program being directed to an image processing apparatus that performs a matching processing, based on a previously-set model image, on a measurement image obtained by imaging an object. The model image acquisition support program causing a processor to execute the steps of: extracting a plurality of model image candidates, serving as candidates for the model images, from a reference image obtained by imaging the object which can be a model; receiving the measurement image; generating a plurality of trial results by performing the matching processing on the measurement image based on each of the plurality of model images; generating an evaluation result by evaluating each of the plurality of trial results; and outputting the evaluation result for each of the plurality of model image candidates.

According to the present invention, an optimum model image can be swiftly and easily obtained for the image processing apparatus performing matching processing, based on the previously set model image, on the measurement image obtained by imaging the object.

BRIEF DESCRIPTION OF THE DRAWINGS

FIG. 14 is a diagram showing an example (5) of a user interface provided by an evaluation processing application of the support apparatus according to the embodiment of the present invention;

FIGS. 16A to 16D are diagrams showing structures of files generated by the control structure of the support apparatus shown in FIG. 15;

FIG. 27 is a diagram for illustrating an overview of a first method according to the third modification of the embodiment of the present invention;

FIGS. 30A and 30B are diagrams for illustrating an overview of a third method according to the third modification of the embodiment of the present invention;

FIG. 31 is a diagram for illustrating an example of trial result in the third method according to the third modification of the embodiment of the present invention;

DETAILED DESCRIPTION

Figure 1:
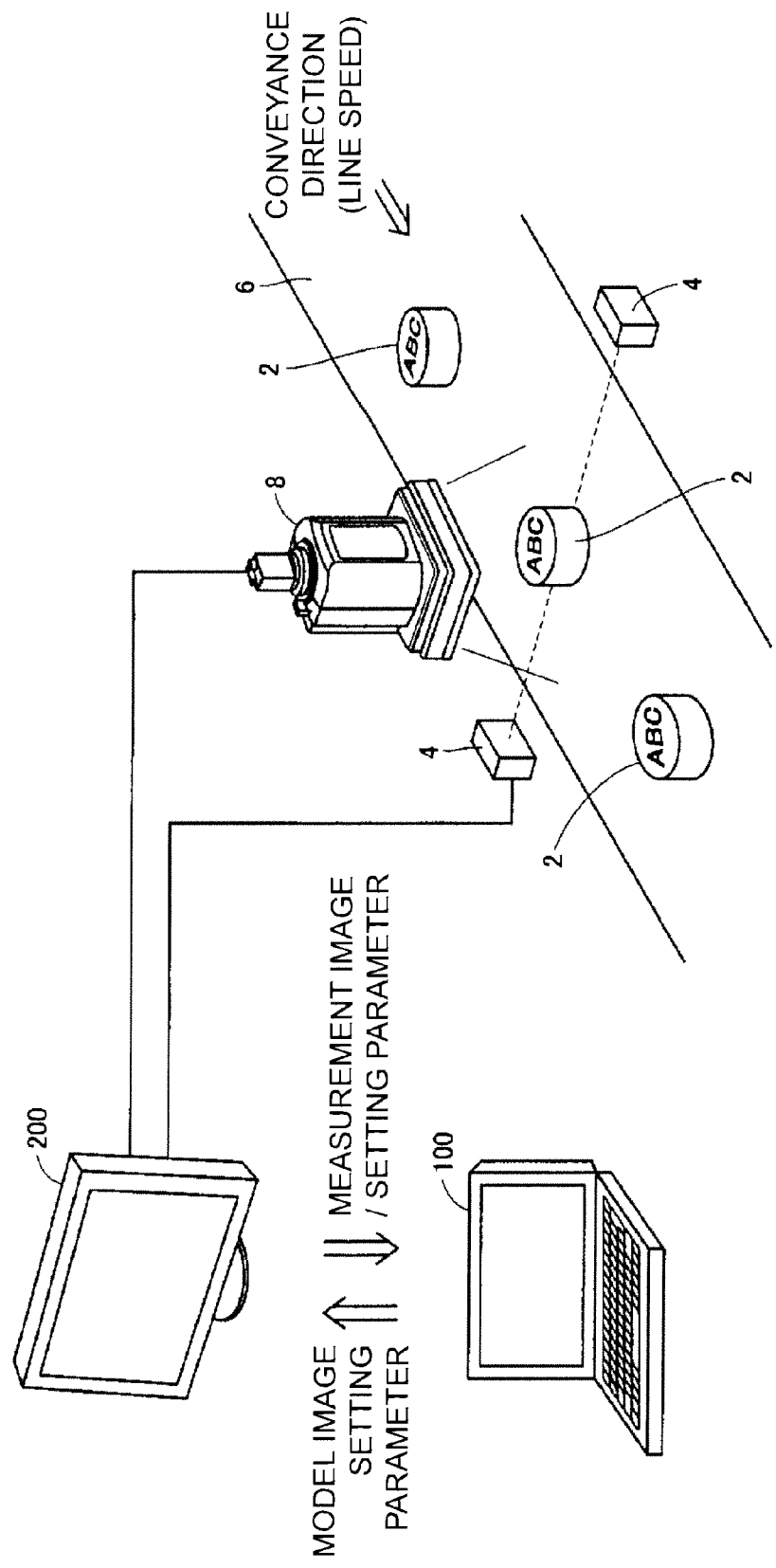
FIG. 1 is a diagram showing an entire system according to an embodiment of the present invention.

Embodiments of the present invention will be described in detail with reference to the drawings. It should be noted that the same or corresponding parts in the figures are attached with the same reference numerals, and description thereof is not repeated.

<Overview>

In the embodiment of the present invention, a model image acquisition support apparatus according to the present embodiment is applied to, for example, an image processing apparatus called a visual sensor. Typically, the visual sensor receives a measurement image that is obtained by imaging a measurement target object (which may be hereinafter referred to as "workpiece"), i.e., an object flowing in a production line, and matching processing is performed on the measurement image based on a previously set model image, so that defect inspection and text string determination of the workpiece can be provided.

First, the model image acquisition support apparatus according to the embodiment of the present invention extracts a plurality of model image candidates, serving as candidates for model images, from reference images that are obtained by imaging object which can be models. Then, the model image acquisition support apparatus according to the present embodiment generates a plurality of trial result by performing matching processing on the measurement image based on the plurality of extracted model images. Further, the model image acquisition support apparatus generates an evaluation result by evaluating each of the plurality of trial results. Lastly, the model image acquisition support apparatus according to the present embodiment outputs the generated evaluation result for each of the plurality of model image candidates. For example, when either of the target measurement images is determined to be an image to be matched with the model image, the model image having the highest degree of matching with the target measurement image can be determined to be optimum.

Further, the model image acquisition support apparatus according to the present embodiment receives an expected class and/or an expected value associated with the measurement image. In this specification, "expected class" and "expected value" mean the content of the processing result that should be generated when the matching processing is performed on a corresponding measurement image.

Typically, "expected class" includes a classification indicating whether a workpiece appearing in the target measurement image is "non-defective item" including the model image or the workpiece appearing in the target measurement image is "defective item" that is different from the model image. In other words, "expected class" represents a classification indicating whether the target measurement image is "non-defective item image" that should be matched with the model image or the target measurement image is "defective item image" that should not be matched with the model image. In the description below, a measurement image associated with the expected class "non-defective item" is also referred to as "non-defective item image", a measurement image associated with the expected class "defective item" is also referred to as "defective item image".

Further, typically, "expected value" includes a value representing the degree of similarity (typically, correlation value) between the set model image and the target measurement image. In other words, when the workpiece appearing in the target measurement image includes the model image, "expected value" becomes a relatively high value. When the workpiece appearing in the target measurement image does not include the model image, "expected value" becomes a relatively low value.

As described above, the terms "non-defective item" and "defective item" in this specification include the classification indicating whether the target measurement image is determined to match with the model image in relative relationship with the set model image. Therefore, since the matching processing based on different model images may be executed on the same measurement image multiple times, "expected class" and/or "expected value" are not limited to one class and/or value.

When the model image acquisition support apparatus according to the present embodiment receives the expected class and/or expected value, the model image acquisition support apparatus generates evaluation results by evaluating each of the plurality of trial results, based on the plurality of trial results that have been generated and the expected class and/or expected value that have been inputted. In other words, a model image that matches with the non-defective item image with a high degree of matching and that matches with the defective item image with a low degree of matching is evaluated as an optimum model image. Then, the model image acquisition support apparatus according to the present embodiment outputs the thus generated evaluation results for each of the plurality of model image candidates.

In the present invention, "output" means providing the content of the model image to the apparatus or a user who actually decides the model image. More specifically, the meaning of "output" includes showing the content on a display device such as a display, causing a printer apparatus to print the content on a sheet medium and the like, transmitting data representing the content to an external apparatus, and storing the data representing the content to a storage apparatus.

As a result of the above processing, the model image acquisition support apparatus according to the present embodiment can easily and swiftly decide one of the plurality of model images that is determined to optimally match with the actual measurement image through the matching processing.

In the description below, for the sake of simplifying the description, "expected class" and "expected value" may also be generically and simply referred to as "expected class". However, this term "expected class" includes not only "expected class" but also "expected value" in the above-described meaning.

<Entire Apparatus Configuration>

FIG. 1 is a diagram showing the entire system according to an embodiment of the present invention.

As shown in FIG. 1, the system according to the present embodiment includes a model image acquisition support apparatus (which may also be simply referred to as "support apparatus") 100 and an image processing apparatus 200.

The image processing apparatus 200 is electrically connected to an imaging unit 8 and a photoelectric sensor 4. The imaging unit 8 obtains a measurement image of a workpiece 2 by imaging the workpiece 2, i.e., an object, conveyed on a conveyance line 6 such as a belt conveyor. The image processing unit 200 stores the measurement image obtained by the imaging unit 8, and performs matching processing on each of the measurement images based on a previously set model image. Then, the image processing unit 200 outputs a processing result (for example, determination of "matching OK" or determination of "matching NG").

An imaging timing at which the imaging unit 8 images the workpiece 2 is detected by the photoelectric sensor 4 (a light receiving unit and a light emitting unit) arranged on both sides of the conveyance line 6. In other words, the photoelectric sensor 4 is constituted by the light receiving unit and the light emitting unit arranged on the same optical axis. When the receiving unit detects that the light emitted by the light emitting unit is shielded by the workpiece 2, the photoelectric sensor 4 outputs a trigger signal representing the imaging timing. Further the imaging unit 8 includes not only an optical system such as lenses but also an imaging device such as a CCD (Coupled Charged Device) and CMOS (Complementary Metal Oxide Semiconductor) sensor. The measurement image obtained by the imaging unit 8 may be a monochrome image or a color image.

On the other hand, the support apparatus 100 receives the measurement images and setting parameters (including the initially set model image) stored in the image processing apparatus 200, and executes model image acquisition processing in order to decide an optimum model image. Then, the support apparatus 100 can also set, to the image processing apparatus 200, the model image and the setting parameters obtained by this model image acquisition processing. The means for exchanging data between the support apparatus 100 and the image apparatus 200 includes a method using a communication unit (either wired or wireless) such as USB (Universal Serial Bus), Ethernet (registered trademark) and a method using a detachable storage medium such as an SD (Secured Digital) card.

Some or all of the functions of the support apparatus 100 may be incorporated into the image apparatus 200 as described later. Alternatively, the support apparatus 100 and the image processing apparatus 200 may be arranged separately, so that the support apparatus 100, which is arranged on a desktop in an office away from the scene, can independently execute a process for deciding an optimum model image.

<Hardware Configuration>

(1. Model Image Acquisition Support Apparatus)

Typically, the support apparatus 100 according to the present embodiment is realized by causing a computer to execute installed programs. Alternatively, some or all of the provided functions may be realized as a dedicated hardware circuit by causing a computer to execute a program.

Figure 2:
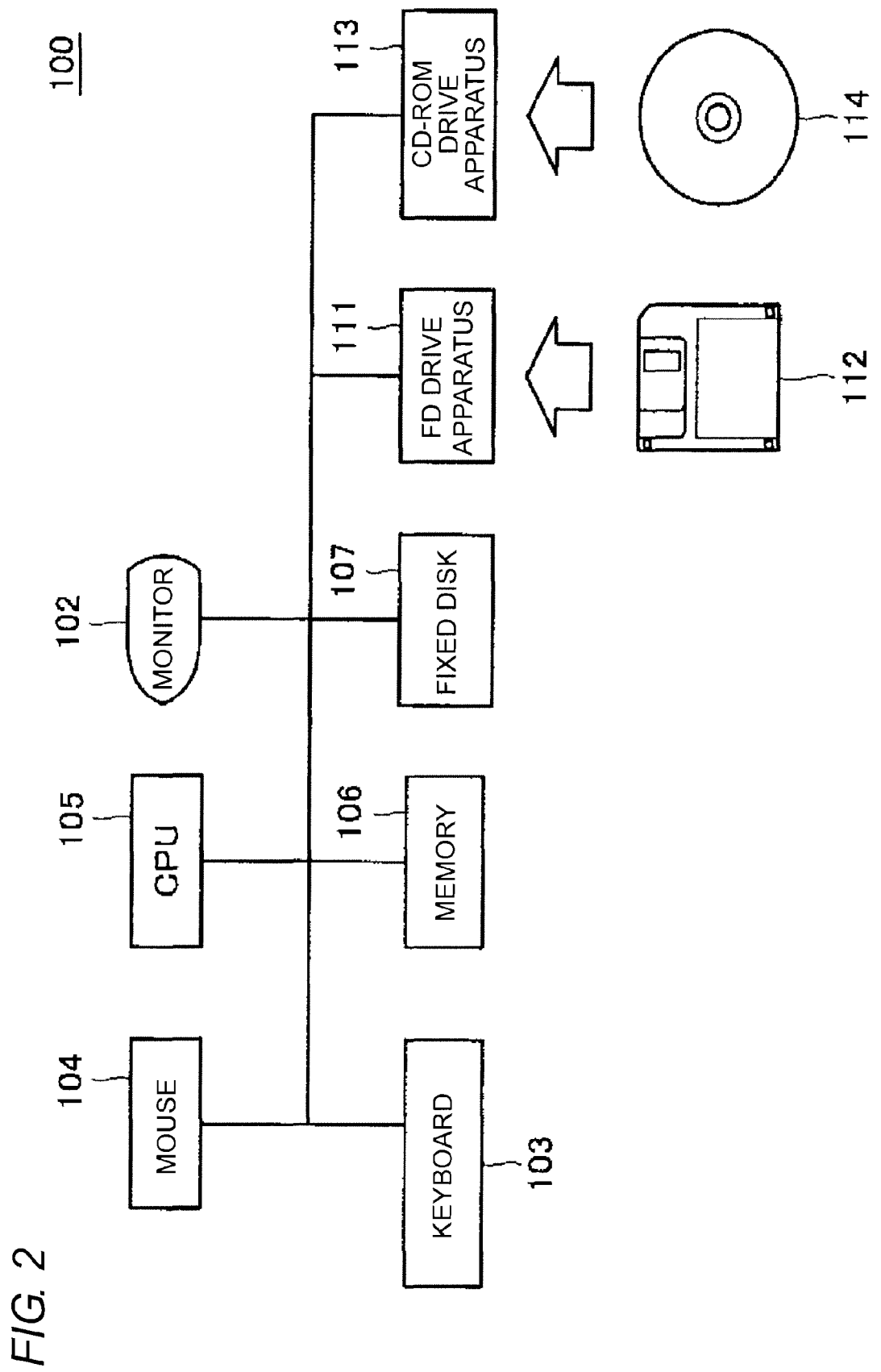
FIG. 2 is a schematic configuration diagram of a computer realizing a model image acquisition support apparatus according to the embodiment of the present invention.

FIG. 2 shows a schematic configuration diagram of a computer realizing the model image acquisition support apparatus 100 according to the embodiment of the present invention.

As shown in FIG. 2, the computer realizing the support apparatus 100 includes a monitor 102 serving as a display device, a keyboard 103 and a mouse 104 serving as input devices, a CPU (Central Processing Unit) 105 serving as an arithmetic device (processor), a memory 106 and a fixed disk 107 serving as storage devices, and a FD drive apparatus 111 and a CD-ROM drive apparatus 113 serving as data reading apparatuses for reading data from recording media. These units are connected with each other via a bus so that these units can communicate data with each other.

Typically, the programs executed by the support apparatus 100 (computer) are stored in a flexible disk (FD: Flexible Disk) 112, a CD-ROM (Compact Disk Read Only Memory) 114, or the like, so as to be distributed. Alternatively, the programs may be downloaded from a distribution server apparatus connected to the network, so as to be distributed. The program stored in the flexible disk 112 and the CD-ROM 114 is read from the FD drive apparatus 111 and the CD-ROM drive apparatus 113, respectively, and is once stored to the fixed disk 107. Further, the program is developed from the fixed disk 107 to the memory 106, and is executed by the CPU 105.

The CPU 105 sequentially executes programmed instructions, so as to execute various kinds of calculations. The memory 106 temporarily stores various kinds of information according to the program execution of the CPU 105. The fixed disk 107 is a non-volatile storage apparatus that stores not only the programs executed by the CPU 105 but also the set model image, the measurement images to be processed, and various setting values.

The keyboard 103 receives instructions given by the user according to the inputted key strokes. The mouse 104 receives instructions given by the user according to operations such as clicking and sliding. As described above, the instructions received by the keyboard 103 and the mouse 104 are given to the CPU 105.

As necessary, the support apparatus 100 may be connected to other output apparatus such as a printer.

(2. Image Processing Apparatus)

Similar to the support apparatus 100, the image processing apparatus 200 according to the present embodiment is typically realized by causing a computer to execute installed programs. Alternatively, some or all of the provided functions may be realized as a dedicated hardware circuit by causing a computer to execute a program.

Figure 3:
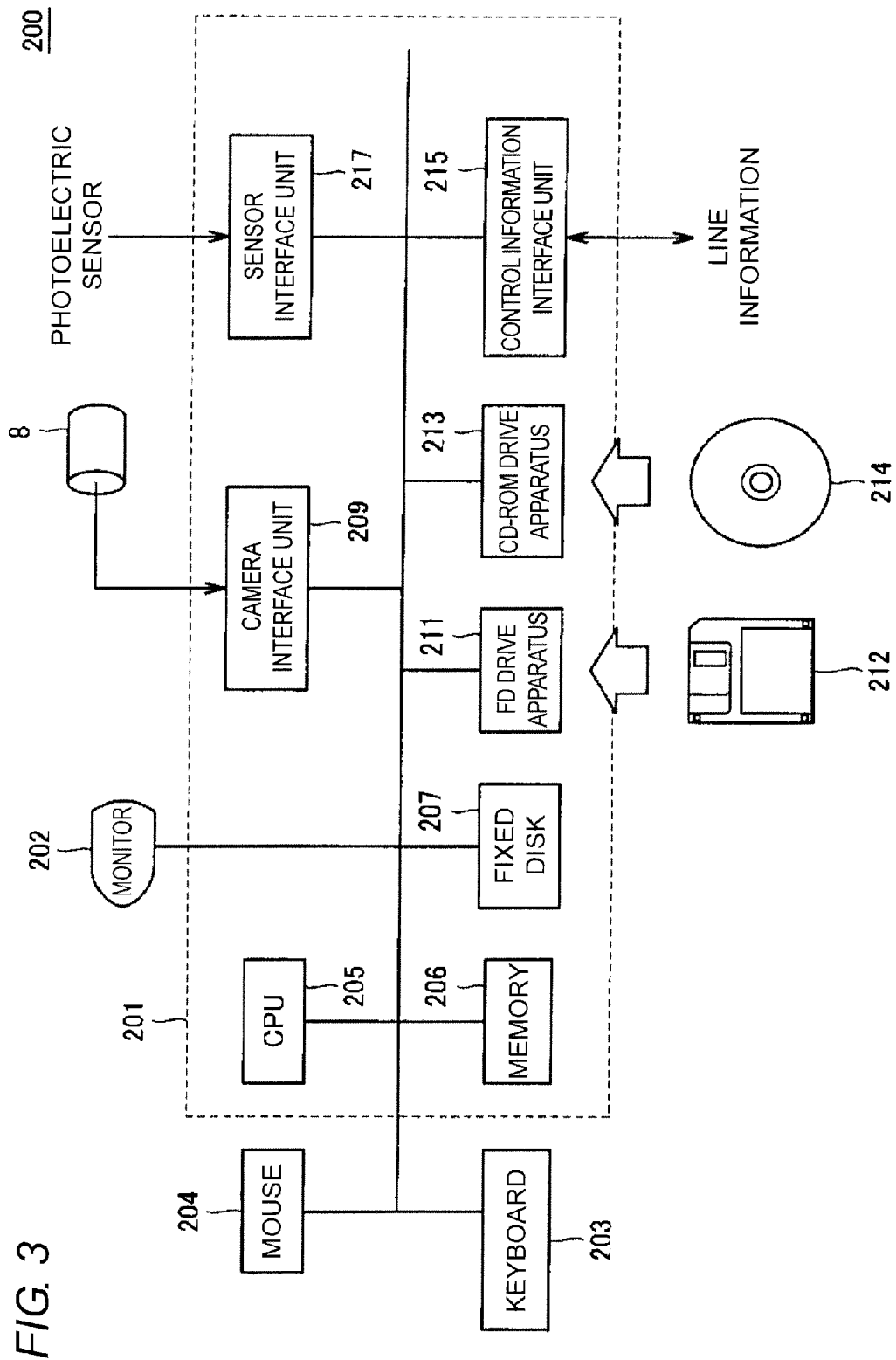
FIG. 3 is a schematic configuration diagram of a computer realizing an image processing apparatus according to the embodiment of the present invention.

FIG. 3 is a schematic configuration diagram of a computer realizing the image processing apparatus 200 according to the embodiment of the present invention.

As shown in FIG. 3, the computer realizing the image processing apparatus 200 includes a main body unit 201, a monitor 202 serving as a display device, a keyboard 203 and a mouse 204 serving as input devices. The main body unit 201 includes a CPU 205 serving as an arithmetic device (processor), a memory 206 and a fixed disk 207 serving as storage devices, and a FD drive apparatus 211 and a CD-ROM drive apparatus 213 serving as data reading apparatuses for reading data from recording media. Further, the main body 201 includes, as interfaces for exchanging signals with the outside of the main body 201, a camera interface unit 209, a control information interface unit 215, and a sensor interface unit 217. These units are connected with each other via a bus so that these units can communicate data with each other.

Typically, the programs executed by the image processing apparatus 200 (computer) are stored in a flexible disk (FD) 212, a CD-ROM 214, or the like, so as to be distributed. Alternatively, the programs may be downloaded from a distribution server apparatus connected to the network, so as to be distributed. The program stored in the flexible disk 212 and the CD-ROM 214 is read from the FD drive apparatus 211 and the CD-ROM drive apparatus 213, respectively, and is once stored to the fixed disk 207. Further, the program is developed from the fixed disk 207 to the memory 206, and is executed by the CPU 205.

Among the structures included in the main body unit 201, the CPU 205, the memory 206, the fixed disk 207, the FD drive apparatus 211, and the CD-ROM drive apparatus 213 are the same as the above-described corresponding units in the support apparatus 100. Therefore, the detailed description thereof will not be repeated.

The camera interface unit 209 mediates data communication between the CPU 205 and the imaging unit 8. More specifically, the camera interface 209 includes an image buffer, which temporarily stores data of the measurement images that are imaged by the imaging unit 8 and are continuously transferred. When at least one frame of measurement image data is accumulated, the accumulated data is transferred to the memory 206 or the fixed disk 207. Further, the camera interface unit 209 gives imaging instructions to the imaging unit 8 according to internal commands generated by the CPU 205.

The control information interface unit 215 mediates data communication between the CPU 205 and a control apparatus (not shown) for controlling the production line (typically, a PLC (Programmable Logic Controller) and the like). The control information interface unit 215 receives line information and the like from the external control apparatus, and outputs the line information and the like to the CPU 205. The sensor interface unit 217 receives the trigger signal from the above-described photoelectric sensor and the like, and outputs the trigger signal to the CPU 205.

The other structures are the same as those in the above-described support apparatus 100. Therefore, the detailed description thereof will not be repeated.

<Installation Procedure>

First, there will be described a workflow in a case where the visual sensor to which the support apparatus 100 according to the present embodiment is applied is assumed to operate in a production line.

Figure 4:
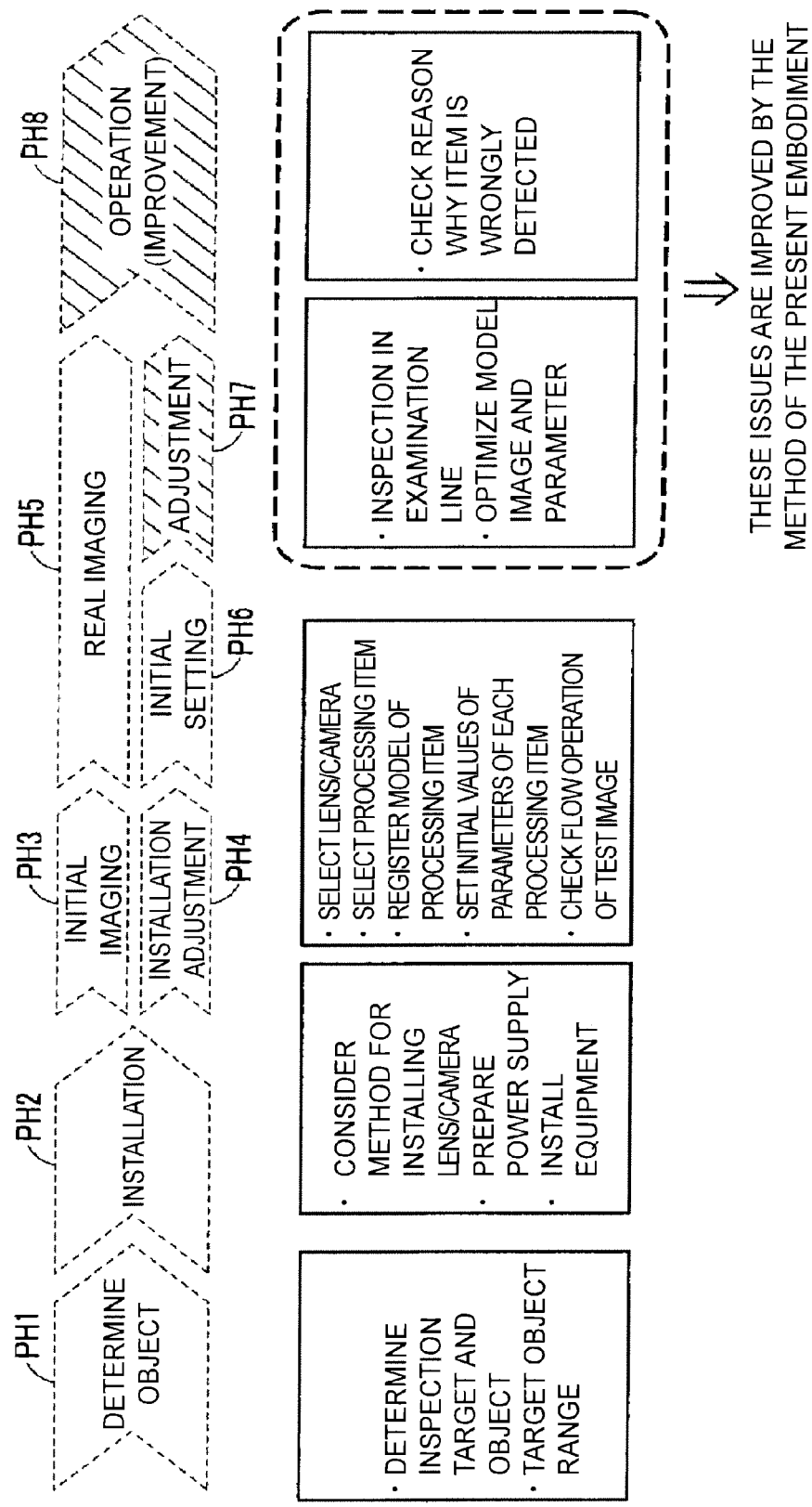
FIG. 4 is an example of a workflow in a case where a visual sensor according to the embodiment of the present invention operates in a production line.

FIG. 4 is an example of the workflow in a case where the visual sensor operates in the production line. As shown in FIG. 4, the procedure for installing the visual sensor to the production line firstly includes an object confirming phase PH1 and an installing phase PH2. After the visual sensor is installed in the production line, the procedure includes an initial imaging phase PH3, an installation adjusting phase PH4, a real imaging phase PH5, an initial setting phase PH6, and an adjusting phase PH7, and an operational (improving) phase PH8. It should be noted that the initial imaging phase PH3 and the installation adjusting phase PH4 run in parallel, and the real imaging phase PH5, the initial setting phase PH6, and the adjusting phase PH7 run in parallel.

In the object confirming phase PH1, a worker decides what kind of workpieces are subjected to inspection and decides which inspection items the workpieces are subjected to. Further, the worker decides which range of the entire workpieces are to be inspected.

Subsequently, in the installing phase PH2, the worker considers a method for installing the lens and the camera according to the installation environment. The worker makes sure a power supply is available to drive the imaging unit and the like, and installs necessary equipment.

In the initial imaging phase PH3, the installation adjusting phase PH4, the real imaging phase PH5, and the initial setting phase PH6, the worker selects the type of lens and camera of the image processing apparatus, and selects items to be processed by the image processing apparatus. A model image used for the matching processing is registered according to the processing items. Further, the worker sets the initial value of parameter of each processing item. After various settings as described above are completed, a series of flow operation is confirmed on the measurement images obtained through experimental imaging.

As a result of the above operation, the series of setting for imaging workpieces (selection of the imaging unit and the imaging environment) is completed. Then, the model image and the parameters set in the image processing apparatus are optimized through trial and error. This optimization process is the adjusting phase PH7, in which phase the worker verifies the result obtained from a test line by image processing, and optimizes the model image and the parameters based on this verification content.

In the adjusting phase PH7, the model image and the parameters are adjusted, and thereafter, the operational (improving) phase PH8 is performed. In operational (improving) phase PH8, the visual sensor begins to operate. But if a certain item is wrongly detected, the reason therefor is confirmed, and the model image and/or parameters are changed. It should be noted that the wrongly detected item are, for example, a non-defective workpiece that is wrongly determined to be a defective item, or a defective workpiece that is wrongly determined to be a non-defective item. In this specification, the term "stable" means that it is less likely to wrongly detect the items as described above.

It is the object of the support apparatus 100 according to the present embodiment to improve efficiency in the processing of the adjusting phase PH7 and the operational (improving) phase PH8 among these phases. When lot-to-lot variation occurs during operation after the model image and/or the parameters have been adjusted, it is necessary to readjust the model image and/or the parameters. Even in such a case, the support apparatus 100 according to the present embodiment can be utilized. Further, in the operational (improving) phase PH8, the model image can be dynamically changed according to the state of the production line, when the support apparatus 100 according to the present embodiment is used as inline type.

<Overview of Model Image Acquisition Procedure>

First, overview of the model image acquisition processing performed by the support apparatus 100 according to the present embodiment will be described.

Figure 5:
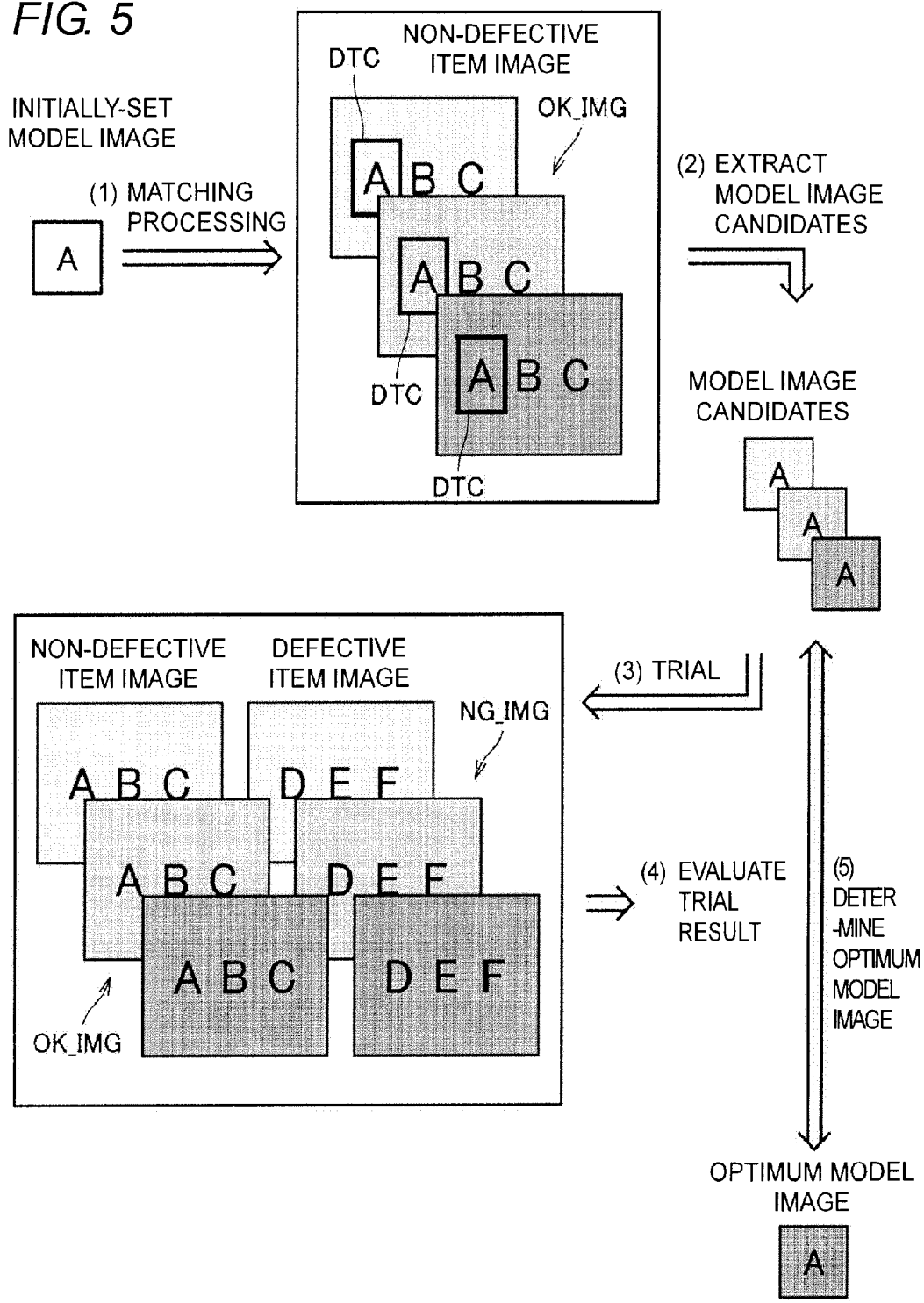
FIG. 5 is a diagram for illustrating an overview of model image acquisition processing performed by a model image acquisition support apparatus according to the embodiment of the present invention.

FIG. 5 is a diagram for illustrating the overview of the model image acquisition processing of the model image acquisition support apparatus 100 according to the embodiment of the present invention.

(1) Matching

Referring to FIG. 5, first, a plurality of model image candidates serving as candidates of model images, are extracted from reference images obtained by imaging objects which can be models. Typically, this reference image is constituted by a non-defective item image OK_IMG. This reference image may be the same as the non-defective item image OK_IMG included in an image set to be subjected to trial as described later. This model image candidate is extracted by performing the matching processing on the reference image (non-defective image) based on the initially set model image that is initially set in the image processing apparatus 200.

(2) Model Image Candidate Extraction

The above-described matching processing corresponds to a type of search processing, in which a region that has a high degree of similarity (correlation value) with the initially set model image is extracted as a model image. In this extraction method, a plurality of model images are extracted by carrying out any one of the steps of: extracting a plurality of model image candidates from the same reference image; extracting a model image candidate from each of the plurality of reference images; or performing a combination of both of the above steps.

Figure 6A:
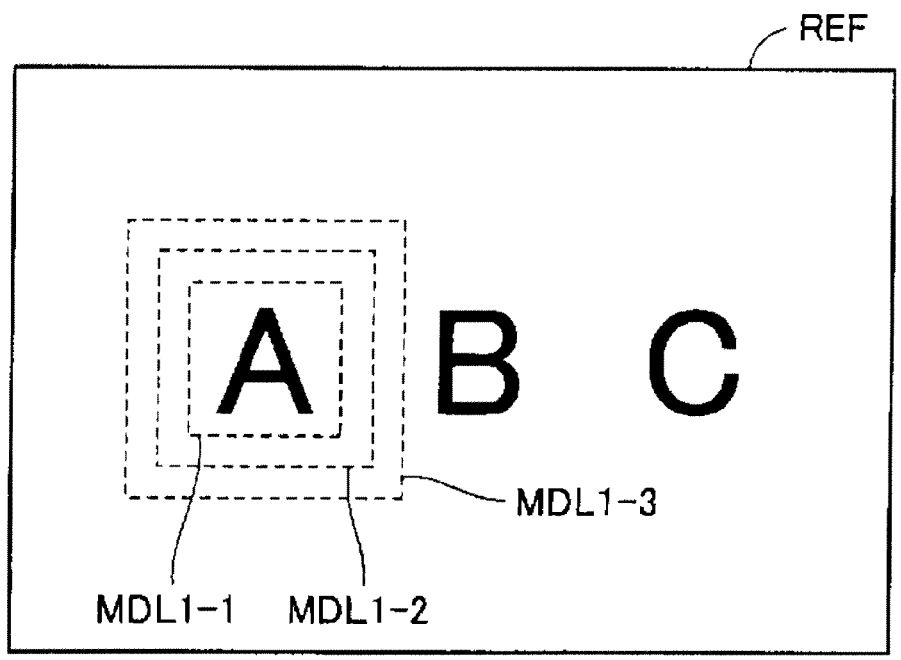
FIGS. 6A and 6B are diagrams showing an example of extraction processing of model image candidates according to the embodiment of the present invention.
Figure 6B:
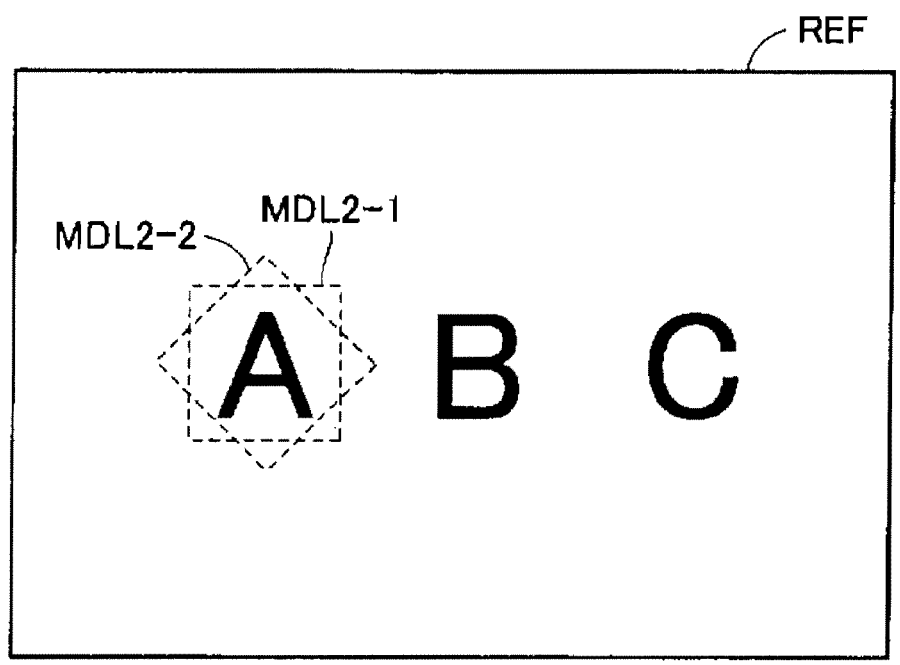

When a plurality of model image candidates are extracted from the same reference image, the extraction may be carried out as follows. As shown in FIGS. 6A and 6B, a plurality of model images may be extracted from the same reference image under a plurality of different conditions (for example, extraction size, extraction position, extraction direction (rotation direction), and the like). Alternatively, a model image may be extracted from each of the plurality of reference images under the same condition.

FIGS. 6A and 6B are diagrams showing examples of extraction processing of model image candidates according to the embodiment of the present invention. As shown in FIG. 6A, a plurality of model images MDL1-1, MDL1-2, MDL1-3, . . . , each of which is extracted in a different size, can be extracted from the same reference image REF. Alternatively, as shown in FIG. 6B, a plurality of model images MDL2-1, MDL2-2, . . . , each of which is extracted in a different direction, can be extracted from the same reference image REF.

The support apparatus 100 according to the present embodiment is to decide an optimum model image from among the plurality of model image candidates. Therefore, it is preferable to prepare as many model images as possible.

(3) Trial

Referring to FIG. 5 again, the matching processing according to the plurality of thus extracted model images is performed on the measurement images actually obtained by the above-described visual sensor. Consequently, trial results are obtained. Typically, the trial result includes the degree of similarity (correlation value) between each of the measurement images and each of the plurality of extracted model images. Further, the trial result may include a determination result indicating either "matching OK" or "matching NG", which is obtained by comparing the calculated degree of similarity and a threshold value set in advance.

(4) Trial Result Evaluation

Further, an evaluation result is generated by evaluating the trial result of the matching processing according to each of the model images, based on the expected class associated with the target measurement image. More specifically, a model image is evaluated as more appropriate when a trial result obtained by performing the matching processing on a non-defective item image OK_IMG according to the model image is more likely to be determined as "matching OK". Likewise, a model image is evaluated as more appropriate when a trial result obtained by performing the matching processing on a defective item image NG_IMG according to the model image is more likely to be determined as "matching NG".

In contrast, a model image is evaluated as less appropriate when a trial result obtained by performing the matching processing on a non-defective item image OK_IMG according to the model image is more likely to be wrongly determined as "matching NG". Likewise, a model image is evaluated as less appropriate when a trial result obtained by performing the matching processing on a defective item image NG_IMG according to the model image is more likely to be wrongly determined as "matching OK".

(5) Deciding Optimum Model Image

The support apparatus 100 according to the present embodiment statistically evaluates the degree of match/mismatch between the above trial result and the expected class (or expected value) of the target measurement image. Then, the support apparatus 100 according to the present embodiment decides the optimum model image from among the extracted model images based on such an evaluation result. Alternatively, the support apparatus 100 according to the present embodiment may support deciding the optimum model image. In other words, the support apparatus 100 according to the present embodiment may employ any one of the following configurations: the support apparatus 100 according to the present embodiment may output the evaluation result for each of the plurality of model image candidates, so that the user selects an optimum model image based on this evaluation result; alternatively, the support apparatus 100 according to the present embodiment may automatically decide the model image that is most suitable for a predetermined condition from among the evaluation results.

In this specification, "optimum model image" means finding a model image with which results expected by the user can be obtained. This target to be sought for is decided by evaluating the previously obtained measurement image, and the model image satisfying the condition expected (set) by the user is decided. Therefore, when a measurement image is newly obtained or when the user changes the condition, another model image may be decided as "optimum" image.

Further, the model image thus obtained may be transferred to the image processing apparatus 200 and set therein.

The output evaluation result may include statistic outputs such as an average value, an intermediate value, a maximum value, a minimum value, and a distributed value.

<Functional Configuration>

Figure 7A:
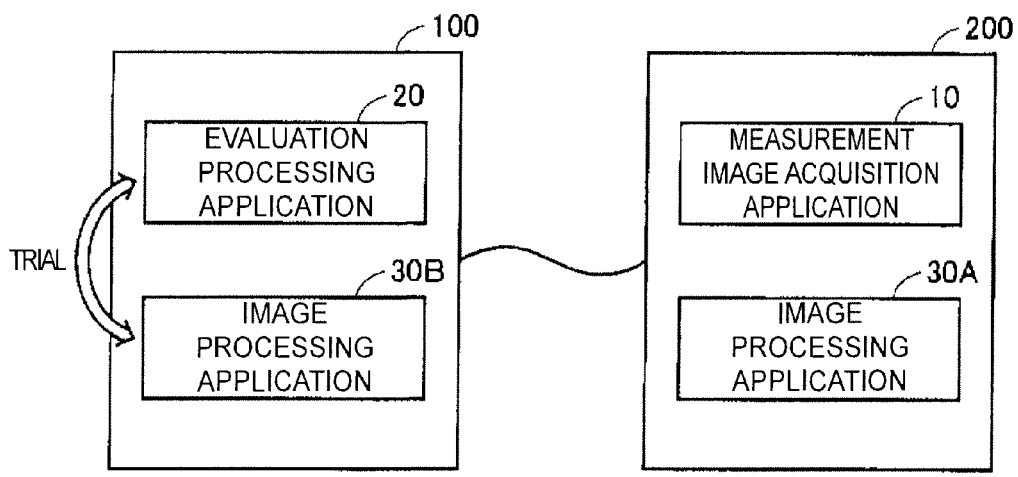
FIGS. 7A and 7B are schematic diagrams showing functional configurations of a support apparatus and the image processing apparatus according to the embodiment of the present invention.
Figure 7B:
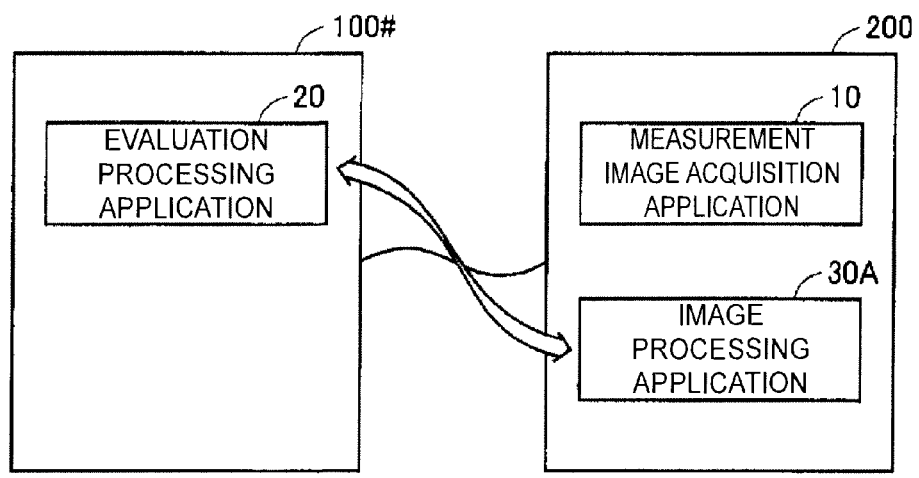

FIGS. 7A and 7B are schematic diagrams showing functional configurations of the support apparatus 100 and the image processing apparatus 200 according to the embodiment of the present invention.

Referring to FIG. 7A, the image processing apparatus 200 according to the present embodiment includes a measurement image acquisition application 10 and an image processing application 30A. The measurement image acquisition application 10 obtains measurement images of workpieces upon giving a predetermined command to the imaging unit 8 and the camera interface unit 209 (FIG. 3). The image processing application 30A outputs processing results by carrying out image processing (which mainly includes the matching processing in the present embodiment) on the measurement images obtained by the measurement image acquisition application 10, in accordance with the previously set model image and parameters.

On the other hand, the support apparatus 100 includes an evaluation processing application 20 and an image processing application 30B. The image processing application 30B basically has the same functions as the image processing application 30A. In other words, the image processing application 30B functions as some kind of "simulator" for achieving the same processing as the matching processing executed by the image processing apparatus 200. The evaluation processing application 20 serves as a main part for providing the model image acquisition processing according to the present embodiment. The evaluation processing application 20 extracts a plurality of model images from a reference image, and causes the image processing application 30B to carry out the matching processing (trial) based on each of the model images. Then, the evaluation processing application 20 evaluates the trial result provided by the image processing application 30B, based on the expected class associated with the target measurement image, thus providing support in obtaining the optimum model image.

In other words, in the system configuration as shown in FIG. 7A, the support apparatus 100 can provide support by itself in obtaining the optimum model image, based on the measurement images (and the reference images) obtained by the image processing apparatus 200.

On the other hand, FIG. 7B shows a system configuration according to another embodiment of the present embodiment. In this system, a support apparatus 100# does not include the image processing application 30B, and includes only the evaluation processing application 20. In this configuration, the evaluation processing application 20 cooperates with the image processing application 30A of the image processing apparatus 200, so as to provide support in obtaining the optimum model image. In other words, the support apparatus 100 and the image processing apparatus 200 are connected with each other so that they can communicate data with each other, and the evaluation processing application 20 of the support apparatus 100 gives various instructions to the image processing application 30A of the image processing apparatus 200 and causes the image processing application 30A to execute the matching processing, so that the processing result thereof may be returned to the evaluation processing application 20 of the support apparatus 100 by the image processing application 30A of the image processing apparatus 200. The processing can also be carried out by synchronizing the support apparatus 100 and the image processing apparatus 200 as described above.

In the description below, the image processing application 30A of the image processing apparatus 200 and the image processing application 30B of the support apparatus 100 are also collectively and simply referred to as "image processing application 30" in view of the fact that their functions are common.

<User Interface for Image Processing Application>

In order to facilitate understanding of the matching processing related to the image processing, an example of the user interface provided by the image processing application 30 (FIG. 7) will be described first.

Figure 8:
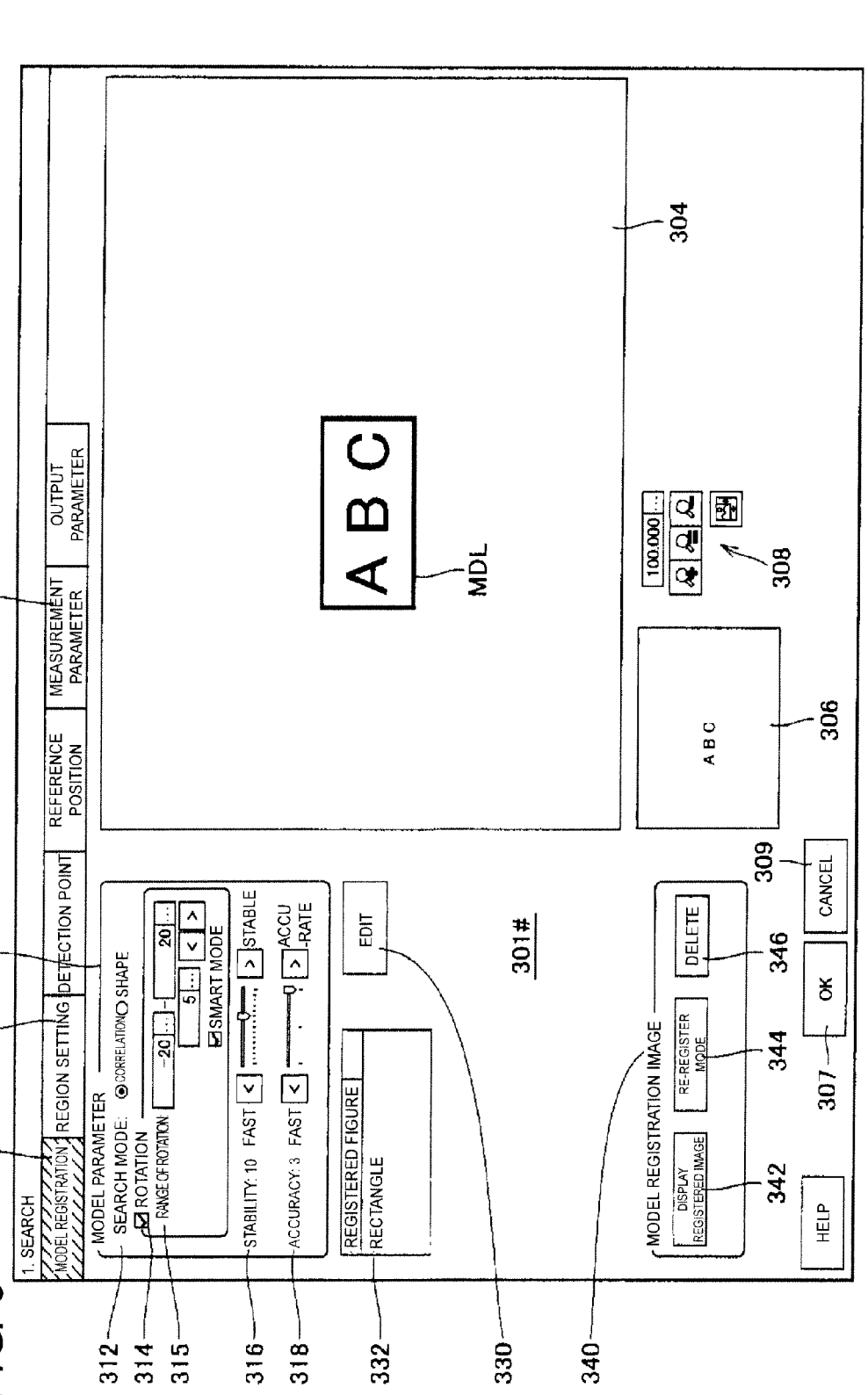
FIG. 8 is a diagram showing an example of a screen display in a setting mode provided by an image processing application according to the embodiment of the present invention.

FIG. 8 is a diagram showing an example of a screen display in a setting mode provided by the image processing application 30 according to the embodiment of the present invention. It should be noted that this setting mode is basically selected in the above-described initial setting phase PH6. The display screen as shown in FIG. 8 is provided by cooperation between the CPU 205 of the image processing apparatus 200 (or the CPU 105 of the support apparatus 100) and a graphic board (not shown). This display screen is achieved by a GUI (Graphical User Interface) that is incorporated as a part of an OS (Operating System). Further, the GUI provides an environment in which the user sets various user settings by using the keyboard 103 (or 203) and the mouse 104 (or 204) to manipulate a cursor on the screen.

As shown in FIG. 8, a screen is displayed in the searching mode using the matching processing. For example, the screen allows selection of a total of six tabs, which correspond to setting items of "model registration", "region setting", "detection point", "reference position", "measurement parameters", and "output parameters".

Referring to FIG. 8, when a tab 301 "model registration" is selected, a setting screen 300 is displayed. This setting screen 300 includes a model registration area 301#, an image display area 304, an overview display area 306, and a display control icon set 308.

The image display area 304 displays a measurement image obtained by the imaging unit 8. The overview display area 306 as well as the image display area 304 displays a measurement image obtained by the imaging unit 8. However, the overview display area 306 displays the entire target measurement image independently from the display range of the image display area 304. Further, the display range and the display accuracy of the measurement image displayed in the image display area 304 is changed according to user operation (e.g., enlarge or reduce) on the display control icon set 308.

On the other hand, the model registration area 301# displays a model parameter setting area 310, a model edit button 330, a registration figure display box 332, a model parameter setting area 310, and a model registration image area 340.

In order to set the model image, the user performs operation while the image display area 304 and the overview display area 306 display the reference image obtained by imaging an object which can be a model.

When the user first presses down the model edit button 330 by manipulating the mouse 204, a drawing tool dialog (not shown) is displayed. The user manipulates this drawing tool dialog to specify a range to be set as the model image over the reference image (measurement image) displayed in the image display area 304. FIG. 8 shows a case where a rectangular range including a text string "ABC" on the image display area 304 is set as a model image MDL. If a model image is already set, the registration figure display box 332 displays the shape of the already-set model image (in the case of FIG. 8, "rectangular"). It should be noted that the shape of the model image to be set is not limited to a rectangular shape, but may be any shape such as a circle, a fan shape, or any polygonal shape.

When the user changes the setting of the already-set model image, the user presses down a necessary button in the model registration image area 340. The reference image (measurement image) used in the setting of the model image is stored, and only the parameters relating to the set model image can be changed later. More specifically, when a registration screen display button 342 is pressed down, the reference image (measurement image) used in the setting of the model image is displayed. When this button 342 is pressed down again, the screen switches to the display of the currently input measurement image. When a model re-registration button 344 is pressed down, the set model image is not changed but other parameters are changed, and thereupon the model image is reset. When a delete button 346 is pressed down, the set model image is deleted.

The model parameter setting area 310 receives a selection of search mode as a setting item. The search mode is a selection of an algorithm for calculating the degree of similarity to the model image. In this search mode, one of "correlation" mode and "shape" mode can be selected by manipulating a radio button 312. "Correlation" mode uses an algorithm for measuring the degree of similarity by calculating a correlation value with the model image upon normalizing the brightness of the received measurement image. On the other hand, "shape" mode uses an algorithm for measuring the degree of similarity based on the degree of consistency with the outline shape of the model image. In general, "correlation" mode provides a more stable measurement.

When "correlation" mode is selected in this search mode, "rotation", "stability", and "accuracy" can be set. When "shape" mode is selected in the search mode, "range of rotation" and "stability" can be set.

The "rotation" will be described. When a workpiece rotates, a plurality of model images, each of which is rotated by a predetermined angle, are internally generated from the set model image. Parameters are specified in relation to the processing for measuring the degree of similarity based on the model images thus generated. More specifically, when a checkbox 314 for rotation is checked, the rotational processing is enabled. Then, when the range of rotation (an upper limit of rotational angle and a lower limit of rotational angle) and a step angle are inputted to a numerical value box 315, it is specified to generate the model images each of which is rotated by the step angle in the range of the rotational angle. In general, the smaller the step angle is, the higher the stability becomes, but it takes more time to compete processing. In addition, a smart mode for fast rotational search may also be set.

In "stability" mode, which of the measurement stability or the processing rate is to be treated as top priority is set. More specifically, a slide bar 316 is set at any value within the range having a predetermined width (for example, 1 to 15). The smaller this set value is, the less it takes to perform the processing. In contrast, the larger this set value is, the higher the stability attains.

In "accuracy", which of the measurement accuracy or the processing rate is to be treated as top priority is set. More specifically, a slide bar 318 is set at any value within the range having a predetermined width (for example, 1 to 3). The smaller this set value is, the less it takes to perform the processing. In contrast, the larger this set value is, the higher the accuracy attains.

When the user presses down an OK button 307 after the user has set the above-described contents, the contents come into effect as internal parameters of the image processing apparatus 200. When a cancel button 309 is pressed down, the parameters that have not yet come into effect are reset. After this setting of the model image, a tab 302 "region setting" is selected, a setting screen (not shown) is displayed so as to allow the user to specify the range in which the same portion as the model image is searched. In this setting screen, the user can set any range in the image display area 304 as the search region. It should be noted that the entire input measurement image may be set as the search region, but the search region is preferably limited to a specific range in order to reduce the processing time.

When a tab 303 "measurement parameter" is selected after the input the region setting, the image processing apparatus 200 receives a condition used to determine whether the degree of similarity (correlation value) at each of the measured coordinate matches with the model image (determined to be "OK").

<Expected Class of Measurement Image>

The visual sensor must output "matching OK" where the measurement image includes substantially the same contents as the set model image. The visual sensor must output "matching NG" where the measurement image includes contents that are similar to the registered model image but are essentially different therefrom.

For example, as shown in FIG. 8 described above, the model image MDL including the text string "ABC" is set. In this case, the measurement image as shown in FIGS. 9A and 9B is assumed to be inputted.

Figure 9A:
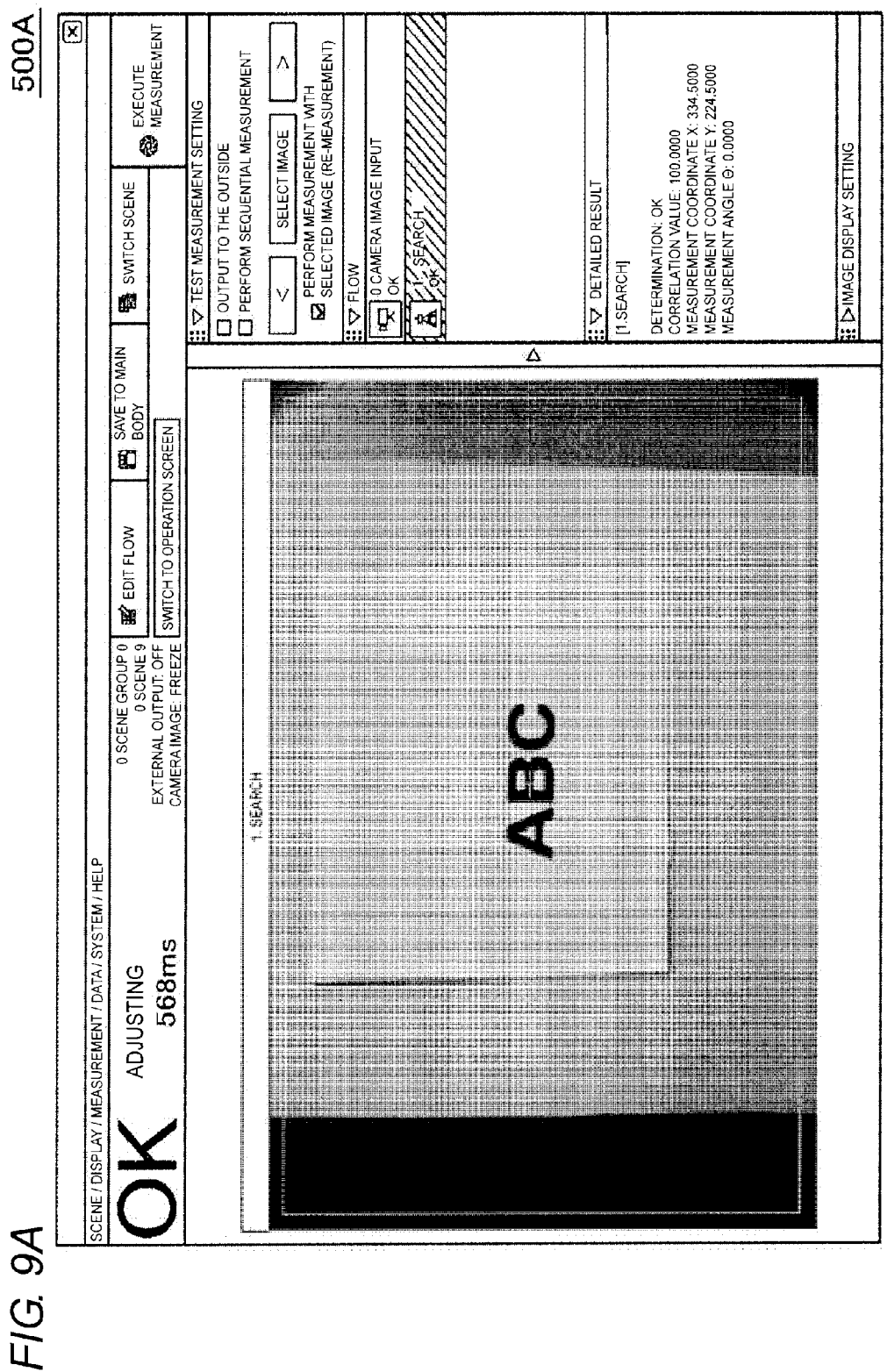
FIGS. 9A and 9B are diagrams showing an example of a screen display in an operating mode that is displayed on a monitor of the application processing apparatus according to the embodiment of the present invention.
Figure 9B:
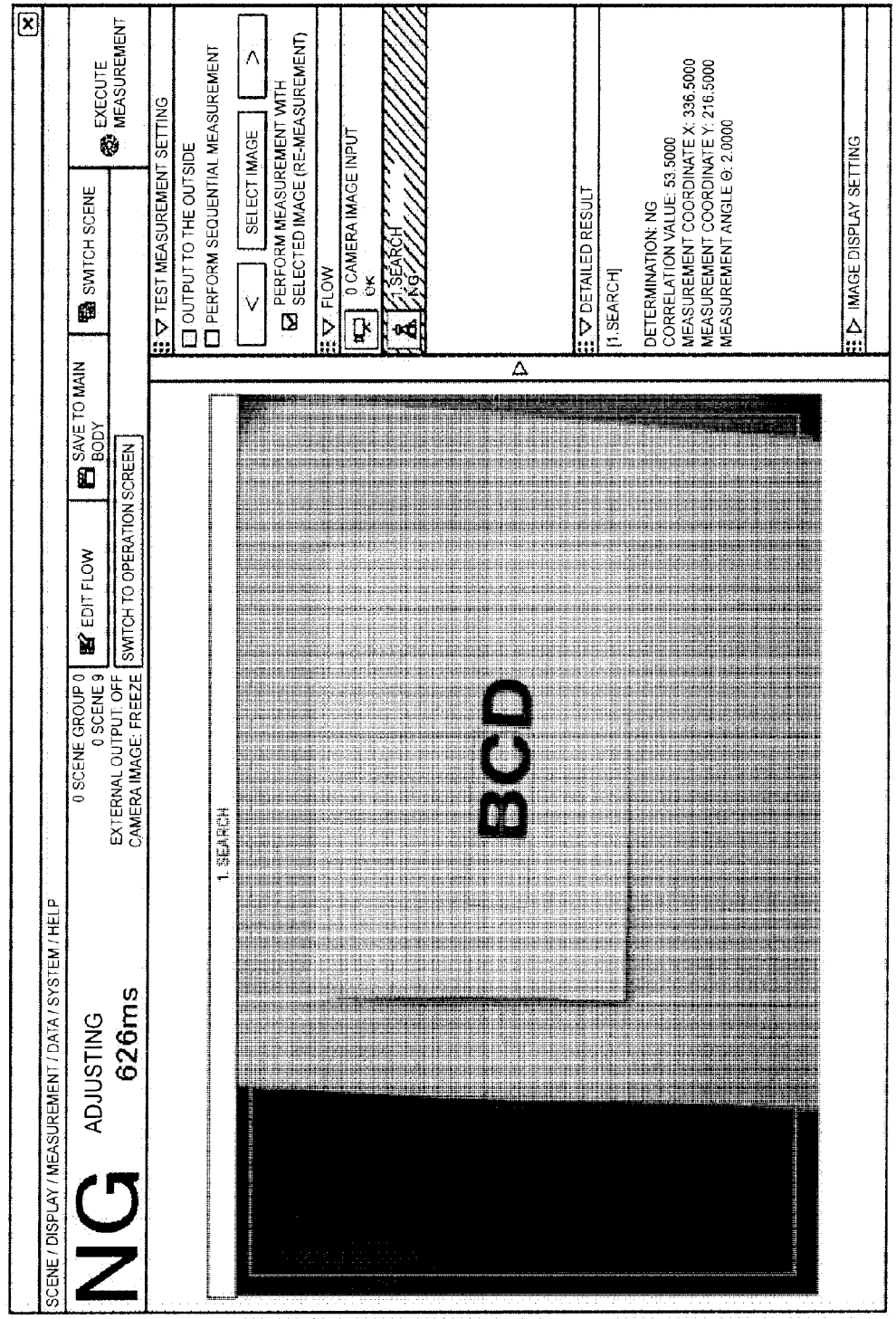

FIGS. 9A and 9B are diagrams showing an example of a screen display in an operating mode that is displayed on a monitor of the application processing apparatus 200 according to the embodiment of the present invention. In a case where, as shown in FIG. 9A, the image processing apparatus 200 receives a measurement image obtained by imaging a workpiece printed with the text string "ABC" included in the set model image MDL, a corresponding region is detected as a region having the highest degree of similarity (correlation value). At this time, the detected region must always be determined to be "matching OK" based on the degree of similarity (correlation value) thus measured. On the other hand, in a case where, as shown in FIG. 9B, the image processing apparatus 200 receives a measurement image obtained by imaging a workpiece printed with a text string "BCD" which is different from the text string "ABC" included in the set model image MDL, the detected region must be determined to be "matching NG".

Therefore, where the model image MDL including the text string "ABC" is set, the expected class of the measurement image shown in FIG. 9A is either "non-defective item (non-defective item image)" or "OK", and the expected class of the measurement image shown in FIG. 9B is either "defective item (defective item image)" or "NG".

As described above, in the support apparatus 100 according to the present embodiment, the expected class, which indicates whether each of the measurement images is either non-defective item or defective-item, is assumed to be already known.

The method for actually obtaining the measurement image in the adjusting phase of the parameters of the image processing apparatus 200 can be achieved by sequentially imaging test workpieces flowing in the production line. At this time, the user may confirm the content of each of the obtained measurement images and may input an expected class for each of the measurement images. Meanwhile, in order to save the trouble, it may be possible to carry out a more efficient method including the steps of: previously separating workpieces that should be detected as "non-defective items" from workpieces that should be detected as "defective items"; successively imaging the "non-defective" workpieces; and thereafter, successively imaging the "defective" workpieces. When this method is used, the measurement images obtained by imaging the "non-defective" workpieces and the measurement images obtained by imaging the "defective" workpieces are stored in different folders, so that the former and the latter can be easily distinguished from each other.

<User Interface for Evaluation Processing Application>

Subsequently, an example of a user interface provided by the evaluation processing application 20 (FIG. 7) of the support apparatus 100 will be described with reference to FIGS. 10 to 14. The display screens as shown in FIGS. 10 to 14 are provided by cooperation between the CPU 105 of the support apparatus 100 and a graphic board (not shown). This display screen is achieved by a GUI (Graphical User Interface) that is incorporated as a part of an OS (Operating System). Further, the GUI provides an environment in which the user sets various user settings by using the keyboard 103 and the mouse 104 to manipulate the cursor on the screen.

(1. Variation Setting)

Figure 10:
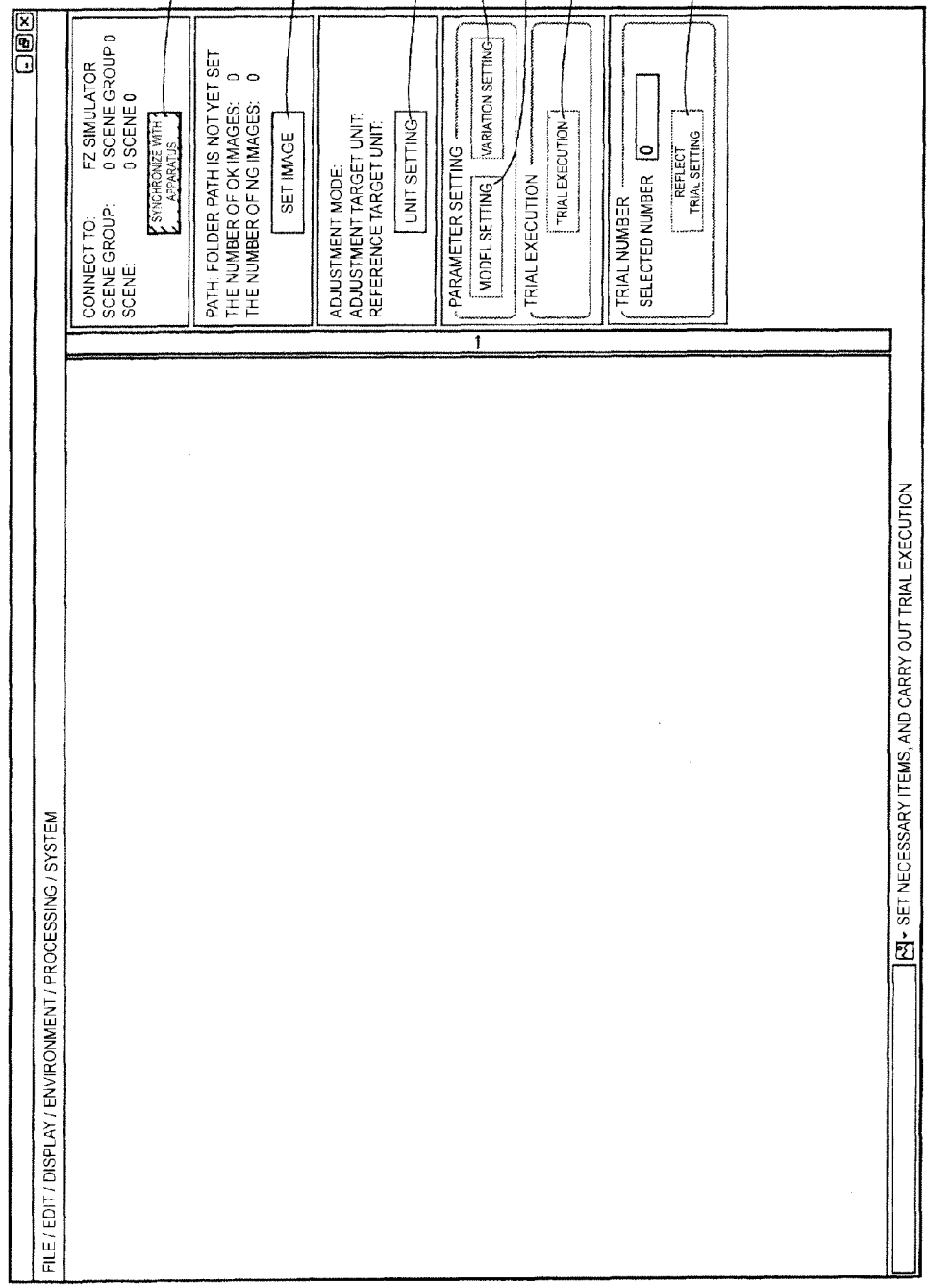
FIG. 10 is a diagram showing an example (1) of a user interface provided by an evaluation processing application of the support apparatus according to the embodiment of the present invention.

When the user instructs execution of the evaluation processing application 20 (FIG. 7) on the support apparatus 100, an input screen 400A is displayed as shown in FIG. 10. This input screen 400A displays a button 402 for synchronizing the evaluation processing application 20 and the image processing application 30, a button 404 for inputting a measurement image and an expected class associated with the measurement image, and a button 406 for specifying an object to be adjusted. The button 402, the button 404, and the button 406 are displayed in such a manner that these buttons can be selected.

When the user presses down the button 402 and the like by manipulating the mouse 104, a setting dialog (not shown) is displayed. The user selects, on this setting dialog, the image processing application 30 for executing trial. More specifically, the user selects one of the image processing application 30A implemented in the image processing apparatus 200 and the image processing application 30B implemented in the support apparatus 100, so that the selected one is adopted as the image processing application 30 used for executing trial. As a result of this selection, synchronization is established between the evaluation processing application 20 and the image processing application 30A or 30B.

Figure 11:
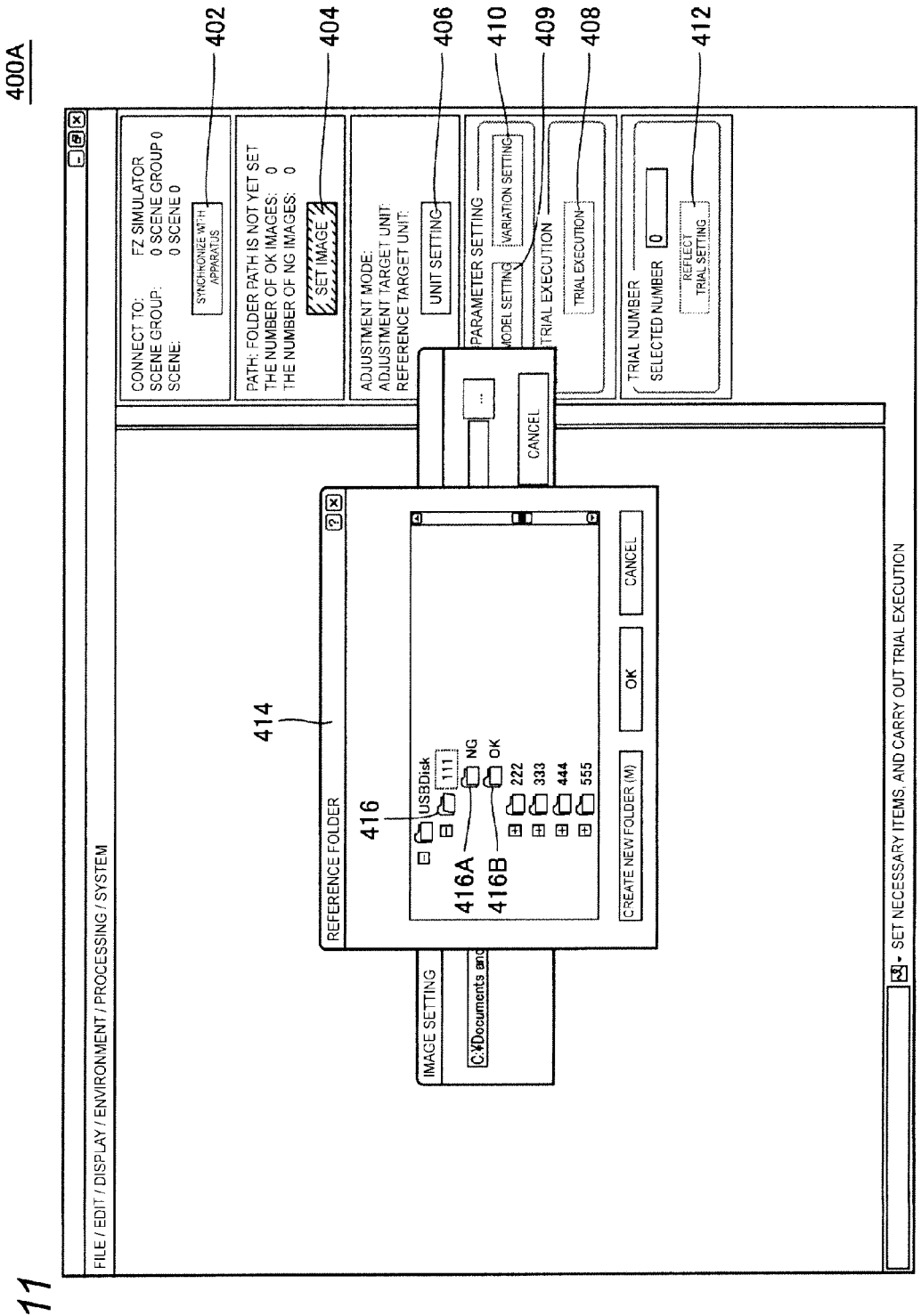
FIG. 11 is a diagram showing an example (2) of a user interface provided by an evaluation processing application of the support apparatus according to the embodiment of the present invention.

Referring to FIG. 11, when the user presses down the button 404 by manipulating the mouse 104 and the like, a dialog 414 and the like is displayed so as to allow the user to input a target measurement image and an expected class associated with the measurement image. In this case, each measurement image is assumed to exist as a single file, and these files respectively are stored in folders 416A and 416B classified according to the expected class (in this example, there are two classes, i.e., "non-defective item (OK)" and "defective item (NG)"). At this time, when the user specifies a folder 416 (in the example of FIG. 11, the folder name is "111") above the folders storing the target measurement images, it is specified that the measurement images in the "OK" folder 416A below the "111" folder 416 are associated with the expected class "non-defective item", and the measurement images in the "NG" folder 416B are associated with the expected class "defective item".

Another mode of the method for inputting a measurement image and the expected class associated with the measurement image will be described later.

Figure 12:
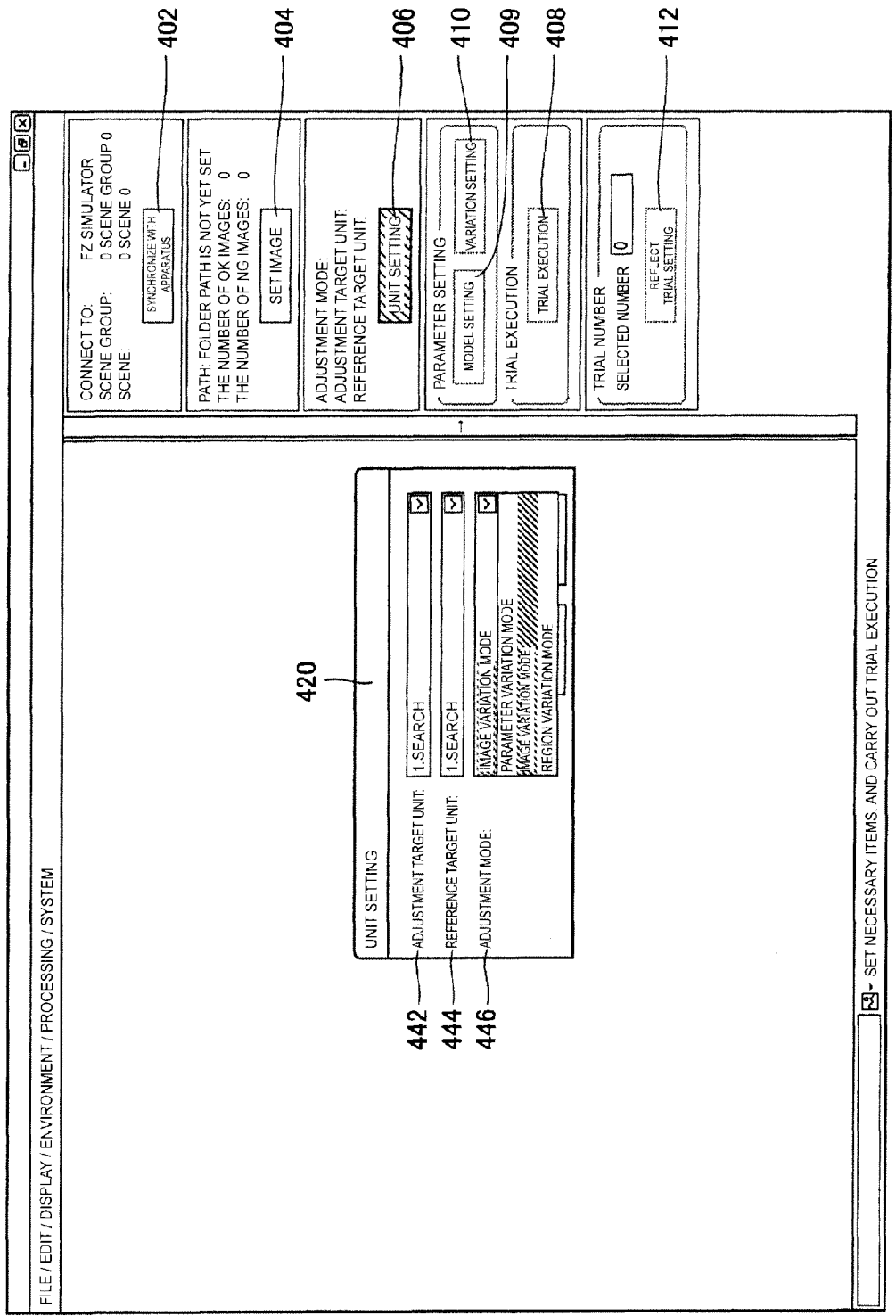
FIG. 12 is a diagram showing an example (3) of a user interface provided by an evaluation processing application of the support apparatus according to the embodiment of the present invention.

Referring to FIG. 12, when the user presses down the button 406 by manipulating the mouse 104 and the like, a dialog 420 is displayed so as to allow the user to input items to be subjected to the model image acquisition processing and parameters used for searching the optimum model image. This dialog 420 includes a pull down menu 442 for selecting a unit to be adjusted, a pull down menu 444 for selecting a unit to be referenced, and a pull down menu 446 for selecting an adjustment mode. The pull down menu 442 allows the user to specify the processing item to be adjusted using the model image. The pull down menu 444 allows the user to specify a processing item to be referenced when the processing is performed by using another image processing result. The pull down menu 446 allows the user to specify the adjustment mode. Typically, this adjustment mode includes a parameter variation mode, an image variation mode, and a region variation mode. The parameter variation mode is selected when the parameters related to the image processing are to be optimized. The image variation mode is selected when the model image used for the matching processing is to be optimized. The region variation mode is selected when a region extracted as the model image used for the matching processing is to be optimized.

As a result of this operation, the model image (initially set model image) already set for the selected matching processing and the current values of the related parameters are obtained. It should be noted that when the support apparatus 100 and the image processing apparatus 200 are connected with each other so that these units can communicate data with each other, the contents set in the image processing apparatus 200 are transferred to the support apparatus 100.

When the setting of the above contents is completed, the following buttons are displayed in such a manner that the buttons can be selected: a button 409 for setting/changing the initially set model image; a button 410 for setting a model image candidate to be subjected to trial; a button 408 for instructing start of trial; and a button 412 for causing the selected model image to be come into effect on the image processing apparatus 200.

Subsequently, when the user presses down the button 409 by manipulating the mouse 104 and the like, a dialog (not shown) is displayed to accept the selection of the initially set model image. The user operates this dialog to specify a file to be adopted as the initially set model image.

Subsequently, when the user presses down the button 410 by manipulating the mouse 104 and the like, a dialog (now shown) is displayed to accept the setting of the reference image. The user operates this dialog to specify a file to be adopted as the reference image. Typically, when a non-defective item image is used as the reference image, the user specifies a folder storing the non-defective item image. It is to be understood that when the reference image is prepared independently from the non-defective image, the file of this reference image may be directly specified. When the user specifies the reference image as described above, a dialog 430 as shown in FIG. 13 is displayed. This dialog 430 displays a table including a number field 432 and an image file path field 434. The number field 432 and the image file path field 434 show a list of image file names and file path names of the files that are to be adopted as the reference images. It should be noted that the number (ID) displayed in the number field 432 is identification information for identifying the reference image in internal process and is uniquely defined for each reference image.

Then, when the user presses down an addition trial button 422 by manipulating the mouse 104 and the like, the model images are extracted for the reference image set at that time, and trial numbers are internally allocated to the extracted model images. A number indication 426 of the number of reference images corresponding to the number of trials is updated according to these trial numbers internally allocated. Then, when a close button 424 is pressed down, the dialogue 430 is closed.

Further, when the user presses down a button 408 for instructing start of trial by manipulating the mouse 104 and the like, evaluation processing of the parameters starts according to the variation setting inputted from the dialog 430.

(2. Evaluation Result)

FIG. 4 shows an evaluation result screen 400B that is displayed when all of the trials have been completed. It should be noted that FIG. 14 shows the result after all of the trials have been completed. The present invention is not limited to this mode in which the result is displayed at once after the trials have been completed. Alternatively, a frame itself may be displayed as soon as the trial starts, and with the progress of the trials, corresponding numerical values may be successively displayed.

The evaluation result screen 400B outputs the evaluation result for each model image candidate. More specifically, the evaluation result screen 400B displays a table including a trial number field 452, a trial-completed field 454, a false detection field 456, a non-defective item image false detection field 458, a defective item image false detection field 460, a maximum measurement time field 462, a non-defective item image correlation value average field 464, a defective item image correlation value average field 466, a non-defective item image correlation value 3σ field 468, and a defective item image correlation value 3σ field 470.

The trial number field 452 displays, in an ascending order, the trial numbers allocated to the model image candidates generated earlier. The trial-completed field 454 displays checkboxes each of which indicates whether the trial of the corresponding model image candidate has been executed or not.

The false detection field 456, the non-defective item image false detection field 458, and the defective item image false detection field 460 display the total number of wrong detections in the evaluation result about the corresponding model image candidate. More specifically, the non-defective item image false detection field 458 displays the total number of times the non-defective item image is wrongly determined to be "defective item", and the defective item image false detection field 460 displays the total number of times the defective item image is wrongly determined to be "non-defective item". Further, the false detection field 456 displays a sum of both of the numbers of wrong detections.

The maximum measurement time field 462 displays the maximum value of the processing time measured in the execution stage of the trial of each model image candidate. When the processing is executed by the image processing application 30B of the support apparatus 100, this processing time may be different from the time actually measured in the image processing application 30A of the image processing apparatus 200, but corresponds to the processing time that is expected to be needed by the image processing apparatus 200 to generate the image processing result. When an optimum model image is selected from the model image candidates, the time displayed in this maximum measurement time field 462 serves as an index that is used to consider a tact time of an actual production line.

The non-defective item image correlation value average field 464, the defective item image correlation value average field 466, the non-defective item image correlation value 3σ field 468, and the defective item image correlation value 3σ field 470 display statistical output values with regard to the degree of similarity (correlation value) measured as a feature quantity of each of the measurement images. More specifically, the non-defective item image correlation value average field 464 displays an average value of the entire correlation values measured with respect to the plurality of non-defective item images that have been inputted. The defective item image correlation value average field 466 displays an average value of the entire correlation values measured with respect to the plurality of defective item images that have been inputted. The non-defective item image correlation value 3σ field 468 displays a 3σ value representing the degree of variations of the entire correlation values measured with respect to the plurality of non-defective item images that have been inputted. The defective item image correlation value 3σ field 470 displays a 3σ value representing the degree of variations of the entire correlation values measured with respect to the plurality of defective item images that have been inputted.

The evaluation result screen 400B outputs some of the model image candidates in which the feature quantities included in the corresponding processing result set are relatively high, in such a mode that is different from the mode in which the other model image candidates are outputted. In the example shown in FIG. 14, an asterisk mark 453 is attached to a trial number "4" in which the non-defective item image correlation average value is the highest.

As shown in FIG. 14, for each of the plurality of model image candidates that are subjected to the trials, the determination results and the statistical outputs are displayed as a list. As a result, the user can easily select the optimum model image. In general, the matching processing can be stably performed in a case where the non-defective item image correlation value is the highest and where the difference from the defective item image correlation value is the largest. In the example of FIG. 14, the model image of the trial number "4" is considered to be the optimum model image.

As described above, the user decides the optimum model image, and thereafter, the user inputs the trial number of the decided model image candidate by manipulating the mouse 104 and the like. Subsequently, when the user presses down the button 412 (FIG. 13), the selected model image comes into effect on the image processing apparatus 200.

As a result of such series of procedures, the user can swiftly and easily decide the model image used for the matching processing of the image processing apparatus 200.

<Method for Inputting Expected Class>

In the above description, the expected class is given to the folder name of the folder storing the measurement images. This method is an example of the method for inputting the expected class associated with the measurement image. Alternatively, the following method may be employed instead.

(1) Using Filename of Measurement Image

The expected class can be given by embedding a test string representing the expected class into a part of the filename of the measurement image. For example, the above non-defective item image may be given a filename "OK_xxx.jpg", and the defective item image may be given a filename "NG_xxx.jpg", so that both can be distinguished from each other. With such a method, the expected class can be independently inputted to the measurement image. When a correlation value and the like are inputted as the expected value, the correlation value can be inputted according to the same method.

(2) Using Header Section of Image File

The expected class can be given by embedding the expected class into the header section of the measurement image. For example, the jpeg format is prepared with the header section according to the Exif standard. Therefore, the classification of the expected class (either OK or NG) and/or the expected value can be stored in this header section.

(3) Using Definition File

The expected class can be inputted by preparing a definition file describing the expected class and/or the expected value of each measurement image in addition to the measurement image. This definition file describes the classification of the expected class (OK or NG) and numerical values and conditions representing the expected class in association with the identification information such as the filename of each measurement image. When this definition file is used, a plurality of expected classes can be defined for a single measurement image. For example, the matching processing of the text string "ABC" and the matching processing of the text string "BCD" are assumed to be successively performed on the same measurement image. In this case, the measurement image including the text string "ABC" is determined to be a non-defective item image by the matching processing of the text string "ABC", but is determined to be a defective item image by the matching processing of the text string "BCD". Therefore, when a plurality of matching processings are executed on the same measurement image, it is necessary to give an expected class for each of the processing items. In this case, the definition file is useful.

(4) Individual/Collective Setting Set by User

Especially, when the expected class indicating whether non-defective item or defective item is inputted to the measurement image, the expected class may be inputted when the measurement image is selected on the support apparatus 100. More specifically, when the user selects the target measurement image, the user selects whether the selected file/folder is non-defective item or defective item. At this time, when the selection is made in units of files, the expected class is individually given. When the selection is made in units of folders, the expected class is given collectively.

<Control Structure>

Figure 15:
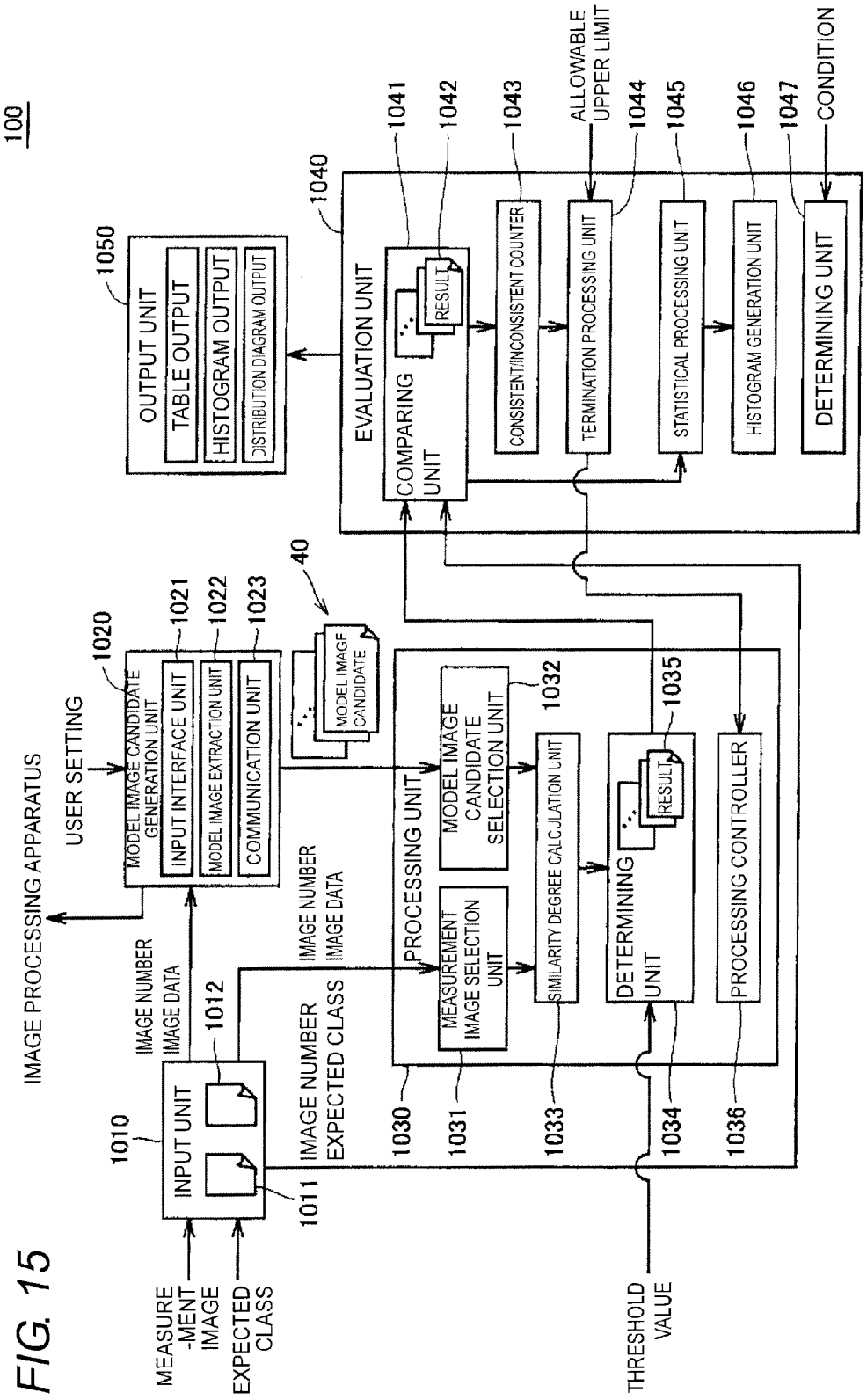
FIG. 15 is a functional block diagram showing a control structure of the support apparatus according to the embodiment of the present invention.

FIG. 15 is a functional block diagram showing a control structure of the support apparatus 100 according to the embodiment of the present invention. FIG. 15 is a structure (see FIG. 7A) in a case where the support apparatus 100 is implemented with the evaluation processing application 20 and the image processing application 30B. Typically, the control structure shown in FIG. 15 is provided by causing the CPU 105 of the support apparatus 100 to execute a program. FIGS. 16A to 16D are diagrams showing the structure of files generated by the control structure of the support apparatus 100 shown in FIG. 15.

Referring to FIG. 15, in the support apparatus 100 according to the present embodiment, the control structure includes an input unit 1010, a model image candidate generation unit 1020, a processing unit 1030, an evaluating unit 1040, and an output unit 1050. The evaluation processing application 20 provides the functions of the input unit 1010, the evaluating unit 1040, and the output unit 1050. The image processing application 30 provides the function of the processing unit 1030. The function of the model image candidate generation unit 1020 is provided by cooperation between the evaluation processing application 20 and the image processing application 30.

The input unit 1010 receives the target measurement image specified by the user and the expected class associated with each measurement image inputted by the user. The input unit 1010 can copy the specified measurement image to the input unit 1010, but when the input unit 1010 can access the specified measurement image, the input unit 1010 may obtain the target measurement image at a necessary timing and output the actual data thereof to the processing unit 1030. More specifically, the input unit 1010 generates, based on the specified measurement image, an image list 1011 in which the target measurement image is associated with an image number used internally, and also generates an expected class list 1012 in which the image number is associated with the expected class about the corresponding measurement image. As shown in FIG. 16A, the image list 1011 describes the position and the filename of the target measurement image in association with the image number. As shown in FIG. 16B, the expected class list 1012 describes the expected class (in this example, non-defective item (OK) or defective item (NG)) in association with the image number.

Figure 13:
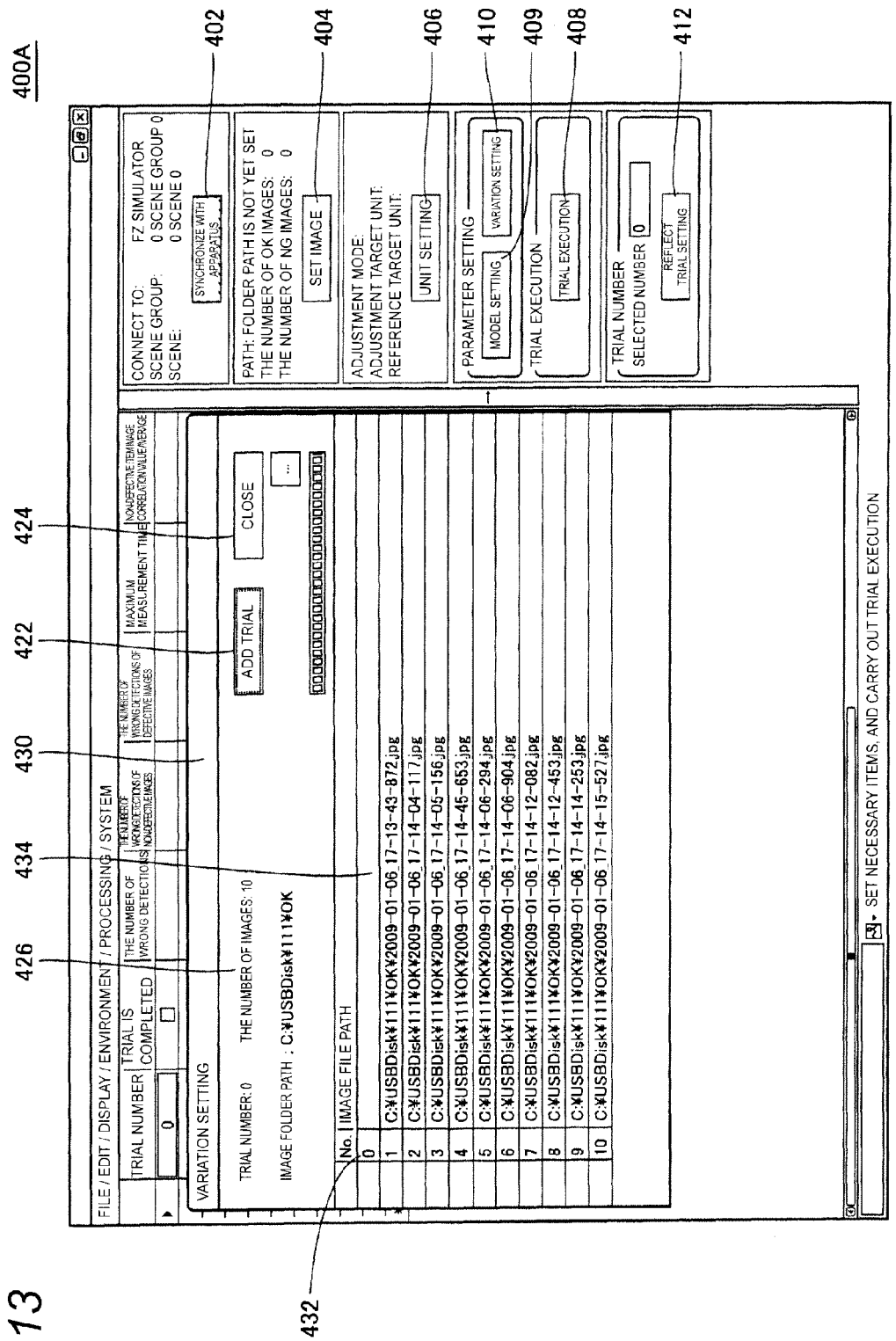
FIG. 13 is a diagram showing an example (4) of a user interface provided by an evaluation processing application of the support apparatus according to the embodiment of the present invention.

Subsequently, the model image candidate generation unit 1020 obtains the reference image (non-defective item image) from the input unit 1010 in response to user setting, and extracts a plurality of model image candidates 40. More specifically, the model image candidate generation unit 1020 includes an input interface unit 1021, a model image extraction unit 1022, and a communication unit 1023. The input interface unit 1021 displays a dialog 420 as shown in FIG. 12 and a dialog 430 as shown in FIG. 13 in accordance with user's operation. Further, the input interface unit 1021 outputs, to the model image extraction unit 1022, the change of settings inputted by the user with the dialogs 420 and 430. In other words, the input interface unit 1021 receives variation setting including a search range ARA from which the model image is extracted. The model image extraction unit 1022 extracts the plurality of model image candidates in accordance with this variation setting specified by the user. These model image candidates are outputted to the processing unit 1030.

The communication unit 1023 is adapted to communicate data with the image processing apparatus 200. In accordance with user's operation, the communication unit 1023 obtains the processing items, the initially-set model image, and the parameter values set in the image processing apparatus 200. Further, the communication unit 1023 can also transfer the model image, the parameter values, and the like decided by the support apparatus 100 to the image processing apparatus 200.

Subsequently, the processing unit 1030 generates a plurality of processing results by performing the matching processing on the specified measurement image in accordance with each of the plurality of model images. More specifically, the processing unit 1030 includes a measurement image selection unit 1031, a model image candidate selection unit 1032, a similarity degree calculation unit 1033, a determining unit 1034, and a processing controller 1036.

The processing of each unit in the processing unit 1030 is controlled by the processing controller 1036. More specifically when the input unit 1010 receives the plurality of measurement images and the expected classes respectively associated with the plurality of measurement images, the processing controller 1036 controls the measurement image selection unit 1031 and the model image candidate selection unit 1032 so as to sequentially output the results of the matching processing of each of the plurality of measurement images for each of the plurality of the model image candidates.

The measurement image selection unit 1031 sequentially selects the target measurement images provided by the input unit 1010 in accordance with the instruction given by the processing controller 1036, and outputs the target measurement images to the similarity degree calculation unit 1033. The model image candidate selection unit 1032 also sequentially selects the target model image candidates provided by the model image candidate generation unit 1020 in accordance with the instruction given by the processing controller 1036, and outputs the target model image candidates to the similarity degree calculation unit 1033.

The similarity degree calculation unit 1033 performs the matching processing on the measurement image selected by the measurement image selection unit 1031 based on the model image candidate selected by the model image candidate selection unit 1032, so as to calculate the degree of similarity (correlation value) of the target measurement image. The similarity degree calculation unit 1033 outputs the degree of similarity (correlation value) thus calculated to the determining unit 1034.

The determining unit 1034 generates a processing result about the target measurement image by comparing the degree of similarity (correlation value) calculated by the similarity degree calculation unit 1033 with a threshold value defined in advance. Typically, the determining unit 1034 determines "matching OK" where the degree of similarity (correlation value) is equal to or more than a threshold value. Otherwise, the determining unit 1034 determines "matching NG".

The determining unit 1034 generates not only the degree of similarity (correlation value) calculated by the similarity degree calculation unit 1033, but also a determination result list 1035 showing the determination result. As shown in FIG. 16C, the determination result list 1035 describes the degree of similarity and the determination result (in this case, either OK or NG) of the target measurement image in association with the image number. It should be noted that the determination result list 1035 is generated for each of the model image candidates subjected to the trial.

The processing controller 1036 gives instruction to the measurement image selection unit 1031 and the model image candidate selection unit 1032 in accordance with the trial performed on the model image candidates.

Subsequently, the evaluating unit 1040 generates an evaluation result by evaluating each of the plurality of processing results generated for each of the model image candidates based on the expected class associated with the measurement image. More specifically, the evaluating unit 1040 includes a comparing unit 1041, a consistent/inconsistent counter 1043, a termination processing unit 1044, a statistical processing unit 1045, a histogram generation unit 1046, and a deciding unit 1047.

The comparing unit 1041 compares the expected class of each measurement image obtained from the input unit 1010 and the determination result generated by the determining unit 1034, and evaluates whether the contents thereof are the same or not. More specifically, the comparing unit 1041 generates an evaluation result list 1042 representing the evaluation results in association with the image number. As shown in FIG. 15D, the evaluation result list 1042 describes a relationship between the expected class and the determination result of the target measurement image in association with the image number. Examples of this description include "OK-OK" which means that the evaluation result of the measurement image having the expected class "non-defective item (OK)" is determined to be "non-defective item (OK)", and "OK-NG" which means that the evaluation result of the measurement image having the expected class "non-defective item (OK)" is determined to be "defective item (NG)". Alternatively, this description may include only an indication as to whether the results are consistent or inconsistent. In a case where both are inconsistent, that is, when a false determination occurs, it is impossible to analyze the details thereof. In view of this problem, it is preferable to also record the classification thereof. It should be noted that the evaluation result list 1042 is generated for each model image candidate subjected to the trial.

The consistent/inconsistent counter 1043 calculates the degree of consistency, with the corresponding expected class, of each of the plurality of evaluation results included in the evaluation result list 1042 generated by the comparing unit 1041. More specifically, the consistent/inconsistent counter 1043 counts the number of the evaluation results included in the evaluation result list 1042 that are inconsistent with the corresponding expected class (namely, counts the number of the evaluation results that have been falsely detected). It is preferable to separately count the number of the evaluation results in which the "non-defective item (OK)" measurement image is wrongly determined to be "defective item (NG)" and the number of the evaluation results in which the "defective item (NG)" measurement image is wrongly determined to be "non-defective item (OK)".

The termination processing unit 1044 receives an allowable upper limit specified by the user. When the number of the processing results that are inconsistent with the corresponding expected class is determined to be more than the specified allowable upper limit during generation of the processing result of the measurement images for any one of the model image candidates, the termination processing unit 1044 terminates the generation of the processing result of the remaining measurement images for the model image candidate in question. This allowable upper limit is set according to the stability required in the image processing apparatus in question. This is because, as soon as the number of false detections exceeds the allowable upper limit, it is determined that stable image processing cannot be performed with this model image candidate, and therefore it is not necessary to perform any further evaluation. As described above, the trial of the clearly inappropriate model image candidate is terminated based on the request of the application destination, and therefore, it is possible to reduce the total processing time for the entire trials. The termination processing unit 1044 gives a termination instruction to the processing controller 1036 of the processing unit 1030.

Alternatively, in a certain trial, evaluation may be performed on a certain number of measurement images, and when the average value of the result and the like is worse than the result of the trial executed earlier, the generation of the processing result for this trial may be terminated.

The statistical processing unit 1045 calculates statistical output about the evaluation result calculated by the processing unit 1030. More specifically, the statistical processing unit 1045 calculates, for each of the model image candidates, statistical amounts (for example, average value, intermediate value, maximum value, minimum value, distributed value, standard deviation, and the like) of the correlation values included in the determination result list 1035 calculated by the similarity degree calculation unit 1033.

The histogram generation unit 1046 generates, for each of the model image candidates, data of histogram (frequency distribution) in which the feature quantities are separated into predetermined sections, based on the statistical amounts calculated by the statistical processing unit 1045.

In accordance with the conditions specified by the user, the deciding unit 1047 decides an optimum model image candidate from among the model image candidates generated by the model image candidate generation unit 1020. More specifically, the deciding unit 1047 receives the conditions that the evaluation result must satisfy, and decides the model image candidate that is most suitable for the specified condition from among the processing results generated by performing the processing according to each of the plurality of model image candidates. The processing performed by this deciding unit 1047 will be described later.

Subsequently, The output unit 1050 outputs the evaluation result generated by the evaluating unit 1040 for each of the plurality of model image candidates. More specifically, the output unit 1050 prepares various kinds of output modes, which include, for example, the table output function, the histogram output function, the distribution figure output function, and the like which have been described above. These output modes can be switched by user operation as necessary. The table output function of the output unit 1050 includes outputting the degree of consistency of the evaluation result calculated by the consistent/inconsistent counter 1043 with the corresponding expected class and the number of the processing results that are inconsistent with the corresponding expected class. Further, this table output function of the output unit 1050 includes outputting the processing time measured with the evaluation result.

Further, the output unit 1050 may include, as the table output function, outputting one of the model image candidates in which the feature quantity (correlation value) included in the corresponding processing result set is relatively high, in such a mode that is different from the mode in which the other model image candidates are outputted. More specifically, it is preferable to output the model image candidate having the highest average value of the correlation values in a conspicuous manner, e.g., displaying the model image candidate in red color or blinking the model image candidate. This is because the high feature quantity (correlation value) means that the feature of the measurement image can be successfully extracted by the image processing according to the model image candidate, and the user is prompted to preferentially select the above-described model image candidate.

<Condition Specification>

Subsequently, an example of an input interface for inputting a condition according to which the deciding unit 1047 (FIG. 15) of the evaluating unit 1040 selects an optimum image of the model image candidates will be described with reference to FIG. 17.

Figure 17:
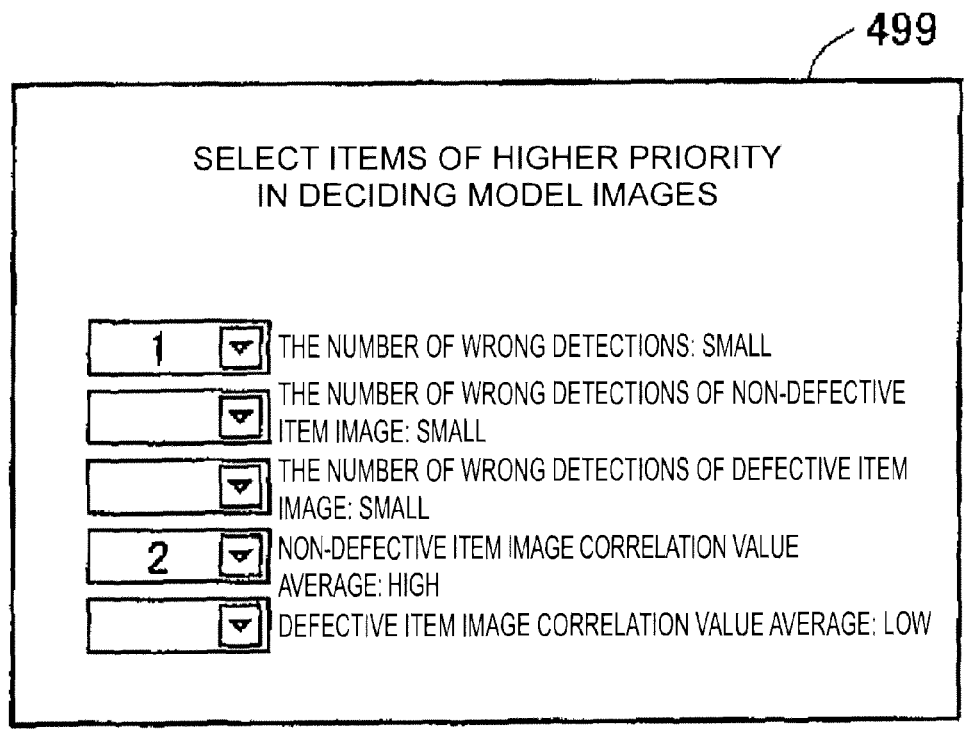
FIG. 17 is a diagram showing an example of a condition input interface which a user uses to select an optimum model image from among model image candidates in the support apparatus according to the embodiment of the present invention.
Figure 18:
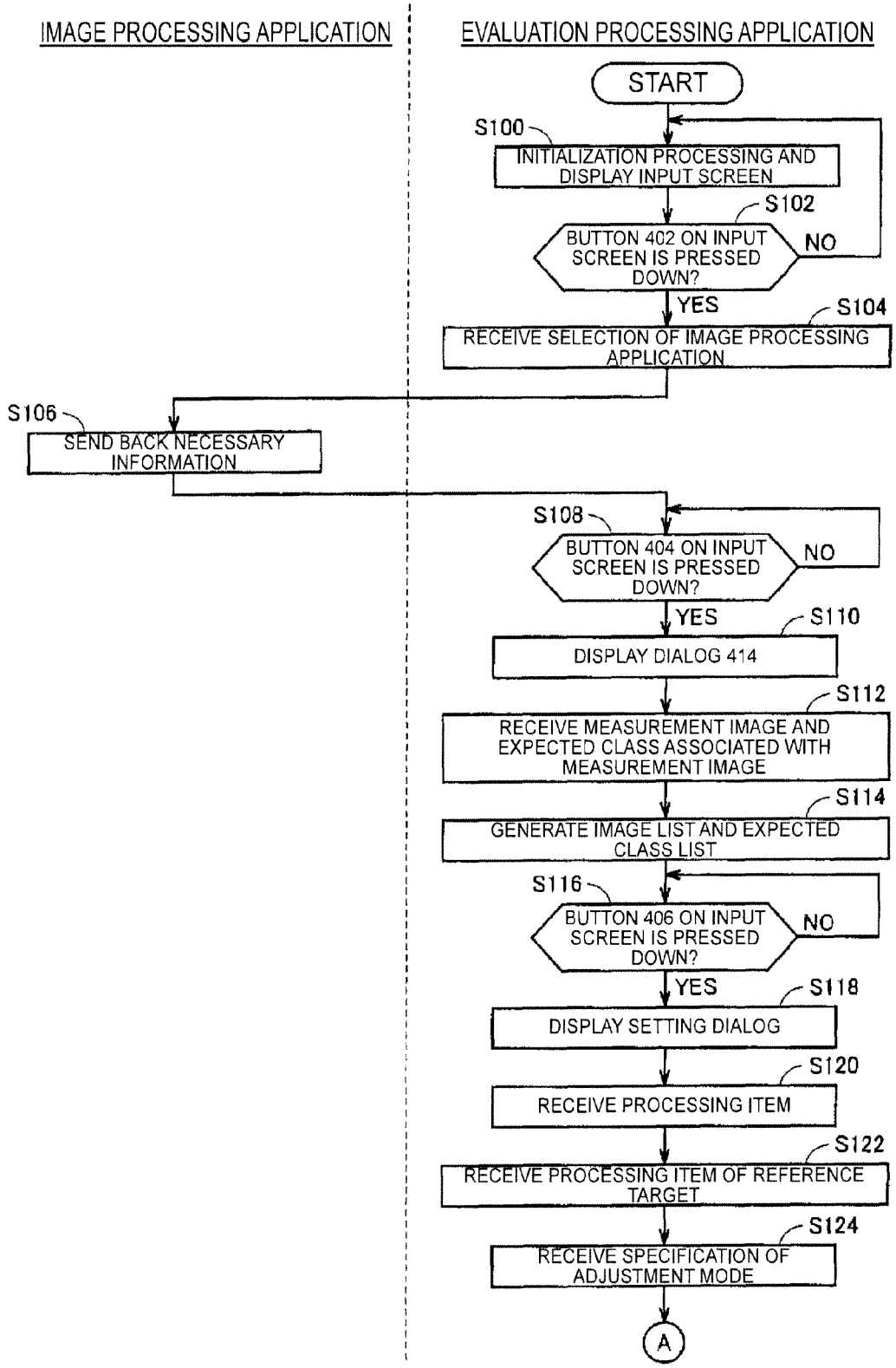
FIG. 18 is a flowchart (1) showing the entire processing of the system according to the embodiment of the present invention.
Figure 19:
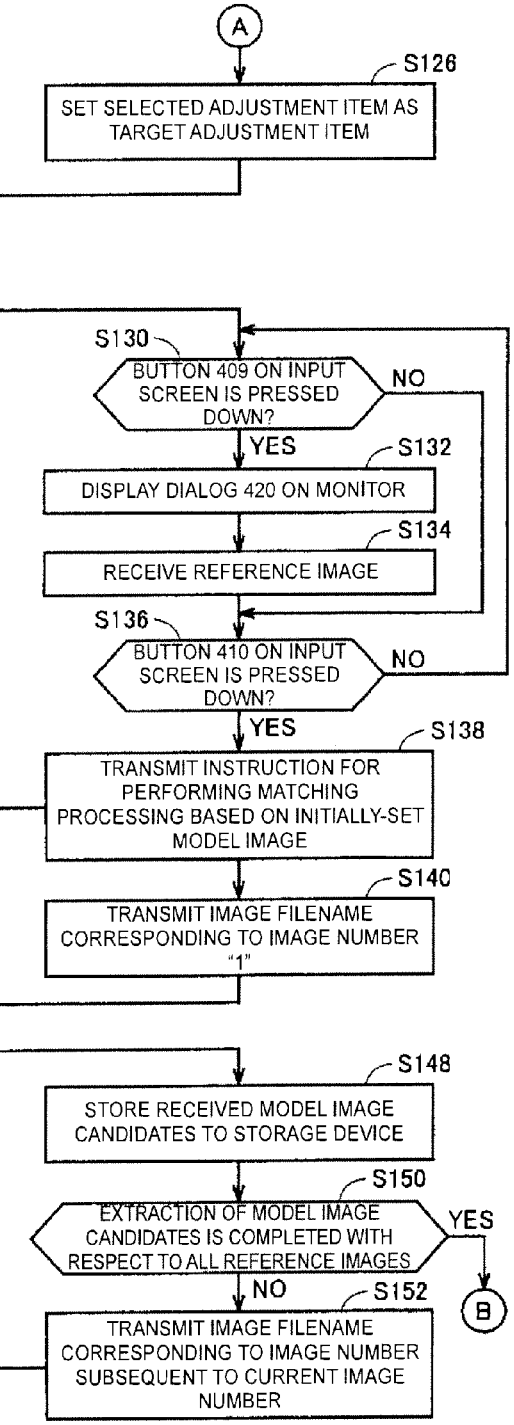
FIG. 19 is a flowchart (2) showing the entire processing of the system according to the embodiment of the present invention.
Figure 20:
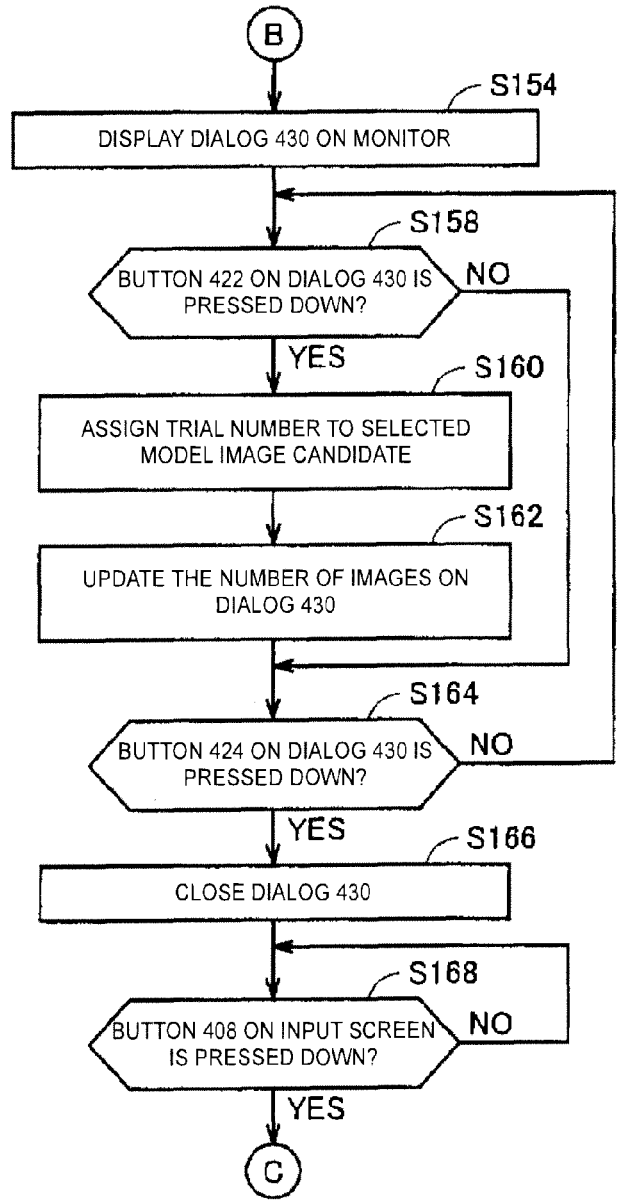
FIG. 20 is a flowchart (3) showing the entire processing of the system according to the embodiment of the present invention.

After the user sets the model image candidate on the dialog 420 shown in FIG. 13 as described above, the user uses a dialog 499 as shown in FIG. 17 to set which item is given priority over other items. The dialog 499 displays a list of items outputted to the evaluation result screen 400B shown in FIG. 14, and the user can manipulate the pull down menu to give a priority order, which indicates whether an item is given priority or not, to necessary items. In the example shown in FIG. 17, "the number of false detection: small" is given a priority order "1", and "non-defective item image correlation average value: high" is given a priority order "2".

When the conditions as shown in FIG. 17 are set, the deciding unit 1047 references the evaluation result for each of the generated model image candidates, and searches model image candidates of which the number of false detections is small. When this search result includes one model image candidate, the found model image candidate is decided as an optimum parameter set. On the other hand, when the search result narrowed by only the condition of the number of false detections includes more than one model image candidate, one of the found model image candidates of which the non-defective item image correlation average value is the highest is decided as the optimum model image.

Not only the method using the user interface as shown in FIG. 17 but also various other methods may be employed as the method for allowing the user to set the conditions.

<Processing Procedure>

FIGS. 18 to 22 are flowcharts showing the entire process performed by the system according to the embodiment of the present invention. Typically, the flowcharts of FIGS. 18 to 22 are carried out by causing the CPU 105 of the support apparatus 100 to load programs previously stored in the fixed disk 107 and the like into the memory 106 and execute the loaded programs. For the sake of clarifying the subject that executes each processing, the evaluation processing application 20 and the image processing application 30 are distinguished from each other in the flowcharts of FIGS. 18 to 22, but the evaluation processing application 20 and the image processing application 30 may be integrated into one application, and the application may be executed. Alternatively, as described above, the support apparatus 100 may use the image processing application 30A implemented on the image processing apparatus 200. In this case, the system including the support apparatus 100 and the image processing apparatus 200 according to the present embodiment corresponds to the model image acquisition support apparatus according to the present invention. It should be noted that in this case, the CPU 205 of the image processing apparatus 200 also achieves the function of the image processing application 30A by loading programs previously stored in the fixed disk 207 into the memory 206 and executing the loaded programs.

Referring to FIGS. 18 to 22, first, when an instruction for activating the apparatus is given, the evaluation processing application 20 (corresponding to the CPU 105 of the support apparatus 100 (FIG. 2); the same applies hereinafter) executes the initialization processing, and thereafter displays the input screen 400A shown in FIG. 10 on the monitor 102 (step S100). Subsequently, the evaluation processing application 20 determines whether the button 402 on the input screen 400A is pressed down (step S102). When the button 402 is not pressed down (NO in step S102), the processing of step S102 is repeated.

When the button 402 is pressed down (YES in step S102), the evaluation processing application 20 receives a selection made by the image processing application 30 for executing trial (step S104). When the image processing application 30 is selected, the evaluation processing application 20 executes a synchronization establishing process in order to establish synchronization with the selected image processing application 30. More specifically, the evaluation processing application 20 transmits a synchronization establishing request to the selected image processing application 30. The selected image processing application 30 responds to this synchronization establishing request, and the image processing application 30 (corresponding to the CPU 105 of the support apparatus 100 (FIG. 2) or the CPU 205 of the image processing apparatus 200 (FIG. 3); the same applies hereinafter) returns necessary information to the evaluation processing application 20 (step S106). The synchronization therebetween is established upon this response of data transmitted from the image processing application 30.

Subsequently, the evaluation processing application 20 determines whether the button 404 on the input screen 400A is pressed down (step S108). When the button 404 is not pressed down (NO in step S108), the processing of step S108 is repeated.

When the button 404 is pressed down (YES in step S108), the evaluation processing application 20 displays the dialog 414 as shown in FIG. 11 on the monitor 102 (step S110). Subsequently, the evaluation processing application 20 receives the target measurement image and the expected class associated with the measurement image (step S112). More specifically, the user specifies an "OK" folder containing the measurement images associated with the "non-defective item" expected class, and further specifies, as necessary, an "NG" folder containing the measurement images associated with the "defective item" expected class. It should be noted that in the model image acquisition support apparatus according to the present embodiment, a model image can be decided as long as at least a non-defective item image exists. Therefore, it is not always necessary to specify a defective item image.

When the measurement image is set, the evaluation processing application 20 generates the image list 1011 (FIG. 16A) in which the target measurement image and the image number internally used are associated with each other, and the evaluation processing application 20 generates the expected class list 1012 (FIG. 16B) in which the image number and the expected class about the corresponding measurement image are associated with each other (step S114). Then, the evaluation processing application 20 closes the dialog 414.

Subsequently, the evaluation processing application 20 determines whether the button 406 on the input screen 400A is pressed down (step S116). When the button 406 is not pressed down (NO in step S116), the processing of step S116 is repeated.

When the button 406 is pressed down (YES in step S116), the evaluation processing application 20 displays, on the monitor 102, the dialog 420 (FIG. 12) that is used for inputting items to be subjected to the model image acquisition processing and parameters for searching the optimum model image (step S118). Subsequently, the evaluation processing application 20 receives a processing item, to be adjusted using the model image, that is specified by the user with the pull down menu 442 (step S120). Further, the evaluation processing application 20 receives a processing item, to be referenced in the processing using another image processing result, that is inputted by the user with the pull down menu 444 (S122). Further, the evaluation processing application 20 receives the adjustment mode inputted by the user with the pull down menu 446 (step S124).

After the user inputs the item to be subjected to the model image acquisition processing and the parameters for searching the optimum model image, the evaluation processing application 20 requests the initially-set model image and the parameter value from the selected image processing application 30 (step S126). In response to this request, the image processing application 30 returns the currently set model image (initially-set model image) and the current values of the related parameters to the evaluation processing application 20 (step S128).

Subsequently, the evaluation processing application 20 determines whether the button 409 on the input screen 400A is pressed down (step S130). When the button 409 is not pressed down (NO in step S130), the processing in step S136 is subsequently executed.

When the button 409 is pressed down (YES in step S130), the evaluation processing application 20 displays the dialog 430 as shown in FIG. 12 on the monitor 102 (step S132). Subsequently, the evaluation processing application 20 receives the reference images from which the model image is to be extracted (step S134). More specifically, the user manipulates the mouse 104 and the like to set a file containing the reference image from which the model image is to be extracted. When this setting is completed, the evaluation processing application 20 closes the dialog 430.

Subsequently, the evaluation processing application 20 determines whether the button 410 on the input screen 400A is pressed down (step S136). When the button 410 is not pressed down (NO in step S136), the processing of step S130 is repeated.

When the button 410 is pressed down (YES in step S136), the evaluation processing application 20 extracts the plurality of model image candidates from the reference image as described below. More specifically, the evaluation processing application 20 obtains a list of filenames of the specified reference images, and thereafter instructs the image processing application 30 to perform the matching processing based on the initially-set model image (step S138). In this case, the evaluation processing application 20 may attach information for specifying, e.g., the region in which the model images are extracted from the reference image (search range). Further, the evaluation processing application 20 gives the image filename corresponding to the reference image having the image number "1" to the image processing application 30 (step S140). In other words, the evaluation processing application 20 causes the image processing application 30 to search and extract the plurality of model image candidates from among the references images of non-defective item images, based on the initially-set model image.

The image processing application 30 responds to the notification given by the evaluation processing application 20, and loads the specified measurement images (step S142). Subsequently, the image processing application 30 executes the matching processing on the loaded measurement images, based on the initially-set model image that are currently set, thus extracting the model image candidates (step S144). Thereafter, the image processing application 30 sends the extracted model image candidates back to the evaluation processing application 20 (step S146).

The evaluation processing application 20 stores the model image candidates received from the image processing application 30 to a storage device (the memory 106 and/or the fixed disk 107) (step S148). Subsequently, the evaluation processing application 20 determines whether an extraction process of the model image candidates has been completed with respect to all of the reference images (typically, "non-defective item" measurement images) (step S150). When the extraction process of the model image candidates has not yet been completed with respect to all of the reference images (NO in step S150), the evaluation processing application 20 references the image list 1011, and gives the image filename corresponding to an image number subsequent to the current image number to the image processing application 30 (step S152). Thereafter, the processing of step S142 and subsequent steps are repeated.

When the extraction process of the model image candidates has been completed with respect to all of the reference images (NO in step S150), the evaluation processing application 20 displays the dialog 430 as shown in FIG. 13 on the monitor 102 (step S154).

Subsequently, the evaluation processing application 20 determines whether the button 422 on the dialog 430 is pressed down (step S158). When the button 422 is pressed down (YES in step S158), the evaluation processing application 20 assigns a trial number to the selected model image candidate (step S160). In other words, the evaluation processing application 20 associates the trial number and the selected model image candidate in the model image candidates stored in the storage device. Subsequently, the evaluation processing application 20 updates the number indication 426 on the dialog 430 in accordance with the assigned trial number (step S162).

When the button 422 is not pressed down (NO in step S158), or after the processing of step S162 is performed, the evaluation processing application 20 determines whether the button 424 on the dialog 430 is pressed down (step S164). When the button 424 is not pressed down (NO in step S164), the processing of step S156 and subsequent steps are repeated. On the other hand, when the button 424 is pressed down (YES in step S164), the evaluation processing application 20 closes the dialog 430 (step S166).

Subsequently, the evaluation processing application 20 determines whether the button 408 on the input screen 400A is pressed down (step S168). When the button 408 is not pressed down (NO in step S168), the processing in step S168 is repeated.

When the button 408 is pressed down (YES in step S168), the evaluation processing application 20 starts trial on the plurality of model image candidates as described below. More specifically, the evaluation processing application 20 loads the model image candidate corresponding to the smallest trial number (trial number [0]) from the storage device (step S170). Subsequently, the evaluation processing application 20 instructs the image processing application 30 to perform the matching processing based on the loaded model image candidate and the model image candidate (step S172). Further, the evaluation processing application 20 references the image list 1011, and gives the image filename corresponding to the image number "1" to the image processing application 30 (step S174). In other words, the evaluation processing application 20 causes the image processing application 30 to execute the matching processing based on the model image candidate.

The image processing application 30 responds to the notification given by the evaluation processing application 20, and loads the specified measurement image (step S176). Subsequently, the image processing application 30 executes the matching processing on the loaded measurement image based on the model image candidates received from the evaluation processing application 20 (step S178). Thereafter, the image processing application 30 sends the degree of similarity obtained from the matching processing back to the evaluation processing application 20 (step S180).

The evaluation processing application 20 stores the degree of similarity received from the image processing application 30 as the determination result list 1035 to the storage device, wherein the degree of similarity is associated with the trial number and the image number (step S182). The evaluation processing application 20 compares the received degree of similarity with a previously set threshold value, and calculates a determination result of the target measurement image, which is additionally written to the determination result list 1035 (step S184). Further, the evaluation processing application 20 compares the calculated determination result with the expected class associated with the target measurement image, and stores the evaluation result as the evaluation result list 1042 to the storage device, wherein the evaluation result is associated with the trial number and the image number (step S186).

Subsequently, the evaluation processing application 20 references the image list 1011, determines whether trial of the current model image candidate has been completed with respect to all of the measurement images (step S188). When the trial has not yet been completed with respect to all of the measurement images (NO in step S188), the evaluation processing application 20 references the image list 1011, and gives the image filename of the measurement image corresponding to an image number subsequent to the current image number to the image processing application 30 (step S190). Thereafter, the processing of step S176 and subsequent steps are repeated.

When the trial has been completed with respect to all of the measurement images (YES in step S188), the evaluation processing application 20 references the determination result list 1035 and the evaluation result list 1042, and calculates statistical amounts of the evaluation result and the degree of similarity calculated with the current trial number (step S192).

Subsequently, the evaluation processing application 20 determines whether the trial has been completed with respect to all of the model image candidates to be subjected to the trial (step S194). When the trial has not yet been completed with respect to all of the model image candidates to be subjected to the trial (NO in step S194), the evaluation processing application 20 loads the model image candidates corresponding to a trial number subsequent to the current trial number from the storage device (step S196). Thereafter, the processing of step S174 and subsequent steps are repeated.

When the trial has been completed with respect to all of the model image candidates to be subjected to the trial (YES in step S194), the evaluation processing application 20 decides the optimum model image based on the calculated degree of similarity and/or the evaluation result (step S198). Subsequently, the evaluation processing application 20 displays an evaluation result screen as shown in FIG. 14 on the monitor 102, based on the degree of similarity, the evaluation result, and the statistical amounts thereof which are calculated for each of the trial numbers (step S200).

Subsequently, the evaluation processing application 20 determines whether the button 412 on the input screen 400A is pressed down (step S202). When the button 412 is pressed down (YES in step S202), the evaluation processing application 20 transfers the selected model image candidate to the image processing application 30A of the connected image processing apparatus 200 (step S204). The image processing application 30 adopts the received model image candidate as a new model image (step S206).

When the button 412 is not pressed down (NO in step S202), or after the processing of step S206 is performed, the evaluation processing application 20 determines whether an instruction is given to terminate the evaluation processing application 20 (step S208). When the instruction is not given to terminate the evaluation processing application 20 (NO in step S208), the processing of step S202 and subsequent steps are repeated.

When the instruction is given to terminate the evaluation processing application 20 (YES in step S208), the processing is terminated.

<Effects of Present Embodiment>

According to the embodiment of the present invention, when the user simply specifies the reference image from which the model images are extracted, the model image candidates are extracted from each of the reference images, and evaluation results obtained from the matching process actually performed using the model image candidates thus extracted are displayed as a list. Therefore, the user can easily select an optimum model image based on the evaluation result displayed as the list.

In other words, the user only needs to specify the reference image that can be the model image, and the model image acquisition support apparatus automatically executes the processing for the other images. Therefore, it is not necessary for the user to stay at the scene to perform adjustment for a long time. Consequently, even when there are many reference images which can be possibly employed as model images, it is possible to swiftly and easily decide the optimum model image.

Further, the evaluation results are displayed as a list in such a manner that the statistical evaluation results about the model image candidates can be compared with each other. Therefore, regardless of the experience of the worker, the optimum model image can be decided objectively. Thus, a worker having knowledge to some extent can decide the appropriate model image in almost the same manner as a highly-skilled worker.

<First Modification>

In the flowchart showing the entire processing performed by the support apparatus 100 according to the above embodiment, each of the model image candidates is set, and thereafter the matching processing is sequentially executed on the target measurement image. Alternatively, the target measurement image may be loaded in advance, and thereafter, the matching processing may be sequentially executed based on each of the model image candidates (first modification). This method is useful for an environment in which it takes much time to load and transfer the measurement image and is also useful for a case where new measurement images are obtained by imaging workpieces flowing in the production line while at the same time the model image candidates are evaluated.

Figure 21:
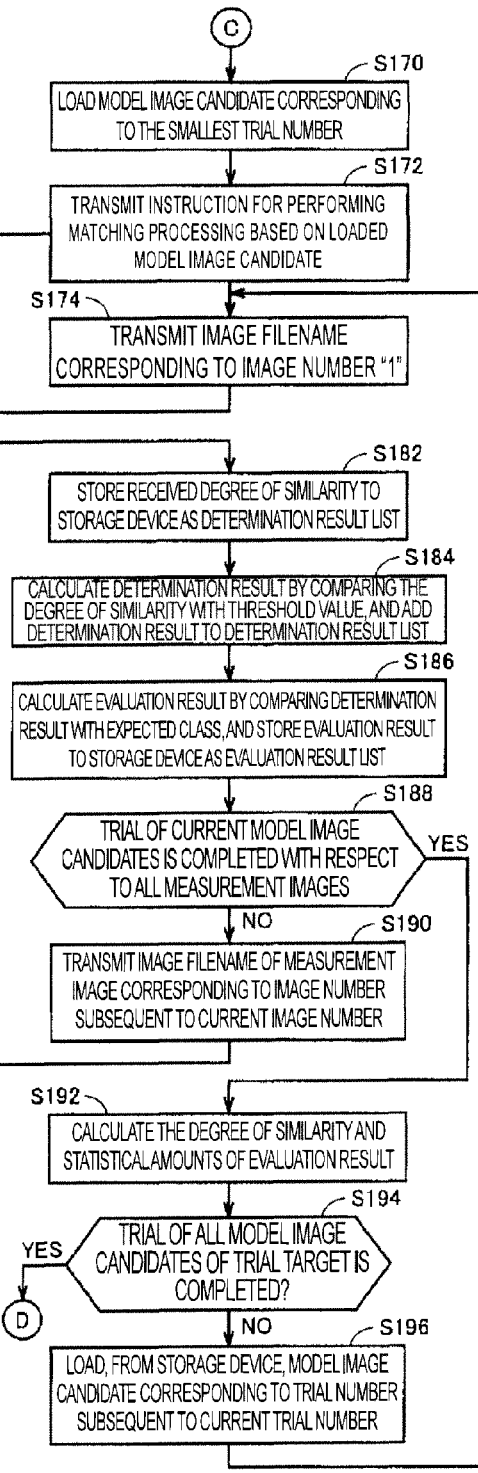
FIG. 21 is a flowchart (4) showing the entire processing of the system according to the embodiment of the present invention.
Figure 22:
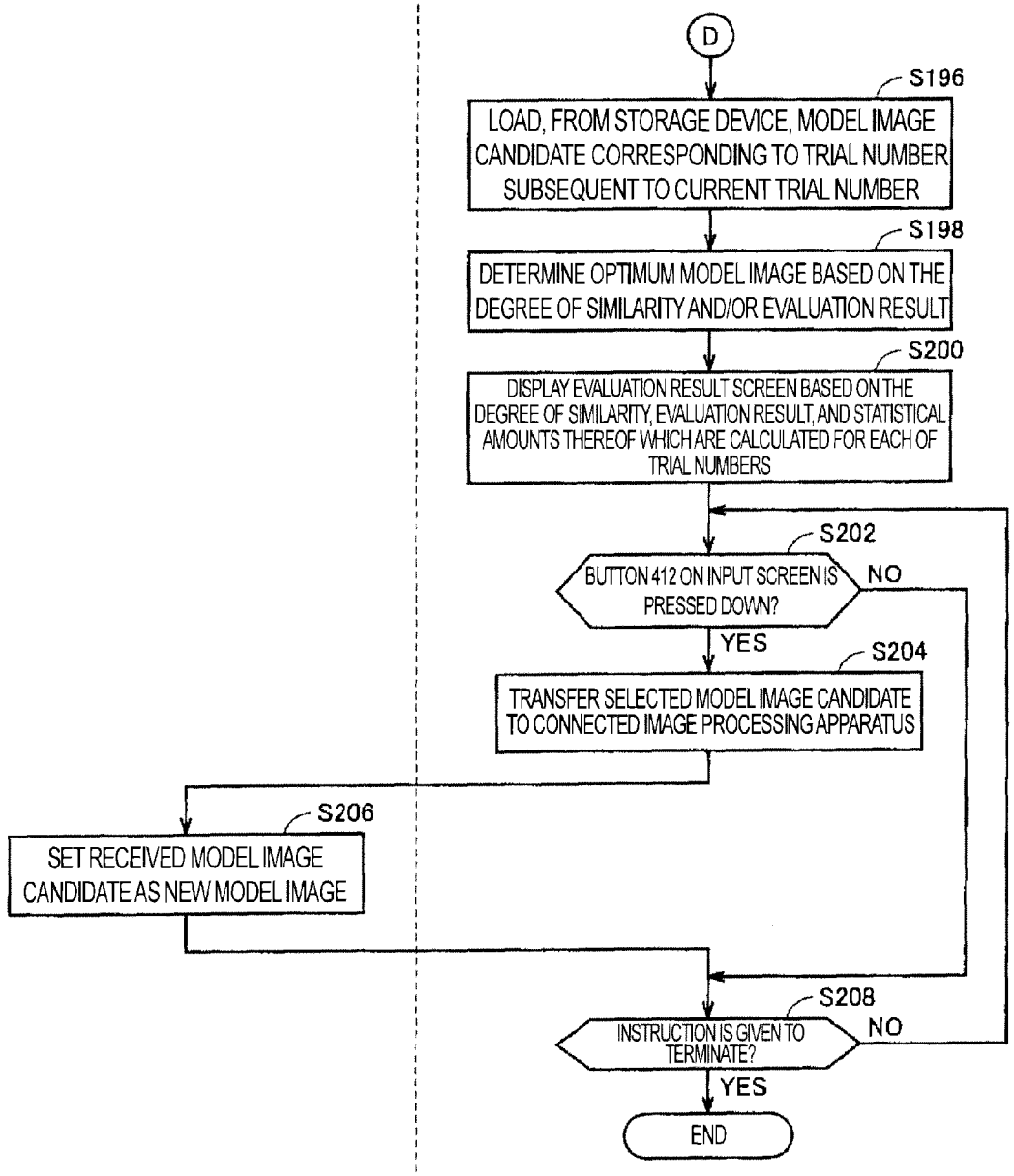
FIG. 22 is a flowchart (5) showing the entire processing of the system according to the embodiment of the present invention.
Figure 23:
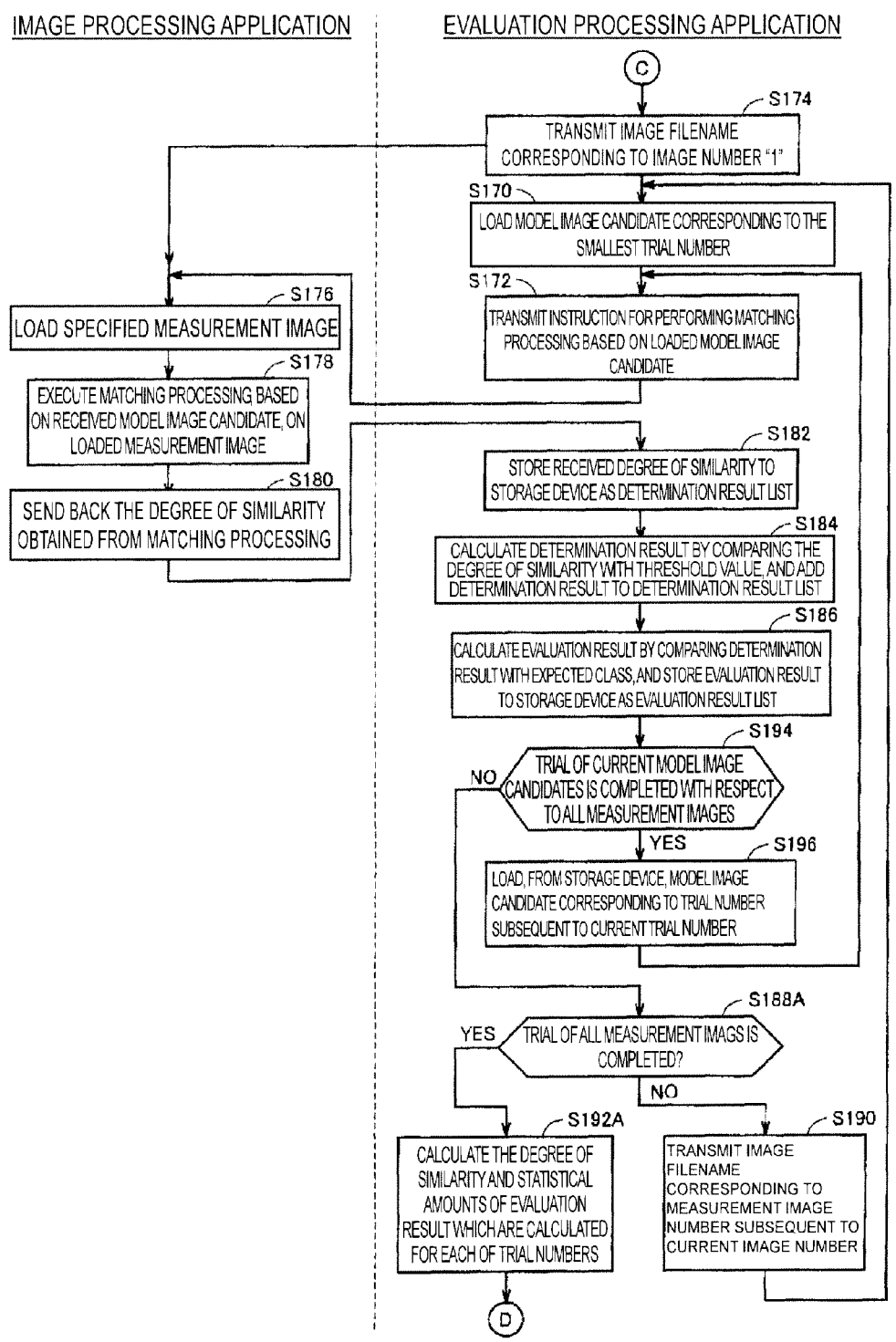
FIG. 23 is a flowchart showing an essential part of the entire processing of the system according to a first modification of the embodiment of the present invention.

The entire processing performed by the system according to the first modification is the same as the entire processing procedure performed by the system according to the above embodiment (FIGS. 18 to 22) except that the processing procedure shown in the flowchart of FIG. 21 is replaced with the processing shown in the flowchart of FIG. 23. Therefore, in the following description, the same processing procedures as those of the above embodiment will not be repeatedly described. In the flowchart shown in FIG. 23, the steps including the same processings as those of the steps in the flowchart of FIG. 21 are denoted with the same step numbers.

Referring to FIG. 23, first, the evaluation processing application 20 references the image list 1011, and gives the image file name corresponding to the image number "1" to the image processing application 30 (step S174). Subsequently, the evaluation processing application 20 loads the model image candidate corresponding to the smallest trial number (trial number [0]) from the storage device (step S170). Further, the evaluation processing application 20 instructs the image processing application 30 to perform the matching processing based on the loaded model image candidate and the model image candidate (step S172).

The image processing application 30 responds to the notification given by the evaluation processing application 20, and loads the specified measurement image (step S176). Subsequently, the image processing application 30 executes the matching processing on the loaded measurement image based on the model image candidates received from the evaluation processing application 20 (step S178). Thereafter, the image processing application 30 sends the degree of similarity obtained from the matching processing back to the evaluation processing application 20 (step S180).

The evaluation processing application 20 stores the degree of similarity received from the image processing application 30 as the determination result list 1035 to the storage device, wherein the degree of similarity is associated with the trial number and the image number (step S182). The evaluation processing application 20 compares the received degree of similarity with a previously set threshold value, and calculates a determination result of the target measurement image, which is additionally written to the determination result list 1035 (step S184). Further, the evaluation processing application 20 compares the calculated determination result with the expected class associated with the target measurement image, and stores the evaluation result as the evaluation result list 1042 to the storage device, wherein the evaluation result is associated with the trial number and the image number (step S186).

Subsequently, the evaluation processing application 20 determines whether the trial has been completed with respect to all of the model image candidates to be subjected to the trial (step S194). When the trial has not yet been completed with respect to all of the model image candidates to be subjected to the trial (NO in step S194), the evaluation processing application 20 loads the model image candidates corresponding to a trial number subsequent to the current trial number from the storage device (step S196). Thereafter, the processing of step S172 and subsequent steps are repeated.

When the trial has been completed with respect to all of the model image candidates to be subjected to the trial (YES in step S194), the evaluation processing application 20 references the image list 1011, and determines whether the trial has been completed with respect to all of the measurement images (step S188A). When the trial has not yet been completed with respect to all of the measurement images (NO in step S188A), the evaluation processing application 20 references the image list 1011, and gives the image filename of the measurement image corresponding to an image number subsequent to the current image number to the image processing application 30 (step S190). Thereafter, the processing of step S170 and subsequent steps are repeated.

When the trial has been completed with respect to all of the measurement images (YES in step S188A), the evaluation processing application 20 references the determination result list 1035 and the evaluation result list 1042, and calculates the statistical amounts of the evaluation result and the degree of similarity calculated for each trial number (step S192A). Thereafter, the processing of step S198 is performed.

<Second Modification>

Figure 24:
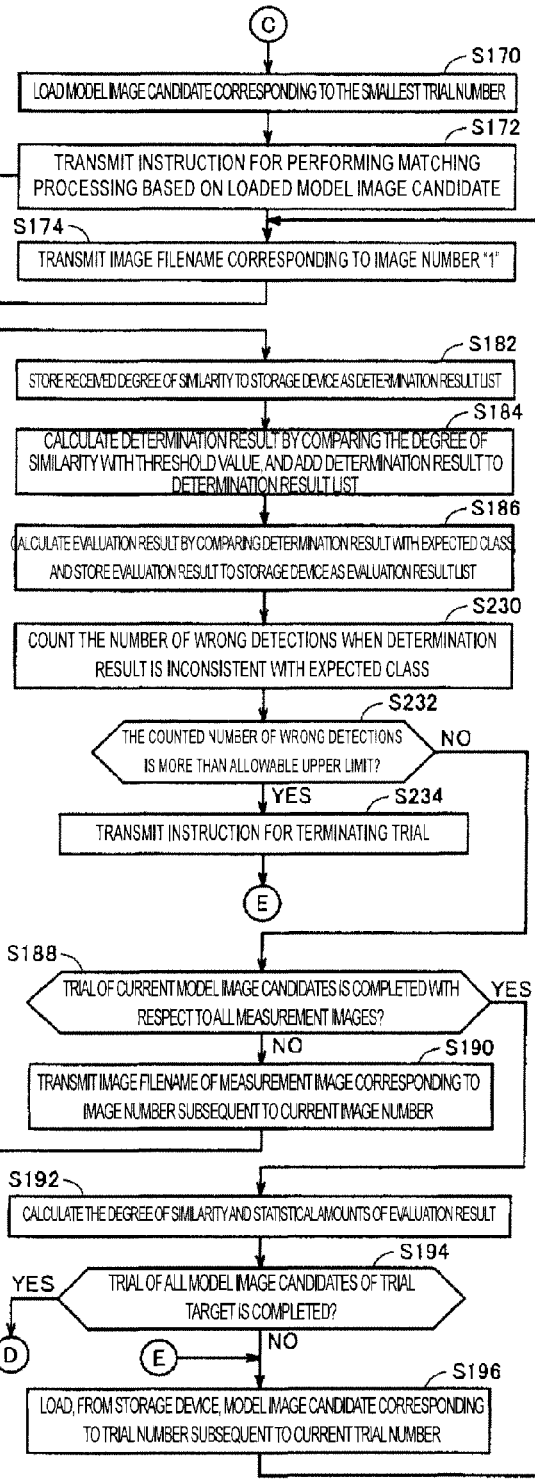
FIG. 24 is a flowchart showing an essential part of the entire processing of the system according to a second modification of the embodiment of the present invention.

It may be possible to add a processing for terminating trial of the model image candidate which is considered to be inappropriate based on the number of wrong detections in the above-described matching processing (second modification). The entire processing performed by the system according to the second modification is the same as the entire processing procedure performed by the system according to the above embodiment (FIGS. 18 to 22) except that the processing procedure shown in the flowchart of FIG. 21 is replaced with the processing shown in the flowchart of FIG. 24. Therefore, in the following description, the same processing procedures as those of the present embodiment will not be repeatedly described. The flowchart shown in FIG. 24 includes the steps in the flowchart of FIG. 21, and in addition, new steps S230, S232, and S234.

After the processing of step S186 is executed, the evaluation processing application 20 counts the number of wrong detections when the calculated determination result is inconsistent with the expected class associated with the target measurement image (step S230). Subsequently, the evaluation processing application 20 determines whether the number of wrong detections counted in step S230 exceeds the specified allowable upper limit (step S232).

When the number of wrong detections thus counted exceeds the specified allowable upper limit (YES in step S232), the evaluation processing application 20 transmits an instruction to the image processing application 30 so as to instruct the image processing application 30 to terminate the trial of the remaining measurement images with respect to the current model image candidate (step S234). Then, the processing proceeds to step S196.

<Third Modification>

In the above embodiment, the matching processing is performed based on mainly one model image. Meanwhile, when obtained measurement images are not stable (unstable) due to various disturbances, a plurality of model images may be prepared in advance, and the matching processing may be performed based on these model images, so that the matching processing can be stably performed. More specifically, it may be possible to consider an application that executes the matching processing of the measurement image based on the plurality of model images, and when the matching processing based on at least any one of the model images is successful, overall matching of the target measurement image is considered to be "matching OK". The above-described matching processing is called "flexible search".

Figure 25A:
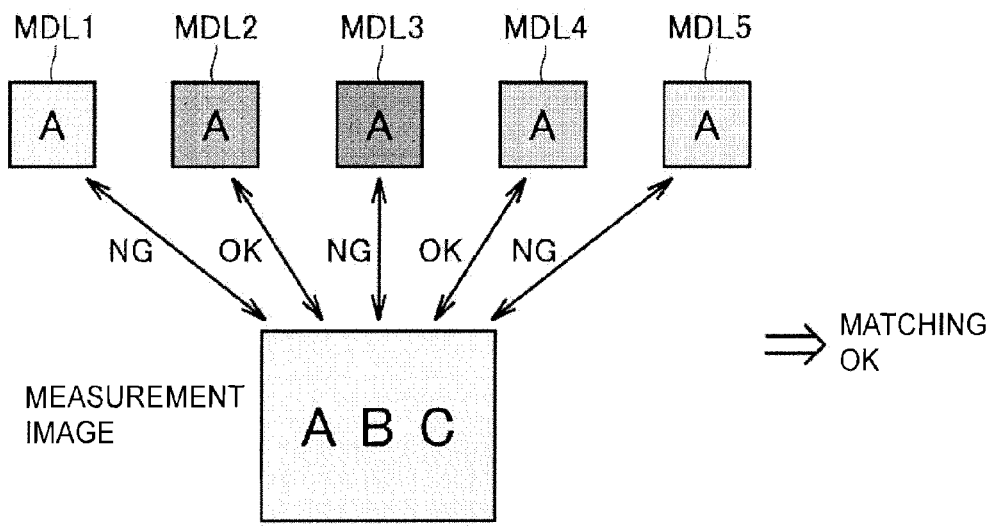
FIGS. 25A and 25B are diagrams for illustrating an overview of matching processing according to a third modification of the embodiment of the present invention.
Figure 25B:
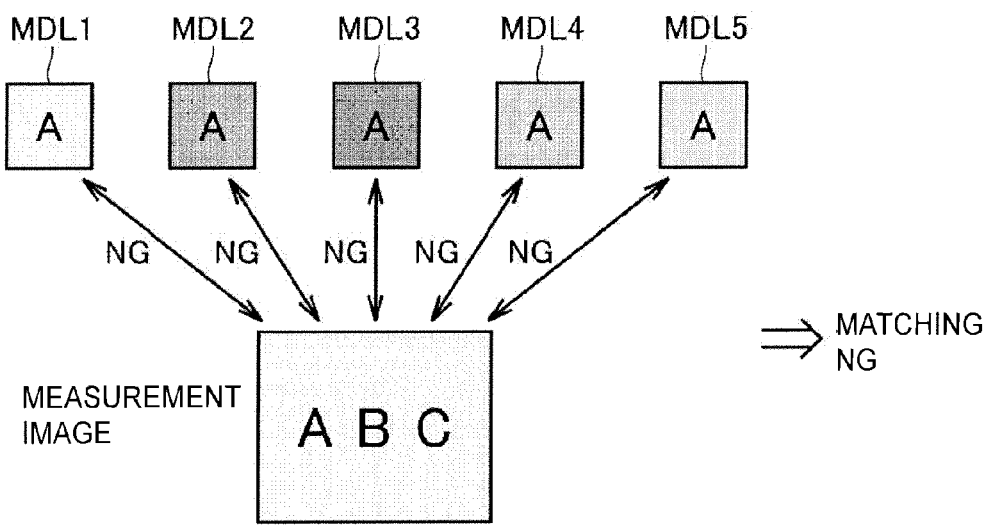

FIGS. 25A and 25B are diagrams schematically illustrating the matching processing according to the third modification of the present invention. FIG. 25A shows a case where the overall matching is "matching OK". FIG. 25B shows a case where the overall matching is "matching NG".

Referring to FIG. 25A, the matching processing is respectively performed between the measurement image and a plurality of model images MDL1 to MDL5 prepared in advance (these model images may be hereinafter also referred to as "(optimum) model image set"). In other words, the degree of similarity (correlation value) is calculated between the measurement image and each of the model images MDL1 to MDL5. Further, the degree of similarity (correlation value) thus calculated and a previously set threshold value are compared for each of them, so that whether the measurement image is "matching OK" or "matching NG" can be determined. Then, when at least one model image (in the example of FIG. 25A, two model images MDL2 and MDL4) is determined to be "matching OK", the matching processing of the entire measurement image is determined to be "OK".

In contrast, when all of the model images MDL1 to MDL 5 are determined to be "matching NG" as shown in FIG. 25B, the matching processing of the entire measurement image is determined to be "NG".

It is important what kind of combination of model images are set in the above-described application for performing the matching processing using the plurality of model images. In view of this issue, the third modification relates to a configuration in which an optimum model image set can be decided in a swift and easy manner.

Figure 26:
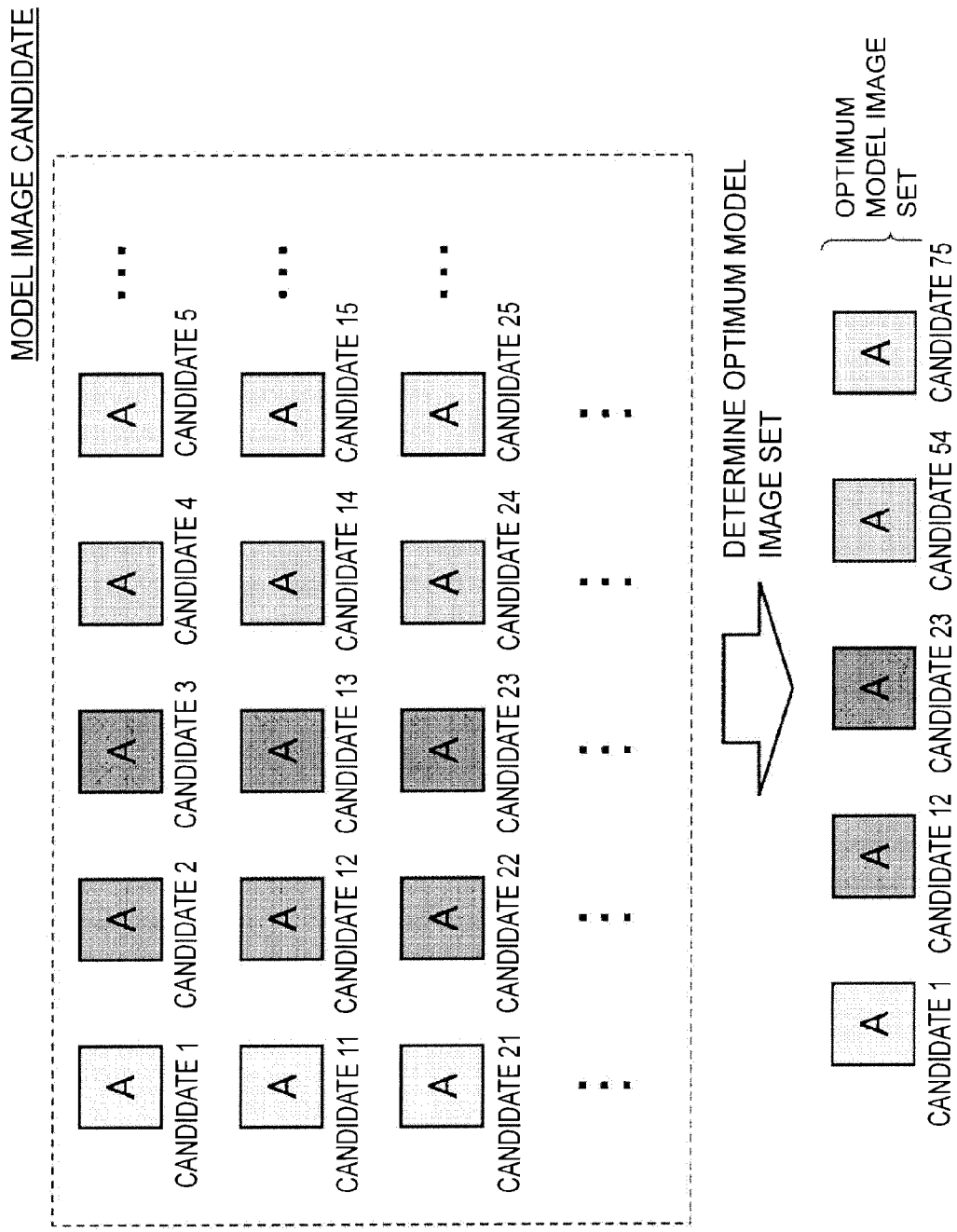
FIG. 26 is a diagram for illustrating an overview of model image set acquisition processing of the matching processing according to the third modification of the embodiment of the present invention.

FIG. 26 is a diagram illustrating an overview of a model image set acquisition processing in the matching processing according to the third modification of the present invention.

Referring to FIG. 26, the support apparatus according to the present modification decides a plurality of model image candidates of the model image candidates extracted from the plurality of reference images, and adopt the plurality of model image candidates as "optimum model image set". With the use of such an optimum model image set, the support apparatus according to the present modification can stably perform the matching processing even when the obtained measurement image is affected by various disturbances. In other words, the support apparatus according to the present modification searches a combination of two or more model image candidates included in the plurality of model image candidates in order to optimize the matching processing result of all of the plurality of measurement images. Three typical methods are described below as examples.

(First Method)

In a first method, model image set candidates are adopted in a round-robin manner as trial targets from the model image candidates as shown in FIG. 26, and a trial target allowing the most stable matching processing is selected from among the thus generated trial targets.

FIG. 27 is a diagram for schematically illustrating the first method according to the third modification of the present invention. As shown in FIG. 27, in the first method according to the present modification, combinations of a predetermined number of model image candidates are decided in a round-robin manner, and each combination is adopted as a trial target. In other words, in the example shown in FIG. 27, combinations of three model image candidates are sequentially generated, and each combination is assigned with a trial number. The above-described trial is repeatedly executed using each model image candidate assigned with the trial number. Then, the execution result is displayed to the user. Since the user interface providing the trial result is the same as that in FIG. 14 described above, the details description is not repeatedly described.

In the example of FIG. 27, the combinations of a predetermined number of model image candidates are generated as an example. Alternatively, the number of model image candidates used for the combination may change.

Figure 28:
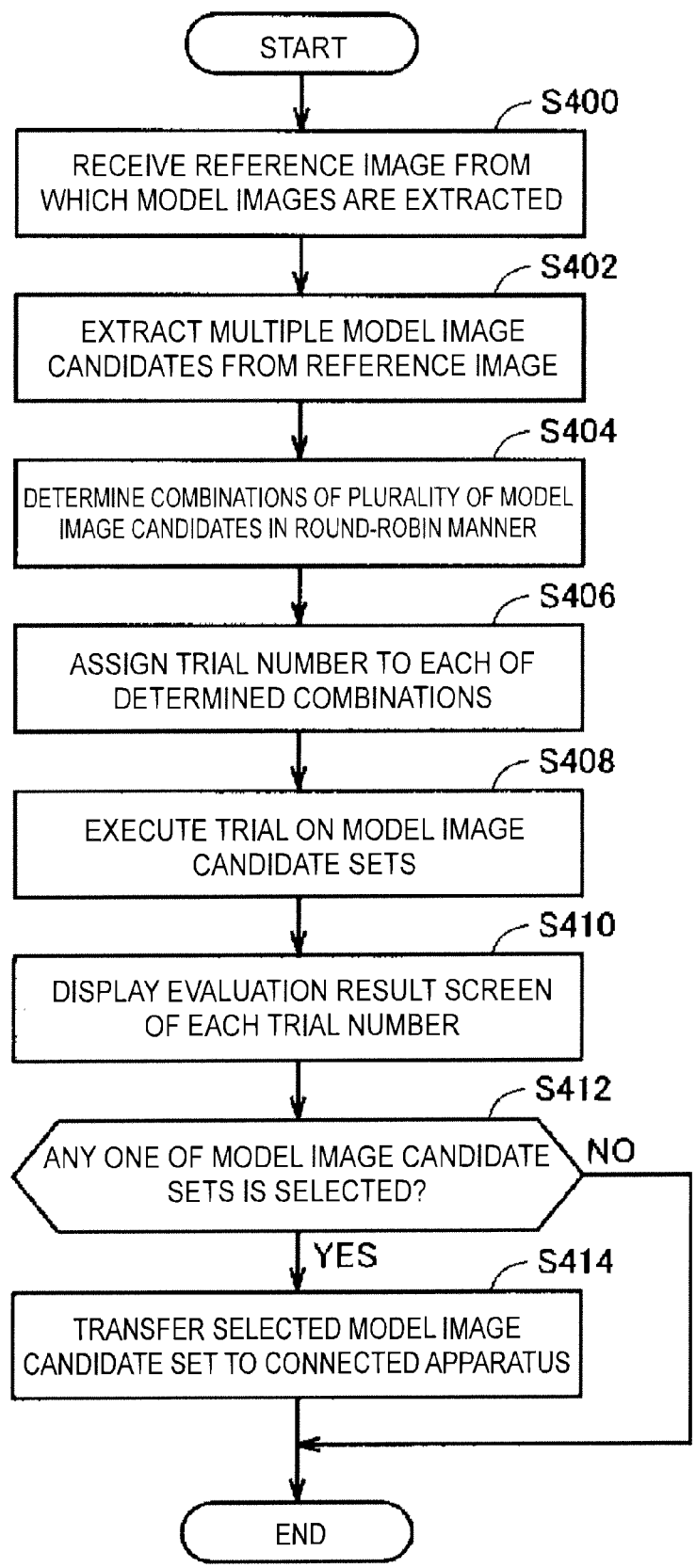
FIG. 28 is a diagram for illustrating a procedure of the first method according to the third modification of the embodiment of the present invention.

The procedure of the first method as described above is schematically illustrated in the flowchart of FIG. 28. FIG. 28 is a flowchart illustrating the procedure of the first method according to the third modification of the present invention. Typically, the flowchart shown in FIG. 28 is achieved by causing the CPU 105 of the support apparatus 100 to load a program previously stored in the fixed disk 107 into the memory 106 and executing the program.

The evaluation processing application 20 (CPU 105 of the support apparatus 100 (FIG. 2); the same applies hereinafter) receives the reference image from which the model images are extracted (step S400). Subsequently, the evaluation processing application 20 extracts a plurality of model image candidates from the specified reference image (step S402). The processing in this step S402 is the same as the processing in steps S138 to S152 of FIG. 19 as described above.

Thereafter, the evaluation processing application 20 decides, in a round-robin manner, combinations each of which is constituted by the predetermined number of the plurality of model image candidates thus extracted (step S404). Further, the evaluation processing application 20 assigns a trial number to each of the decided combinations (step S406).

Further, the evaluation processing application 20 executes trial on each of the model image candidate sets corresponding to the trial numbers (step S408). The processing in this step S408 is the same as the processing in steps S170 to S196 of FIG. 21 as described above.

After the trial is completed, the evaluation processing application 20 displays on the monitor 102 an evaluation result screen showing the degree of similarity, the evaluation result, and the statistical amounts thereof which are calculated for each of the trial numbers (step S410). Further, the evaluation processing application 20 determines whether the user has selected any one of the model image candidate sets (step S412).

When the user has selected any one of the model image candidate sets (YES in step S412), the evaluation processing application 20 transfers the selected model image candidate set to the image processing application 30A of the connected image processing apparatus 200 (step S414). The image processing application 30 registers the received model image candidates as the model image set for flexible search.

According to the first method of the present modification, combinations of the model image candidates can be evaluated in a round-robin manner. Therefore, the optimum model image candidate set can be reliably decided.

(Second Method)

In the second method, first, a model image with which the matching processing can be performed most stably is decided from among the model image candidates as shown in FIG. 26. Subsequently, a measurement image that is determined to be "matching NG" with respect to the decided model image is extracted, so that another model image that should be determined to be "matching OK" with this extracted measurement image is complementarily decided. The procedure of the second method will be described with reference to FIG. 29.

Figure 29:
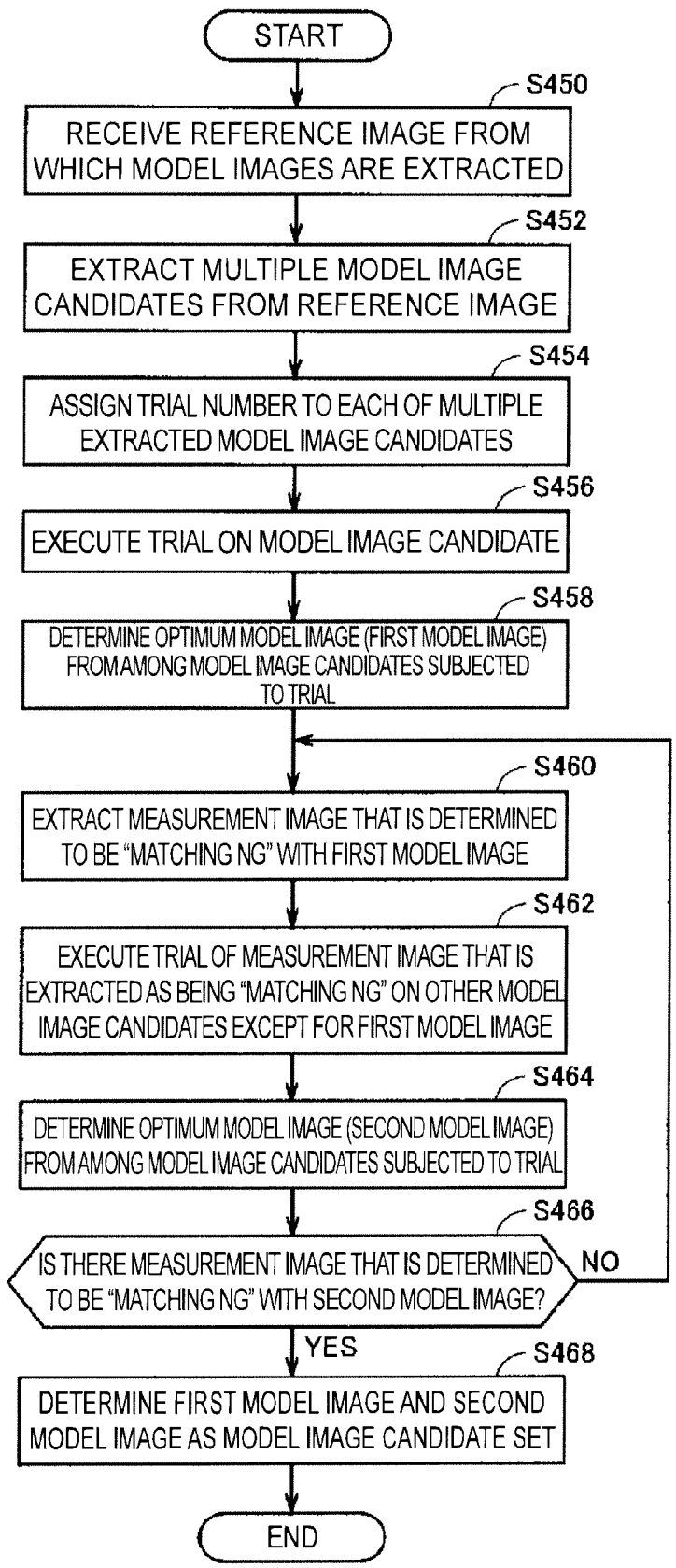
FIG. 29 is a diagram for illustrating a procedure of a second method according to the third modification of the embodiment of the present invention.

FIG. 29 is a flowchart showing the procedure of the second method according to the third modification of the present invention. Typically, the flowchart shown in FIG. 29 is achieved by causing the CPU 105 of the support apparatus 100 to load a program previously stored in the fixed disk 107 into the memory 106 and executing the program.

The evaluation processing application 20 (CPU 105 of the support apparatus 100 (FIG. 2); the same applies hereinafter) receives the reference image from which the model images are extracted (step S450). Subsequently, the evaluation processing application 20 extracts the plurality of model image candidates from the specified reference image (step S452). The processing in this step S452 is the same as the processing in steps S138 to S152 of FIG. 19 as described above.

Thereafter, the evaluation processing application 20 assigns a trial number to each of the plurality of extracted model image candidates (step S454). Then, the evaluation processing application 20 executes trial on each of the model image candidates corresponding to the trial numbers (step S456). The processing in this step S456 is the same as the processing in steps S170 to S196 of FIG. 21 as described above. After the trial is completed, the evaluation processing application 20 decides the optimum model image (first model image) from among the target model image candidates, based on the degree of similarity and/or the evaluation result thus calculated (step S458). Subsequently, the evaluation processing application 20 extracts the measurement image that is determined to be "matching NG" with the first model image determined in step S458 (step S460).

Further, the evaluation processing application 20 executes trial of the measurement image extracted in step S460 with respect to the plurality of extracted model image candidates except for the first model image determined in step S458. The processing in this step S462 is the same as the processing in steps S170 to S196 of FIG. 21 as described above. After the trial is completed, the evaluation processing application 20 decides the optimum model image (second model image) from among the target model image candidates, based on the degree of similarity and/or the evaluation result thus calculated (step S464).

Subsequently, the evaluation processing application 20 determines whether there is any measurement image that is determined to be "matching NG" with the second model image determined in step S464 (step S466). When there is no measurement image that is determined to be "matching NG" with the second model image (NO in step S466), the evaluation processing application 20 adopts the first model image determined in step S458 and the second model image determined in step S464 as a model image candidate set (step S468).

In contrast, when there is a measurement image that is determined to be "matching NG" with the second model image (YES in step S466), the evaluation processing application 20 repeats the processing of step S460 and subsequent steps. In other words, the evaluation processing application 20 adds the second model image until there is no longer any measurement image that is determined to be "matching NG".

In the second method according to the present modification, the model image candidate set constituted by the minimum required number of model images can be determined. Therefore, the matching processing can be performed more efficiently.

(Third Method)

In the third method, trial is executed with respect to each of the model image candidates as shown in FIG. 26, and a combination of model image candidates of the optimum model image candidate is determined based on each trial result.

FIGS. 30A and 30B are diagrams illustrating an overview of the third method according to the third modification of the present invention. FIG. 31 is a diagram illustrating an example of trial result obtained by the third method according to the third modification of the present invention.

In the third method according to the present modification, trial of each measurement image is executed with respect to each of the plurality of extracted model image candidates, as shown in FIG. 30A. Then, the degree of similarity (correlation value) with each of the plurality of target measurement images is calculated for each of the model image candidates as shown in FIG. 31. A combination in which the degree of similarity (correlation value) with each of the measurement images can be maintained at a predetermined value is determined based on the trial result as shown in FIG. 31. In a typical determining processing method, a model image candidate having the highest degree of similarity (correlation value) with each of the measurement images is identified (corresponding to a hatched section in FIG. 31), and a set of model image candidates thus identified is adopted as a model image candidate set. More specifically, in the example of FIG. 31, the model image candidate 1 has the highest degree of similarity (correlation value) with the measurement images 1, 2 and 5, and the model image candidate 2 has the highest degree of similarity (correlation value) with the measurement images 3 and 4. As a result, as shown in FIG. 30B, the model image candidate 1 and the model image candidate 2 are adopted as a model image candidate set.

Figure 32:
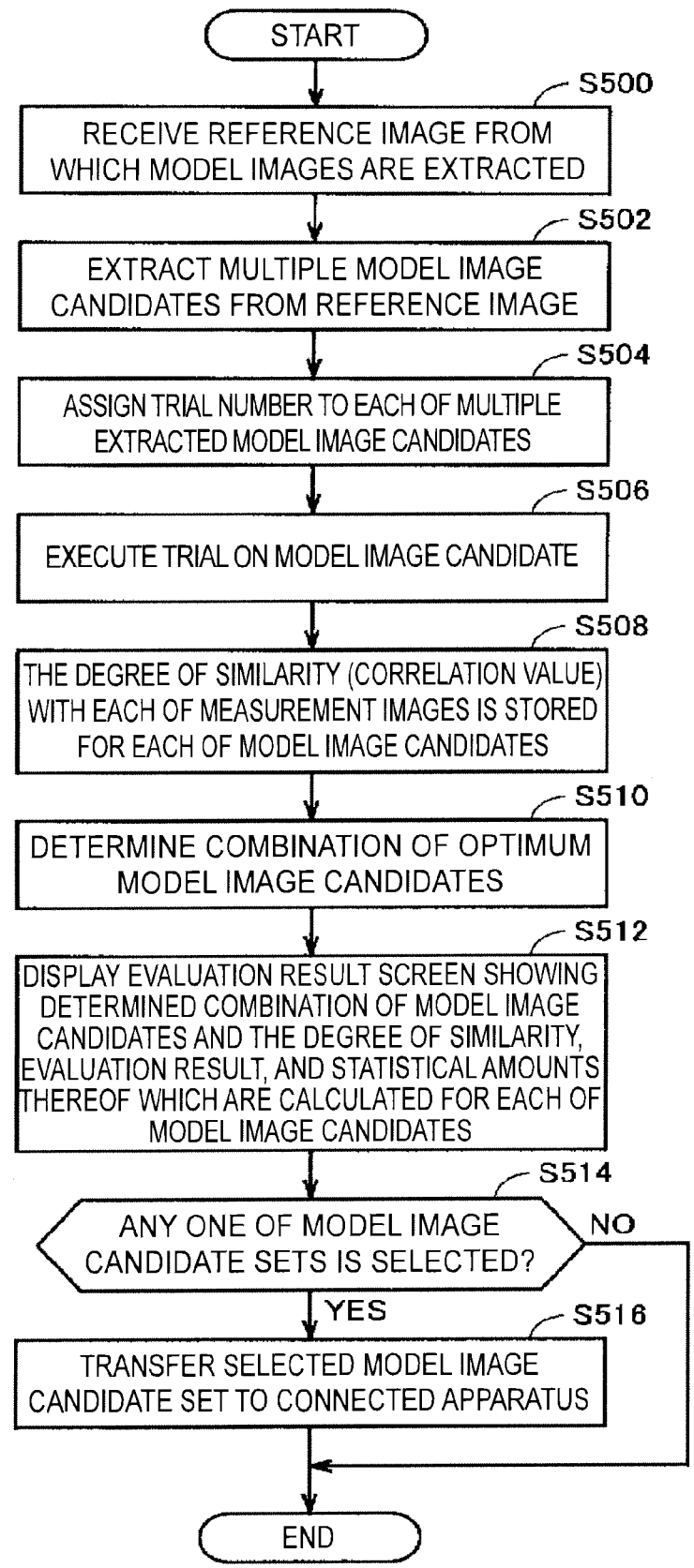
FIG. 32 is a flowchart showing a procedure of the third method according to the third modification of the embodiment of the present invention.

The procedure of the third method as described above is schematically illustrated in the flowchart of FIG. 32.

FIG. 32 is a flowchart illustrating the procedure of the third method according to the third modification of the present invention. Typically, the flowchart shown in FIG. 32 is achieved by causing the CPU 105 of the support apparatus 100 to load a program previously stored in the fixed disk 107 into the memory 106 and executing the program.

The evaluation processing application 20 (CPU 105 of the support apparatus 100 (FIG. 2); the same applies hereinafter) receives the reference image from which the model images are extracted (step S500). Subsequently, the evaluation processing application 20 extracts a plurality of model image candidates from the specified reference image (step S502). The processing in this step S502 is the same as the processing in steps S138 to S152 of FIG. 19 as described above.

Thereafter, the evaluation processing application 20 assigns a trial number to each of the plurality of extracted model image candidates (step S504). Then, the evaluation processing application 20 executes trial on each of the model image candidates corresponding to the trial numbers (step S506). The processing in this step S506 is the same as the processing in steps S170 to S196 of FIG. 21 as described above. After the trial is completed, the evaluation processing application 20 temporarily stores the degree of similarity (correlation value) with each of the target measurement images for each of the model image candidates (step S508). More specifically, the table as shown in FIG. 31 is internally generated. Subsequently, the evaluation processing application 20 determines a combination of optimum model image candidates based on the table generated in step S508 (step S510). This combination is determined in view of the factors such as the number of model image candidates and the number of measurement images determined to be "matching NG". It should be noted that linear programming may be employed as an algorithm for determining the combination. In step S510, a plurality of combinations of model image candidates may be determined instead.

Thereafter, the evaluation processing application 20 displays on the monitor 102 an evaluation result screen showing the combination of model image candidates determined in step S510 and showing the degree of similarity, the evaluation result, and the statistical amounts thereof which are calculated for each of the model image candidates (step S512). Further, the evaluation processing application 20 determines whether the user has selected any one of the model image candidate sets (step S514).

When the user has selected any one of the model image candidate sets (YES in step S514), the evaluation processing application 20 transfers the selected model image candidate set to the image processing application 30A of the connected image processing apparatus 200 (step S516). The image processing application 30 registers the received model image candidates as the model image set for flexible search.

According to the third method of the present modification, a combination of model image candidates can be determined based on the degree of similarity (correlation value) of each of the model image candidates. Therefore, the optimum model image candidate set can be decided more efficiently.

<Fourth Modification>

In the above-described embodiment, a plurality of model image candidates may be extracted from the same reference image. However, there may be a case where, depending on target processing items, it may be preferable to adopt model image candidates that are based on the same model image but are associated with different image processing parameters. Such an example will be described below.

When search processing is performed based on the degree of similarity (correlation value) with the above-described model images, it is not so necessary to optimize parameters associated with the model images. Therefore, the processing can be adequately achieved by preparing a plurality of model image candidates in advance and determining an optimum model image from the plurality of model image candidates. However, depending on the processing item, the model image may be closely related to the parameters set for the model image.

For example, during a so-called edge code model search, i.e., search processing based on an edge code, it is necessary to optimize an edge mask level and an edge level during registration of a model. In other words, it is necessary to adjust parameters corresponding to each of the models to be registered. Further, an increase in the number of edges in the model registration result in increasing the amount of the matching, which greatly affects the measuring time. Therefore, it is necessary to adjust the parameters in view of the tact time and the like.

With such a processing item, the parameters cause great disturbances. Accordingly, even when only the plurality of model image candidates are varied and evaluated, it may be impossible to obtain the settings suitable for the conditions requested by the user, unless the parameters such as the edge mask level and the edge level are varied together.

In such a case, trial is performed on a combination of a plurality of model image candidates and a plurality of parameters.

Figure 33B:
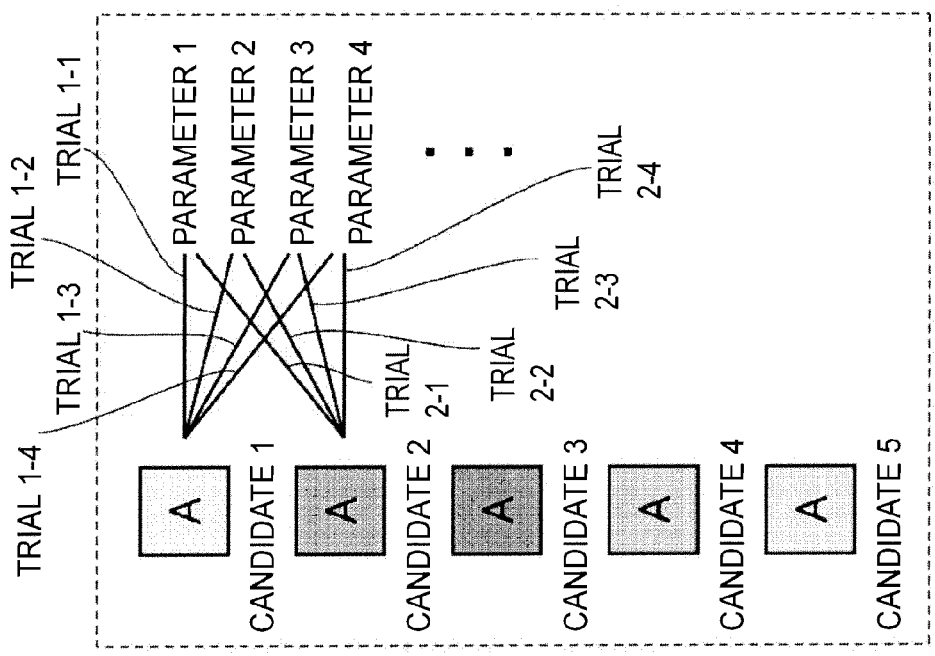
FIGS. 33A and 33B are diagrams showing an example of trial generation processing according to a fourth modification of the present invention.
Figure 33A:
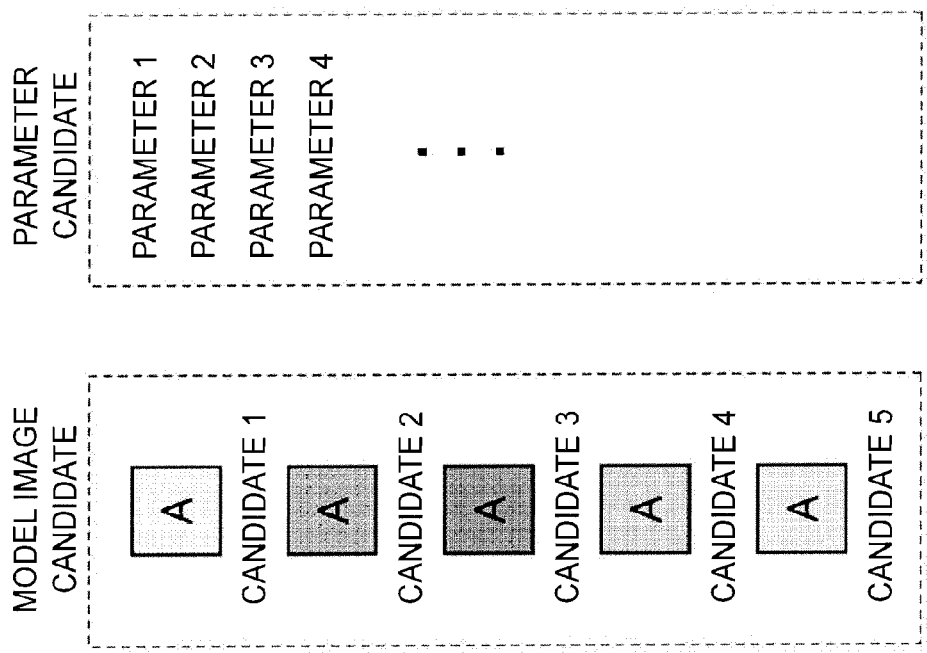

FIGS. 33A and 33B are diagrams showing an example of trial generation processing according to the fourth modification of the present invention.

As shown in FIG. 33A, variation factors for performing optimization include a plurality of model image candidates and a plurality of parameter candidates. As shown in FIG. 33B, combinations of the model image candidates and the parameter candidates are sequentially set for example as follows: trials 1-1, 1-2, 1-3, 1-4, 2-1, 2-2, 2-3, 2-4, ..., and each of these set trials is executed. As a result, an optimum combination of the model image and the corresponding parameter can be extracted.

According to the present modification, not only the model image but also the corresponding parameter can be optimized. Therefore, even when the processing items are more complicated, appropriate setting can be set in a shorter time.

<Fifth Modification>

In the above embodiment, mainly the matching processing is executed on the measurement image itself that the imaging unit 8 obtains by imaging a workpiece. However, depending on the target processing items, the measurement image obtained by the imaging unit 8 may be subjected to preprocessing such as a filter (for example, color gray filter). In this case, it is necessary to register a model image according to the preprocessing applied to the measurement image. Such an example will be described below.

Figure 34A:
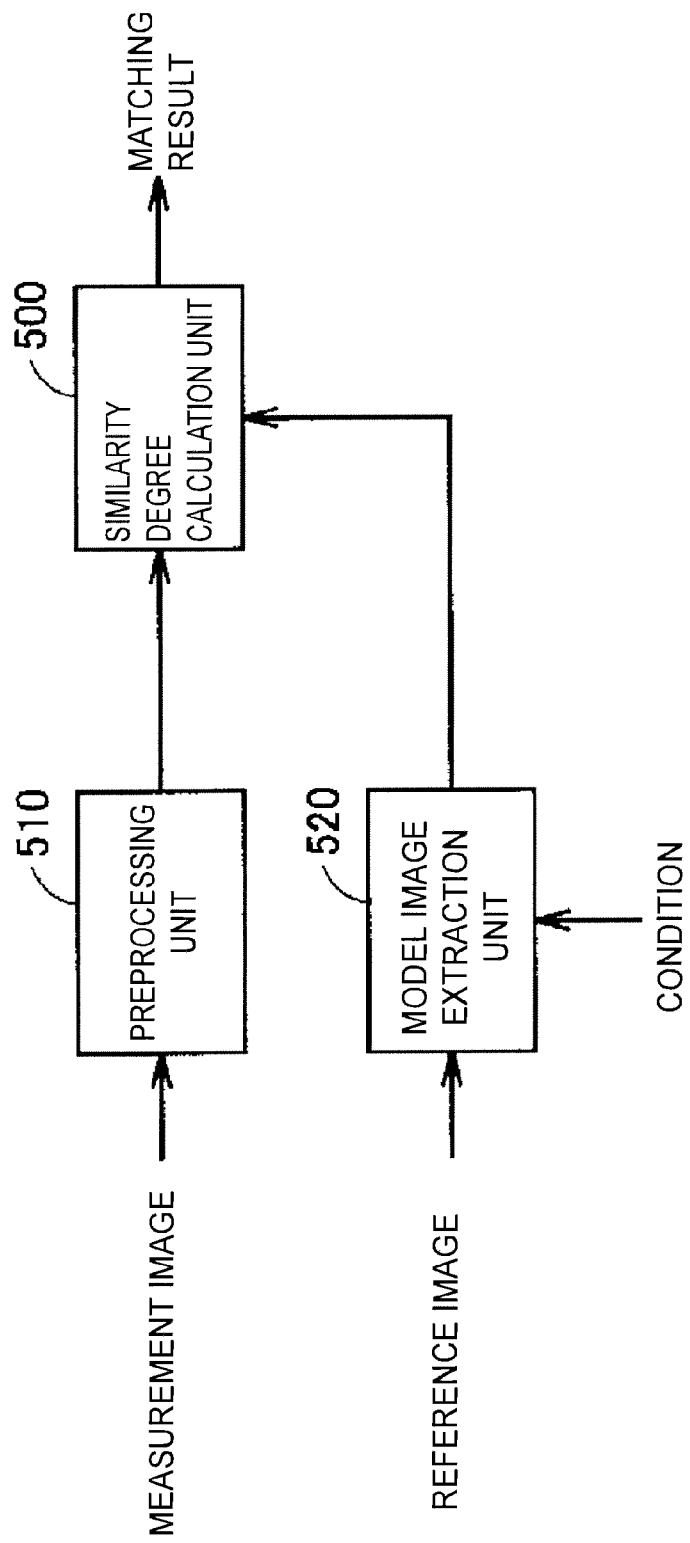
FIGS. 34A and 34B are block diagrams for illustrating contents of processing items according to a fifth modification of the present invention.
Figure 34B:
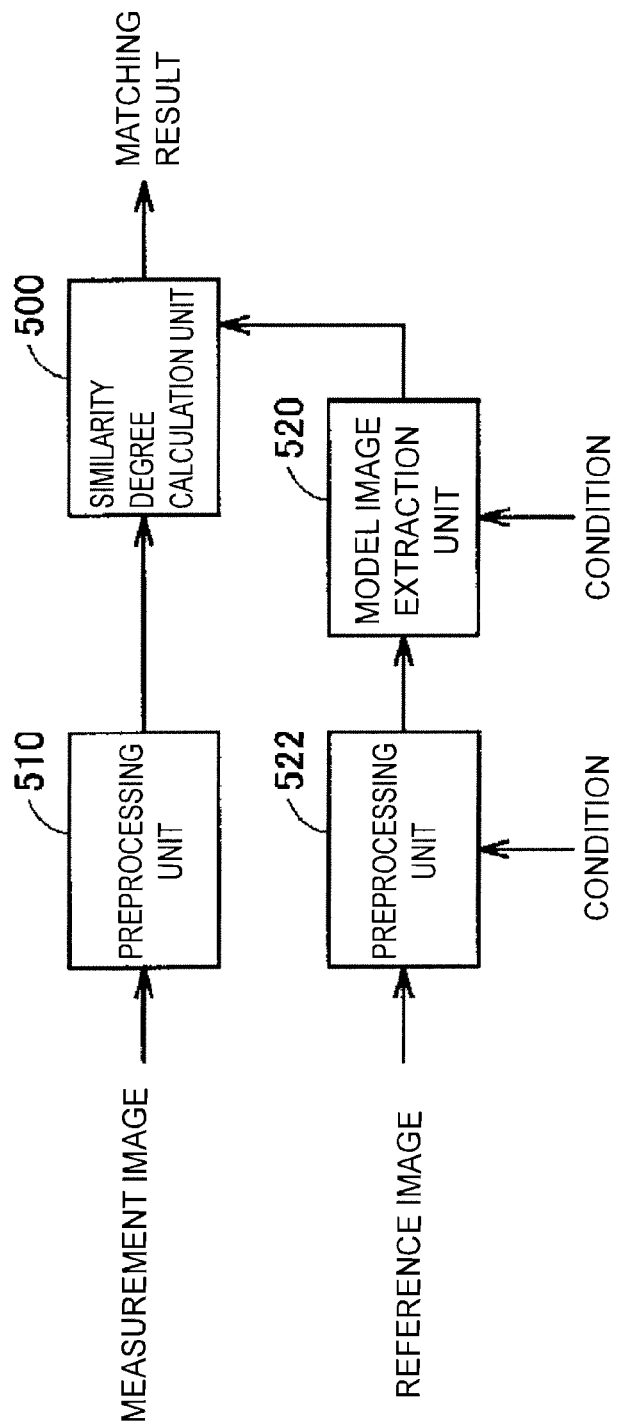
Figure 35A:
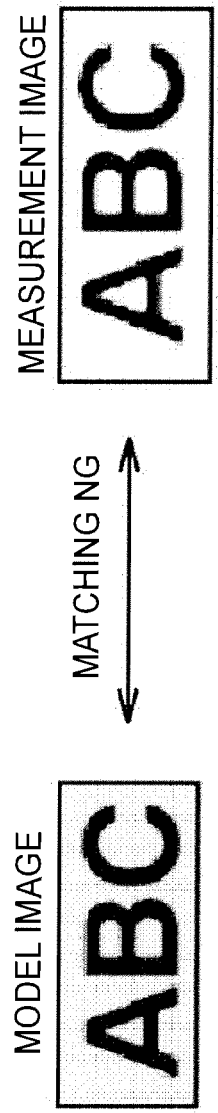
FIGS. 35A and 35B are diagrams for illustrating optimization of a model image according to the fifth modification of the present invention.
Figure 35B:
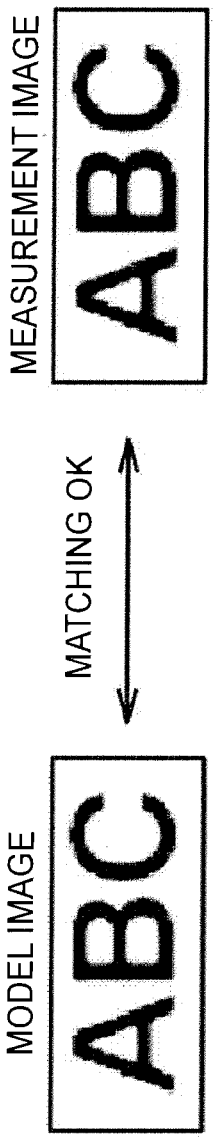

FIGS. 34A and 34B are block diagrams for illustrating the contents of the processing items according to the fifth modification of the present invention. FIGS. 35A and 35B are diagrams for illustrating optimization of a model image according to the fifth modification of the present invention.

Referring to FIG. 34A, a model image extraction unit 520 is assumed to extract a model image from reference images according to a predetermined condition and register the model image in advance. On the other hand, the measured image obtained by the imaging unit is subjected to filter processing as desired by the user performed by a preprocessing unit 510, and is outputted to a similarity degree calculation unit 500. The similarity degree calculation unit 500 calculates (searches) the degree of similarity (correlation value) of the measurement image inputted by the preprocessing unit 510 with the previously registered model image. When the preprocessing unit 510 is given a setting that is different from the setting used during registration of the model image, the registered model image may not be appropriate for the measurement image having been subjected to the preprocessing as shown in FIG. 35A. In other words, as shown in FIG. 35A, if the model image is not optimized according to the variation of the preprocessing condition, the difference in the color density therebetween causes a large error in the matching processing result.

In order to cope with this issue, as shown in FIG. 34B, before the filter processing similar to that of preprocessing unit 510 is carried out, the reference image is inputted to a preprocessing unit 522, and the model image is registered based on the reference image having been subjected to the filter processing that is output from this preprocessing unit 522. As described above, the model image is optimized according to the variation of the preprocessing condition, so that the matching processing is appropriately executed as shown in FIG. 35B.

According to the present embodiment, the model image is registered according to the preprocessing performed on the measurement image to be subjected to the matching processing. Therefore, the matching processing can be executed appropriately without being affected by the preprocessing.

<Modification 6>

In the above embodiment, when the measurement result of a certain trial satisfies a predetermined condition, the measurement of that trial is terminated in the middle in order to increase the speed of search processing of the optimum model image. Alternatively, other methods for increasing the speed may be applied.

For example, in the above embodiment, the matching processing with the initially-set model image is performed in order to extract the model image candidates from all of the target non-defective item images (for example see FIG. 5). It may also be possible to further add conditions so that only some images are extracted as model image candidates.

More specifically, a predetermined number of model images having relatively high degree of similarity (correlation value) with the initially-set model image can be adopted as the model image candidates. Further, model images having a high degree of similarity (correlation value) with the initially-set model image may be extracted at a predetermined interval as the model image candidates. Alternatively, model images whose degree of similarity (correlation value) with the initially-set model image is within a predetermined range (typically, approximately average value) may be adopted as the model image candidates.

Further, average images extracted with the model image candidates are often affected by the initially-set model images. Therefore, after the model image candidates are extracted based on the initially-set model images, the most average model image may be identified among the extracted model image candidates, and the model image candidate may be extracted again based on this identified model image.

According to the present modification, the optimum model image can be determined in a shorter time.

[Other Embodiments]

A program according to the present invention may execute processing by calling, at a predetermined timing in a predetermined arrangement, necessary modules of program modules provided as a part of an Operating System (OS) of a computer. In this case, the program itself does not include the above modules, and executes the processing by cooperating with the OS. Such a program without any module is also encompassed within the present invention.

The program according to the present invention may be provided upon being incorporated into a portion of another program. In this case as well, the program itself does not include the module included in the other program, and executes the processing in cooperation with the other program. Such a program incorporated into another program is also encompassed within the present invention.

The provided program product is executed upon being installed in a program storage unit such as a hard disk. It should be noted that the program product includes the program itself and the recording medium storing the program.

Further, part of or all of the functions achieved by the program according to the present invention may be constituted by dedicated hardware.

It is to be understood that the embodiments disclosed herein are not restrictive but are examples in all respects. The scope of the present invention should not be limited by the above description but should be limited by the claims, and it is to be understood that the scope of the present invention also includes the meaning equivalent to the claims and all the changes within the claims.

What is claimed is:

1. A model image acquisition support apparatus configured to provide support in obtaining a model image, the model image acquisition support apparatus configured to be directed to an image processing apparatus configured to perform a matching processing, based on a previously-set model image, on a measurement image obtained by imaging an object, the model image acquisition support apparatus comprising:
an extracting unit for extracting a plurality of model image candidates, serving as candidates for the model images, from a reference image obtained by imaging the object which can be a model;
an input unit for receiving a plurality of the measurement images, the plurality of the measurement images including a non-defective item image that should match with the model image and a defective item image that should not match with the model image;
a processing unit for generating a plurality of trial results by performing the matching processing on the measurement image based on each of the plurality of model image candidates;
an evaluating unit for generating an evaluation result by evaluating each of the plurality of trial results; and
an output unit for outputting the evaluation result for each of the plurality of model image candidates,
wherein the evaluating unit comprises:
a unit for receiving a condition that should be satisfied by the evaluation result; and
a unit for determining a model image candidate that is most suitable for the condition from among the plurality of trial results,
wherein the processing unit is configured to stop the generation of the plurality of trial results when an index including a number of non-defective item images that do not match with the model image candidate and a number of defective item images that match with the model image candidate matches with a predetermined condition.

2. The model image acquisition support apparatus according to claim 1, further comprising a unit for setting, as a model image for the image processing apparatus, a model image candidate corresponding to a selected evaluation result in response to selection made by a user regarding the output evaluation result.

3. The model image acquisition support apparatus according to claim 1, wherein the extracting unit is configured to extract the plurality of model image candidates from the same reference image, wherein the plurality of extracted model image candidates are different in at least one of: a size, a position, and a direction of an extracted region.

4. The model image acquisition support apparatus according to claim 1, wherein the extracting unit is configured to extract the model image candidates from each of a plurality of the reference images.

5. The model image acquisition support apparatus according to claim 1, wherein the extracting unit is configured to extract the model image candidates from the reference image by performing the matching processing based on an initially-set model image.

6. The model image acquisition support apparatus according to claim 5, wherein the extracting unit is configured to obtain the initially-set model image from the image processing apparatus.

7. The model image acquisition support apparatus according to claim 1, wherein the input unit is configured to receive, in addition to the measurement image, at least one of an expected class and an expected value that are associated with the measurement image, wherein the evaluating unit is configured to evaluate a corresponding trial result based on the expected value or the expected class that are associated with each of the measurement images.

8. The model image acquisition support apparatus according to claim 7, wherein the expected class represents a classification as to whether the associated measurement image is the non-defective item image that should match with the model image or the associated measurement image is the defective item image that should not match with the model image.

9. The model image acquisition support apparatus according to claim 8, wherein the reference image is comprised of the non-defective item image included in the measurement image.

10. The model image acquisition support apparatus according to claim 1, wherein the processing unit is configured to generate, for each of the plurality of model image candidates, a trial result set including the plurality of trial results obtained by processing the plurality of the measurement images, wherein the evaluating unit comprises a unit for calculating, for each of the plurality of model image candidates, a statistical output regarding the corresponding trial result set.

11. The model image acquisition support apparatus according to claim 10, wherein the statistical output comprises at least one of: an average value, an intermediate value, a maximum value, a minimum value, and a distributed value.

12. The model age acquisition support apparatus according to claim 1, wherein the input unit is configured to receive a plurality of the measurement images, wherein the model image acquisition support apparatus further comprises a search unit for searching a combination of two or more model image candidates included in the plurality of model image candidates in order to optimize a matching processing result with respect to all of the plurality of measurement images.

13. A model image acquisition support method for providing support in obtaining a model image, the model image acquisition support method being directed to an image processing apparatus configured to perform a matching processing, based on a previously-set model image, on a measurement image obtained by imaging an object, the model image acquisition support method comprising:

extracting a plurality of model image candidates, serving as candidates for the model images, from a reference image obtained by imaging the object which can be a model;

receiving a plurality of the measurement images, the plurality of the measurement images including a non-defective item image that should match with the model image and a defective item image that should not match with the model image;

generating a plurality of trial results by performing the matching processing on the measurement image based on each of the plurality of model image candidates;

stopping the generation of the plurality of trial results when an index including a number of non-defective item images that do not match with the model image candidate and a number of defective item images that match with the model image candidate matches with a predetermined condition;

generating an evaluation result by evaluating each of the plurality of trial results;

outputting the evaluation result for each of the plurality of model image candidates;

receiving a condition that should be satisfied by the evaluation result; and determining a model image candidate that is most suitable for the condition from among a plurality of trial results.

14. A non-transitory computer-readable medium storing a model image acquisition support program for providing support in obtaining a model image, the model image acquisition support program being directed to an image processing apparatus configured to perform a matching processing, based on a previously-set model image, on a measurement image obtained by imaging an object, the model image acquisition support program causing a processor to execute steps comprising:

extracting a plurality of model image candidates, serving as candidates for the model images, from a reference image obtained by imaging the object which can be a model;

receiving a plurality of the measurement images, plurality of the measurement images including a non-defective item image that should match with the model image and a defective item image that should not match with the model image;

generating a plurality of trial results by performing the matching processing on the measurement image based on each of the plurality of model image candidates;

stopping the generation of the plurality of trial results when an index including a number of non-defective item images that do not match with the model image candidate and a number of defective item images that match with the model image candidate matches with a predetermined condition;

generating an evaluation result by evaluating each of the plurality of trial results;

outputting the evaluation result for each of the plurality of model image candidates;

receiving a condition that should be satisfied by the evaluation result; and determining a model image candidate that is most suitable for the condition from among the plurality of trial results.

* * * * *